US012533897B2

(12) United States Patent
Cairns et al.

(10) Patent No.: US 12,533,897 B2
(45) Date of Patent: Jan. 27, 2026

(54) PRINTER MATERIAL HOLDER SYSTEM AND METHOD

(71) Applicant: Brady Worldwide, Inc., Milwaukee, WI (US)

(72) Inventors: Daniel Cairns, Sturtevant, WI (US); Jonathan M. Mantes, Franklin, WI (US); Nicole Nelson, Brookfield, WI (US)

(73) Assignee: Brady Worldwide, Inc., Milwaukee, WI (US)

( * ) Notice: Subject to any disclaimer, the term of this patent is extended or adjusted under 35 U.S.C. 154(b) by 0 days.

(21) Appl. No.: 18/602,322

(22) Filed: Mar. 12, 2024

(65) Prior Publication Data

US 2025/0289251 A1 Sep. 18, 2025

(51) Int. Cl.
*B41J 15/02* (2006.01)
*B41J 15/04* (2006.01)

(52) U.S. Cl.
CPC ............ *B41J 15/02* (2013.01); *B41J 15/042* (2013.01)

(58) Field of Classification Search
CPC .................... B41J 15/02; B41J 15/042; B65H 2301/41368; B65H 2402/412; B65H 19/126
See application file for complete search history.

(56) References Cited

U.S. PATENT DOCUMENTS

D216,281 S 12/1969 Moyroud
4,277,034 A 7/1981 Buzzell
4,494,708 A 1/1985 Stubbs et al.
4,823,953 A 4/1989 Anderson et al.
D327,495 S 6/1992 Nagai
5,318,370 A 6/1994 Nehowig
5,358,351 A 10/1994 Murata et al.
5,455,617 A 10/1995 Stephenson et al.
(Continued)

FOREIGN PATENT DOCUMENTS

EP 734878 A2 10/1996
EP 955173 A2 11/1999
(Continued)

OTHER PUBLICATIONS

Brady Worldwide, Inc., "All Weather Permanent Adhesive Vinyl Label Tape for B30 Printers", retrieved on Mar. 13, 2024, 5 pages, available at: https://www.bradyid.com/labels/aggressive-adhesive/b30-series-continuous-indoor-outdoor-vinyl-labels-cps-brus-10054.
(Continued)

*Primary Examiner* — Christle I Marshall
(74) *Attorney, Agent, or Firm* — Husch Blackwell LLP

(57) ABSTRACT

A material holder for use in a printer is provided. The material holder may captivate rolls of printable media (e.g., a roll of printable adhesive labels affixed to a liner) having various widths. In some instances, the material holder may comprise two flanges, a spindle having an arm and a keyhole region, and a side clip. The flanges may be positioned along the arm of the spindle with an appropriate distance between them to accommodate the desired roll of printable media. The media roll may be sandwiched between the two flanges and configured to rotate about the arm of the spindle. A side clip may be coupled to the arm of the spindle and may prevent tracking or other unintended movement.

20 Claims, 48 Drawing Sheets

(56) References Cited

U.S. PATENT DOCUMENTS

| | | | |
|---|---|---|---|
| 5,599,115 A | 2/1997 | Radcliffe et al. | |
| D378,759 S | 4/1997 | Hattori et al. | |
| D379,194 S | 5/1997 | Sundquist et al. | |
| 5,631,690 A | 5/1997 | Tashiro et al. | |
| D389,179 S | 1/1998 | Uchiyama et al. | |
| 5,909,237 A | 6/1999 | Kerr et al. | |
| D417,886 S | 12/1999 | Sakuta et al. | |
| D419,183 S | 1/2000 | Stouffer | |
| 6,089,486 A | 7/2000 | Dirisio | |
| 6,130,699 A | 10/2000 | Christensen et al. | |
| 6,203,221 B1 | 3/2001 | Tomasik et al. | |
| 6,244,699 B1 | 6/2001 | Brugue et al. | |
| 6,367,995 B1 | 4/2002 | Hashimoto et al. | |
| D466,150 S | 11/2002 | Matsumoto et al. | |
| D469,780 S | 2/2003 | Nonomura | |
| D475,717 S | 6/2003 | Nonomura | |
| D481,414 S | 10/2003 | Milton et al. | |
| D496,684 S | 9/2004 | Goldfain et al. | |
| D521,551 S | 5/2006 | Kato et al. | |
| D523,470 S | 6/2006 | Kato et al. | |
| D524,366 S | 7/2006 | Arai et al. | |
| D524,369 S | 7/2006 | Kato et al. | |
| D524,853 S | 7/2006 | Kato et al. | |
| D525,297 S | 7/2006 | Okuchi et al. | |
| D525,651 S | 7/2006 | Kato et al. | |
| D552,171 S | 10/2007 | Motoki | |
| D559,902 S | 1/2008 | Park et al. | |
| 8,016,224 B2 | 9/2011 | Bandholz et al. | |
| D675,253 S | 1/2013 | Kubota et al. | |
| D675,254 S | 1/2013 | Kubota et al. | |
| D675,255 S | 1/2013 | Kubota et al. | |
| D712,459 S | 9/2014 | Koshimori et al. | |
| D714,863 S | 10/2014 | Borkovec et al. | |
| 8,899,511 B2 * | 12/2014 | Takahashi | B65H 75/2416 242/598.3 |
| D726,815 S | 4/2015 | Tanaka | |
| D733,796 S | 7/2015 | Yamazaki | |
| D755,890 S | 5/2016 | Pender | |
| D757,172 S | 5/2016 | Tanaka | |
| D763,350 S | 8/2016 | Whittall et al. | |
| D783,714 S | 4/2017 | Nanno et al. | |
| D791,230 S | 7/2017 | Nakai et al. | |
| D793,473 S | 8/2017 | Kennedy et al. | |
| D805,579 S | 12/2017 | Murata et al. | |
| D824,441 S | 7/2018 | Fenton et al. | |
| D848,526 S | 5/2019 | Tsiopanos et al. | |
| D849,135 S | 5/2019 | Jeong | |
| 10,603,933 B2 * | 3/2020 | Tsuchida | B65H 75/241 |
| D933,744 S | 10/2021 | Ishimoto et al. | |
| 2008/0018037 A1 * | 1/2008 | Genta | B65H 75/246 269/57 |
| 2017/0036884 A1 * | 2/2017 | Cox | B65H 49/324 |
| 2020/0147984 A1 * | 5/2020 | Weeks | B41J 15/042 |
| 2022/0169053 A1 * | 6/2022 | Tomatsu | B65H 16/06 |
| 2025/0001775 A1 * | 1/2025 | Umeda | B41J 15/02 |

FOREIGN PATENT DOCUMENTS

| | | | |
|---|---|---|---|
| EP | 3323620 A1 | | 5/2018 |
| JP | H041176 Y2 | * | 1/1992 |
| JP | H1143245 A | | 2/1999 |
| JP | 4872738 B2 | * | 2/2012 |
| WO | 0202335 A1 | | 1/2002 |
| WO | 02057897 A2 | | 7/2002 |
| WO | 2015009849 A2 | | 1/2015 |

OTHER PUBLICATIONS

Brady Worldwide, Inc., "Raised Panel Labels for B30 Printers", retrieved on Mar. 13, 2024, 5 pages, available at: https://www.bradyid.com/labels/electrical-panel/b30-series-raised-profile-rectangular-labels-cps-brus-10067.

Brady Worldwide, Inc., "Magnetic Polyester Label Tape for B30 Printers", retrieved on Mar. 13, 2024, 5 pages, available at: https://www.bradyid.com/labels/b30-series-magnetic-labels-cps-brus-10059.

Brady Worldwide, Inc., "ToughWash Washdown Resistant Label Tape for B30 Printers", retrieved on Mar. 13, 2024, 5 pages, available at: https://www.bradyid.com/labels/washdown-resistant/b30-series-toughwash-washdown-resistant-labels-cps-brus-10058.

Brady Worldwide, Inc., "Repositionable Multi-Purpose Vinyl Label Tape for B30 Printers", retrieved on Mar. 13, 2024, 4 pages, available at: https://www.bradyid.com/labels/b30-series-repositionable-vinyl-labels-cps-brus-10061.

Brady Worldwide, Inc., "Product Identification Label Tape for B30 Printers", retrieved on Mar. 13, 2024, 5 pages, available at: https://www.bradyid.com/labels/b30-series-product-identification-labels-cps-brus-10065.

Brady Worldwide, Inc., "B30 Series ToughStripe Printable Floor Marking Tape", retrieved on Mar. 13, 2024, 5 pages, available at: https://www.bradyid.com/floor-tape/print-on-demand-toughstripe/b30-series-toughstripe-printable-floor-marking-tape-cps-brus-10060.

Brady Worldwide, Inc., "Raised Panel Labels, Push Button, for B30 Printers", retrieved on Mar. 13, 2024, 5 pages, available at: https://www.bradyid.com/labels/electrical-panel/b30-series-raised-profile-push-button-labels-cps-brus-10068.

Brady Worldwide, Inc., "Low-Halide Multi-Purpose Polyester Label Tape for B30 Printers", retrieved on Mar. 13, 2024, 5 pages, available at: https://www.bradyid.com/labels/aggressive-adhesive/b30-series-low-halide-polyester-labels-cps-brus-10055.

Brady Worldwide, Inc., "Retro Reflective All-Weather Label Tape for B30 Printers", retrieved on Mar. 13, 2024, 4 pages, available at: https://www.bradyid.com/labels/b30-series-retro-reflective-labels-cps-brus-10062.

Brady Worldwide, Inc., "Safety Tags - Polyester, Printable, Blank, for B30 Printers", retrieved on Mar. 13, 2024, 5 pages, available at: https://www.bradyid.com/tags/safety/safety-tags-polyester-printable-blank-for-b30-printers-cps-4453836.

Brady Worldwide, Inc., "B30 Series Metallized Polyester Labels", retrieved on Mar. 13, 2024, 6 pages, available at: https://www.bradyid.com/labels/metallic/b30-series-metallized-polyester-labels-pid-b30c-2250-565-sl.

Brady Worldwide, Inc., "B30 Series Pre-Printed GHS CLP Chemical Labels", retrieved on Mar. 13, 2024, 5 pages, available at: https://www.bradyid.com/labels/aggressive-adhesive/b30-series-pre-printed-ghs-clp-chemical-labels-cps-brus-10053.

Brady Worldwide, Inc., "All Weather Permanent Adhesive Vinyl Labels, Pre-printed Header, for B30 Printers", retrieved on Mar. 13, 2024, 4 pages, available at: https://www.bradyid.com/labels/aggressive-adhesive/b30-series-pre-printed-pre-cut-vinyl-blank-sign-headers-cps-brus-10056.

Brady Worldwide, Inc., "LOTO Tags—OSHA Danger, Printable Front, Blank Back, for B30 Printers", retrieved on Mar. 13, 2024, 7 pages, available at: https://www.bradyid.com/lockout-tagout/tags/loto-tags-osha-danger-printable-front-blank-back-for-b30-printers-pid-b30-255-851-oshada.

Brady Worldwide, Inc., "B30 Series Metallized Polyester Labels", retrieved on Mar. 13, 2024, 6 pages, available at: https://www.bradyid.com/labels/metallic/b30-series-metallized-polyester-labels-pid-b30c-4000-565-sl.

Brady Worldwide, Inc., "Water Soluble Paper Continuous Labels for B30 Printers", retrieved on Mar. 13, 2024, 4 pages, available at: https://www.bradyid.com/labels/laboratory/b30-series-water-dissolvable-paper-labels-cps-3053926.

Brady Worldwide, Inc., "All Weather Permanent Adhesive Vinyl Labels for B30 Printers", retrieved on Mar. 13, 2024, 4 pages, available at: https://www.bradyid.com/labels/aggressive-adhesive/b30-series-pre-cut-blank-sign-labels-cps-2142203.

Brady Worldwide, Inc., "B30 Series Tamper Evident Metallized Polyester Labels", retrieved on Mar. 13, 2024, 4 pages, available at: https://www.bradyid.com/labels/metallic/b30-series-tamper-evident-metallized-polyester-labels-cps-brus-10066.

Brady Worldwide, Inc., "B30 Series Heavy Duty Polyester Tags", retrieved on Mar. 13, 2024, 4 pages, available at: https://www.bradyid.com/labels/chemical-resistant/b30-series-heavy-duty-polyester-tags-cps-brus-10057.

(56) References Cited

OTHER PUBLICATIONS

Brady Worldwide, Inc., "All Weather Permanent Adhesive Vinyl Right-To-Know Labels for B30 Printers—1.125" ×3", Diamond NFR", retrieved on Mar. 13, 2024, 7 pages, available at: https://www.bradyid.com/labels/aggressive-adhesive/b30-series-rtk-indoor-outdoor-vinyl-labels-pid-b30-246-595-nfr.
Brady Worldwide, Inc., "B30 Series High Temperature Amber Polyimide Labels", retrieved on Mar. 13, 2024, 6 pages, available at: https://www.bradyid.com/barcode-labels/b30-series-high-temperature-amber-polyimide-labels-pid-b30c-4000-724.
Brady Worldwide, Inc., "PermaSleeve Heat Shrink Wire and Cable Labels, Double-sided, for B33 Printers", retrieved on Mar. 13, 2024, 4 pages, available at: https://www.bradyid.com/wire-cable-labels/heat-shrink-sleeves/b33-series-permasleeve-double-sided-polyolefin-wire-marking-sleeves-cps-brus-10089.
Brady Worldwide, Inc., "Solvent and Chemical Resistant Polyester for B33 Printers", retrieved on Mar. 13, 2024, 4 pages, available at: https://www.bradyid.com/labels/laboratory/solvent-chemical-resistant-polyester-for-b33-printers-cps-4689857.
Brady Worldwide, Inc., "Repositionable Multi-Purpose Vinyl Cloth Label Tape for B33 Printers", retrieved on Mar. 13, 2024, 3 pages, available at: https://www.bradyid.com/labels/b33-continuous-coated-vinyl-cloth-repositionable-adhesive-labels-cps-2840745.
Brady Worldwide, Inc., "B30 Series High Temperature Glossy Polyimide Labels", retrieved on Mar. 13, 2024, 6 pages, available at: https://www.bradyid.com/barcode-labels/b30-series-high-temperature-glossy-polyimide-labels-pid-b30c-4000-727.
Partial European Search Report issued by European Patent Office for European Patent Application No. 25162895.4 dated Nov. 25, 2025, 14 pages.

* cited by examiner

PRINTER MATERIAL HOLDER SYSTEM AND METHOD

CROSS-REFERENCE TO RELATED APPLICATIONS

None.

BACKGROUND

Printers designed to print images, text, or other graphics on various forms of printable media (e.g., labels, signs, stickers, tags, magnets, rolls of paper, plastic, or other material, and the like) generally employ material holders to retain and dispense rolls of printable media when the printer is in use. In most cases, these material holders include side flanges that flank the roll of printable media and hold it in place. However, these side flanges often have a circular or similarly rounded shape, which can cause the material holder to be susceptible to unintentionally rolling or falling when placed on a smooth or sloped surface, for example, during transit or during installation.

Many material holders are difficult for users to handle, in part due to their generally rounded construction and smooth surfaces. For example, users may have difficulty gripping and picking up material holders, particularly when installing or removing rolls of media from a printer with many complex and tightly packed parts. The absence of handles, flat surfaces, or other features that might facilitate conveniently gripping and otherwise handling the material holder can increase the difficulty of tasks associated with operation or maintenance of the printer (e.g., installing a new roll of media). This can lead to inconvenience, frustration, accidental drops, and other undesirable outcomes for consumers.

Material holders may also be a source of waste or pollution as they are typically made from plastic or other synthetic materials. Most material holders include a variety of unique, complicated parts, which makes them more difficult to manufacture, more susceptible to damage or failure, and thus more likely to need replacement. Ultimately, it means they have a shorter life span. Furthermore, many material holders are manufactured for use only with printable media of a particular size and are constructed symmetrically about a roll of media of that particular size. The lack of interchangeability and/or re-usability leads to increased costs for consumers who wish to print on media of different sizes.

In view of the above problems, there exists a need for a material holder that is resistant to rolling on smooth or sloped surfaces, convenient to handle during installation and maintenance, and is capable of being manufactured more easily and/or efficiently by using fewer parts or less overall material. It is also desirable that a material holder be reusable, thereby cutting down on cost to users and potentially reducing environmental waste.

SUMMARY

The present disclosure is directed to a material holder for use in a printer.

A material holder for use in a printer is disclosed. The material holder includes a frame provided in the form of a first flange and a second flange. The first flange has a first body defined by a first outer perimeter circumscribing the first body, and a first bore forming an opening in the first body. The second flange has a second body defined by a second outer perimeter circumscribing the second body, and a second bore forming an opening in the second body. The material holder also includes a spindle with an arm extending through and engaging each of the first bore and the second bore, and a keyhole region defining a first handle extending upwardly therefrom. The material holder also includes a side clip including a second handle extending upwardly therefrom coupled to a first end of the arm.

In some aspects, the first flange and the second flange are each imparted with a substantially polygonal shape and the first outer perimeter and the second outer perimeter each comprise a plurality of flat edges.

In some aspects, the first flange and the second flange are each substantially octagonal.

In some aspects, at least one material viewing window extends through at least one of the first flange and the second flange.

In some aspects, the material viewing window of at least one of the first flange and the second flange includes a core viewing notch configured to align with a core of a media roll installed on the material holder. The core may be viewed through the viewing notch to estimate a remaining life span of the media roll.

In some aspects, each of the first flange and the second flange further includes a first outer locating notch positioned along the first or second outer perimeter and a second outer locating notch positioned along the first or second outer perimeter opposite from the first outer locating notch. Either of the first or the second flange may be oriented centrally and symmetrically with respect to a media roll by comparing the portion of the media roll visible through the first outer locating notch with the portion of the media roll visible through the second outer locating notch and adjusting the position of the media roll until the two portions are roughly equal in area.

In some aspects, the side clip further includes a living hinge, a first half hingedly coupled to the living hinge, and a second half hingedly coupled to the living hinge. The first half is designed to releasably rotate relative to the second half about the living hinge.

In some aspects, the side clip further includes a first locking mechanism and a second locking mechanism different from the first locking mechanism.

In some aspects, the first flange and the second flange each further include a toothed ring disposed about either the first bore or the second bore, and a plurality of barbs coupled to and extending outwardly from the toothed ring. The plurality of barbs are configured to engage a core of a media roll when the media roll is disposed in the material holder.

In some aspects, the spindle further includes a locating wall to ensure that the material holder is oriented correctly when installed in the printer.

In some aspects, at least one of the first flange or the second flange includes a driven gear configured to engage a gear drive assembly of the printer so the printer can drive rotation of at least one of the first flange or the second flange when the material holder is in use.

In some aspects, the printer is provided in the form of an inkjet printer, a thermal printer, or a laser printer.

A material holder for use in a printer is also disclosed. The material holder includes a media roll having a substantially hollow core defining an opening, a media supply wound about the core, and a spindle having an arm extending through the opening and a keyhole region providing an elongate handle surface. A first flange is positioned between the media roll and the keyhole region and a second flange is positioned adjacent to the media roll and opposing the first flange. A side clip is coupled to the arm and positioned adjacent to the second flange.

In some aspects, the first flange and the second flange are each defined by a plurality of flat edges.

In some aspects, the first flange and the second flange are each substantially octagonal in shape.

In some aspects, the first flange and the second flange each further include at least one material viewing window. The material viewing window may expose at least a portion of the media roll to a user such that the user can estimate the portion of the life span of the media roll that remains before the media roll must be replaced.

In some aspects, the side clip further includes a second elongated handle surface.

In some aspects, the elongate handle surface and the second elongate handle surface each extend in the same direction with respect to the media roll.

In some aspects, the spindle further includes a spring tab configured to receive the first flange. The first flange is positioned adjacent to the keyhole region when the first flange is received by the spring tab.

A method of assembling a material holder for use in printer is also disclosed. The method includes inserting an arm of a spindle into a first bore of a first flange. The first bore is configured to permit the first flange to rotate about the arm. The method further includes inserting the arm into a core of a media roll such that the media roll is positioned adjacent to a first toothed ring of the first flange, whereby the first toothed ring includes a first plurality of barbs. The method further includes pressing the media roll into the first flange such that the first plurality of barbs engage the core. The method further includes inserting the arm into a second bore of a second flange. The second bore of the second flange is configured to permit the second flange to rotate about the arm. The second flange is configured such that a second toothed ring of the second flange is aligned with the core of the media roll and the second toothed ring includes a second plurality of barbs. The method further includes pressing the second flange into the media roll such that the second plurality of barbs engage the core. The method further includes coupling a side clip to the arm, the side clip positioned adjacent to the second flange and configured to prevent each of the first flange, the media roll, and the second flange from sliding along the arm.

Figure 1:
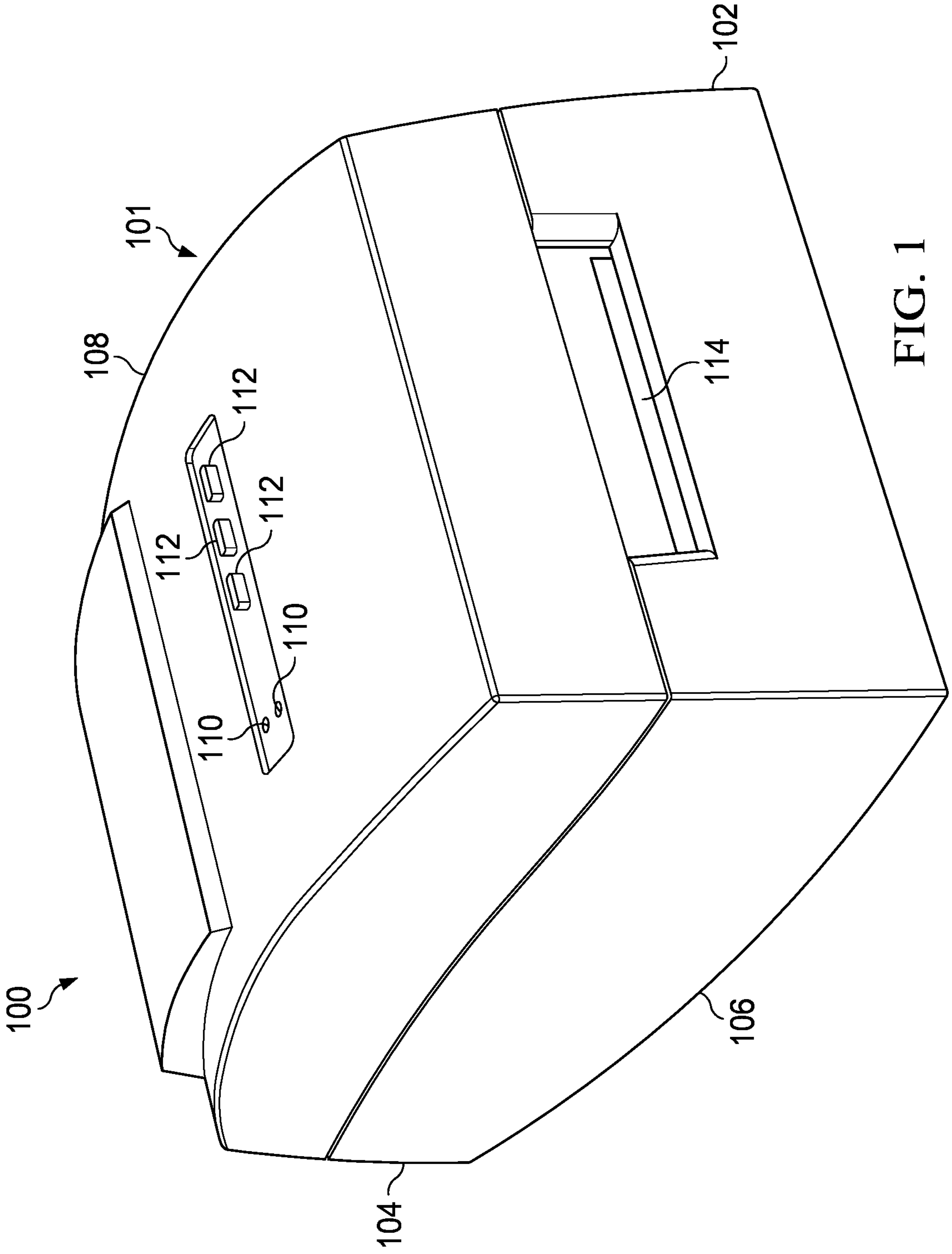
FIG. 1 illustrates an isometric view of a first exemplary printer.

While the disclosure is susceptible to various modifications and alternative forms, a specific embodiment thereof is shown by way of example in the drawings and will herein be described in detail. It should be understood, however, that the drawings and detailed description presented herein are not intended to limit the disclosure to the particular embodiment disclosed, but to the contrary, the intention is to cover all modifications, equivalents, and alternatives falling within the spirit and scope of the present disclosure as defined by the appended claims.

DETAILED DESCRIPTION

Before any embodiments are described in detail, it is to be understood that the disclosure is not limited in its application to the details of construction and the arrangement of components set forth in the following description or illustrated in the following drawings, which is limited only by the claims that follow the present disclosure. The disclosure is capable of other embodiments, and of being practiced, or of being carried out, in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

The following description is presented to enable a person skilled in the art to make and use embodiments of the disclosure. Various modifications to the illustrated embodiments will be readily apparent to those skilled in the art, and the generic principles herein can be applied to other embodiments and applications without departing from embodiments of the disclosure. Thus, embodiments of the disclosure are not intended to be limited to embodiments shown but are to be accorded the widest scope consistent with the principles and features disclosed herein. The following detailed description is to be read with reference to the figures, in which like elements in different figures have like reference numerals. Skilled artisans will recognize the examples provided herein have many useful alternatives and fall within the scope of embodiments of the disclosure.

Additionally, while the following discussion may describe features associated with specific devices or embodiments, it is understood that additional devices and/or features can be used with the described systems and methods, and that the discussed devices and features are used to provide examples of possible embodiments, without being limited.

The present disclosure is directed to a material holder designed to retain and dispense rolls of printable media having various widths. The material holder may be used with a variety of classes of printers. For example, the material holder may be used with one or more of an inkjet printer, a thermal printer, a laser printer, or any other suitable device capable of printing text, images, or other graphics onto printable media.

Figure 2:
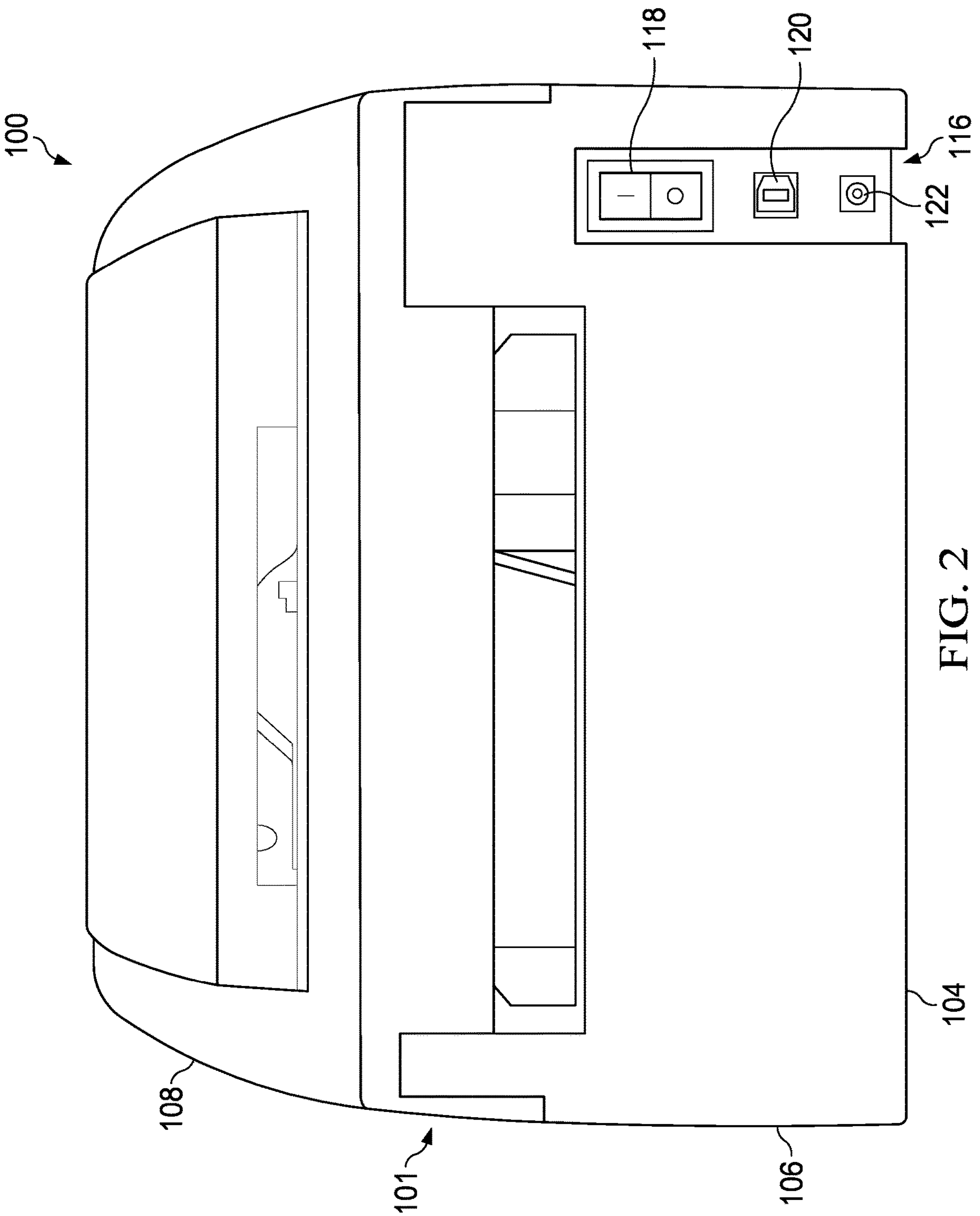
FIG. 2 illustrates a rear elevational view of the printer of FIG. 1.
Figure 3:
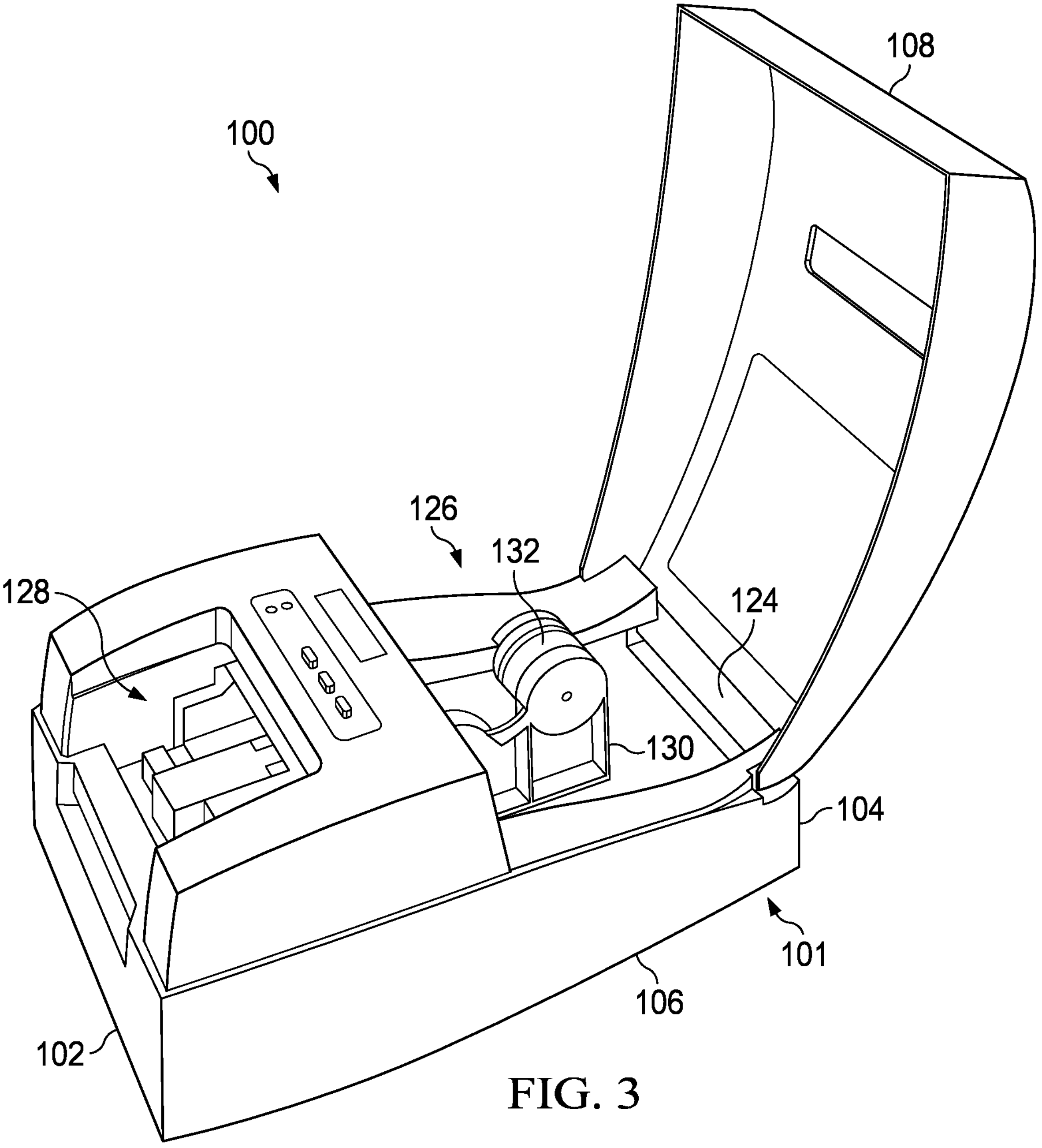
FIG. 3 illustrates an isometric view of the printer of FIG. 1 in an open configuration.

Referring first to FIGS. 1-3, an exemplary inkjet printer 100 may have a housing 101 defining a first end 102 (e.g., at a front of the printer) and a second end 104 opposing the first end 102 (e.g., at a rear of the printer). The housing 101 of the inkjet printer 100 is provided in the form of a base portion 106 and an enclosure cover 108. The base portion 106 and the enclosure cover 108 may be hingedly attached or otherwise coupled to one another such that the enclosure cover 108 may be removably opened and/or attached to allow access to the internal components of the inkjet printer 100 and to allow for installation or maintenance of the internal parts. The enclosure cover 108 may be coupled to the base portion 106 via a hinge 124 or other attachment means (see FIG. 3).

The inkjet printer 100 may include one or more indicators 110 and one or more buttons 112 disposed on the enclosure cover 108. In the example of FIG. 1, the inkjet printer 100 includes two indicators 110 and three buttons 112. However, the inkjet printer 100 may include any number of indicators 110 and/or buttons 112. The indicators 110 may be arranged to alert a user to various conditions of operation of the inkjet printer 100. For example, an indicator 110 may be provided in the form of a light emitting diode (LED) configured to indicate to a user when the inkjet printer 100 is powered on or when the inkjet printer 100 is low on ink. Alternatively, the indicators 110 can serve any other suitable purpose. The buttons 112 may be arranged to allow a user to operate, service, or otherwise interface with the inkjet printer 100. For example, a button 112 may be configured to allow a user to load the inkjet printer 100 with new printable media. In some forms, depressing or otherwise actuating the button 112 will cause the enclosure cover 108 to disengage from the base portion 106.

The inkjet printer 100 may include a rectilinear exit slot 114 positioned on and extending through the base portion 106. For example, the exit slot 114 may be provided in the form of a "mouth" or opening disposed on the base portion 106 at the first end 102. Media that has been printed on by the inkjet printer 100 may exit the inkjet printer 100 at the exit slot 114 where it may be retrieved by a user.

Turning to FIG. 2, the inkjet printer 100 may have a control region 116 disposed on the base portion 106. For example, the control region 116 may be positioned on the base portion 106 at the second end 104. In the illustrated example, the control region 116 may include a power switch 118, an input port 120, and a power port 122. The power port 122 may facilitate coupling between the inkjet printer 100 and an external power source such that a user may power on the inkjet printer 100 using the power switch 118. The input port 120 may facilitate coupling or communication between the inkjet printer 100 and an external device (e.g., a smartphone, desktop computer, digital camera, etc.).

As shown in FIG. 3, the enclosure cover 108 of the inkjet printer 100 is designed to rotate into an open configuration. The enclosure cover 108 may be rotatable about an axis of connection formed by the hinge 124. Thus, a user may place the inkjet printer 100 in the open configuration by lifting the enclosure cover 108 away from the base portion 106 and causing it to rotate about the hinge 124.

The base portion 106 may include a media region 126 proximate to the first end 102 and a printing region 128 proximate to the second end 104. The media region 126 may include a mount 130 capable of supporting media 132 (e.g., a roll of printable labels) for printing. The printing region 128 may include one or more of a printhead (not shown), ink cartridges (not shown), electronic circuitry or controls (not shown), a waste area (not shown), or any other element or mechanism that facilitates printing images, text, or other graphics on the media 132.

Although a specific exemplary inkjet printer 100 is described, it should be appreciated that the inkjet printer 100 for use with the material holder disclosed herein may include or omit additional components as known in the art.

Figure 4:
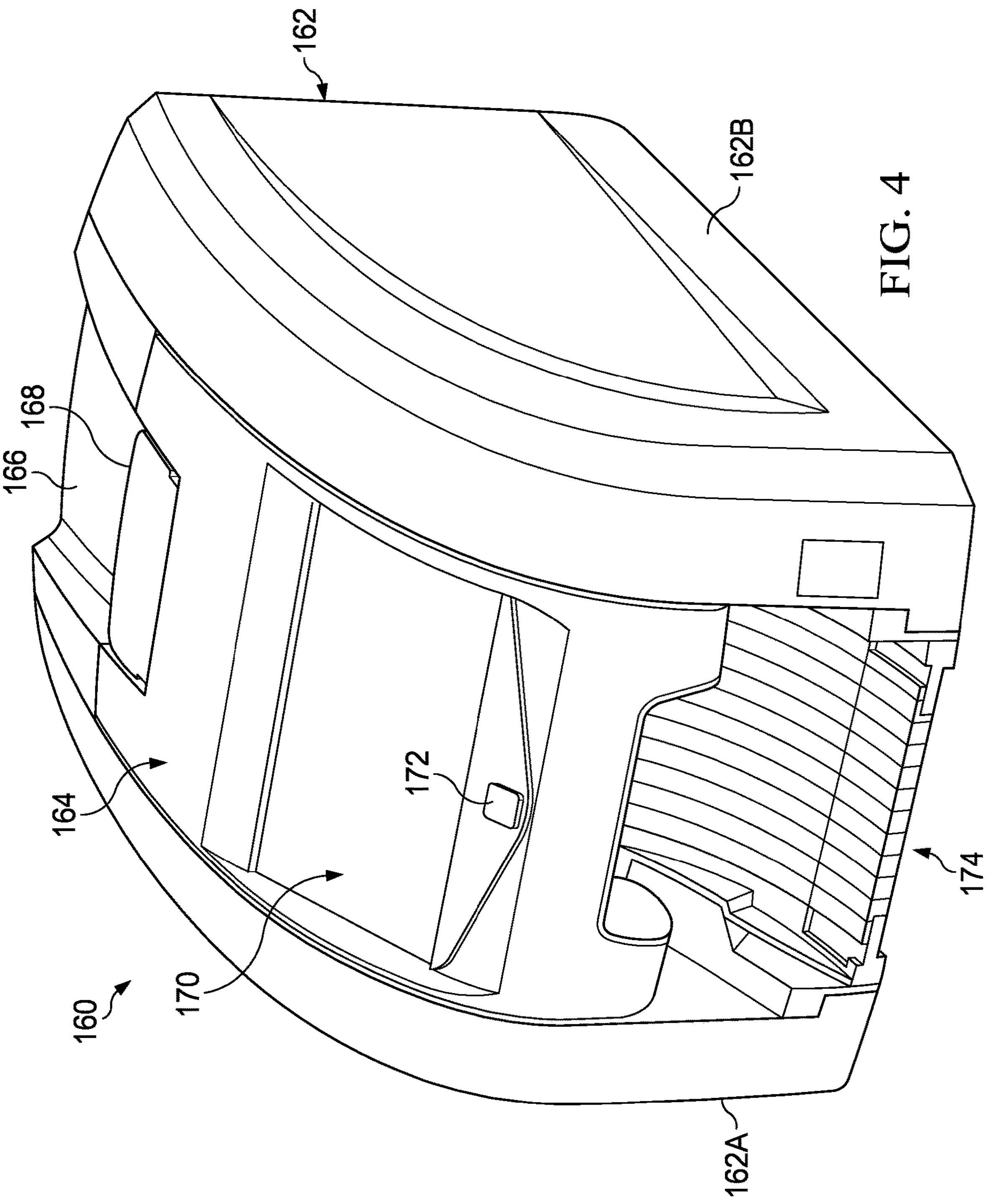
FIG. 4 illustrates an isometric view of a second exemplary printer.
Figure 5:
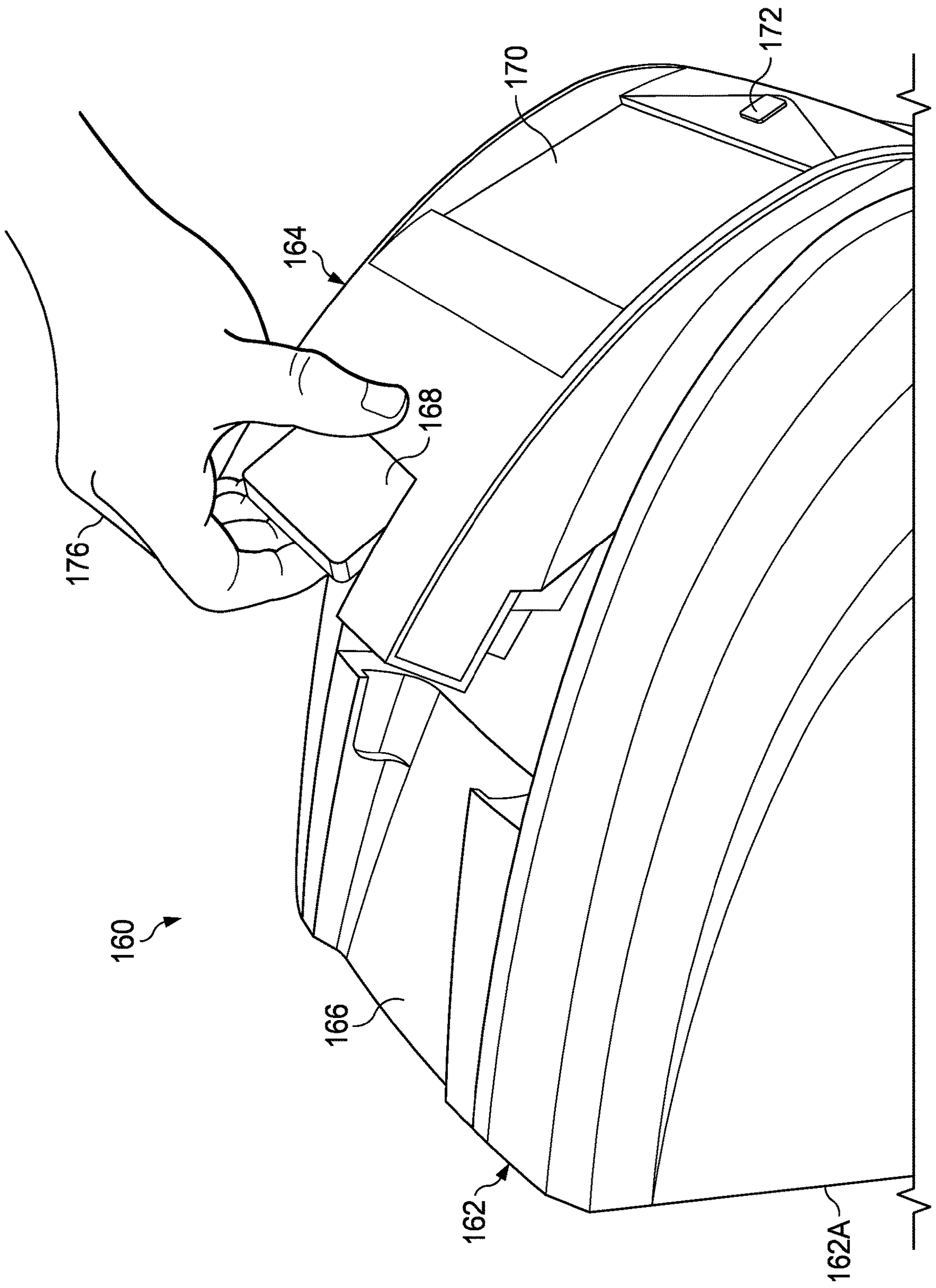
FIG. 5 illustrates an isometric view of the printer of FIG. 4 in transition between a closed configuration and an open configuration.
Figure 6:
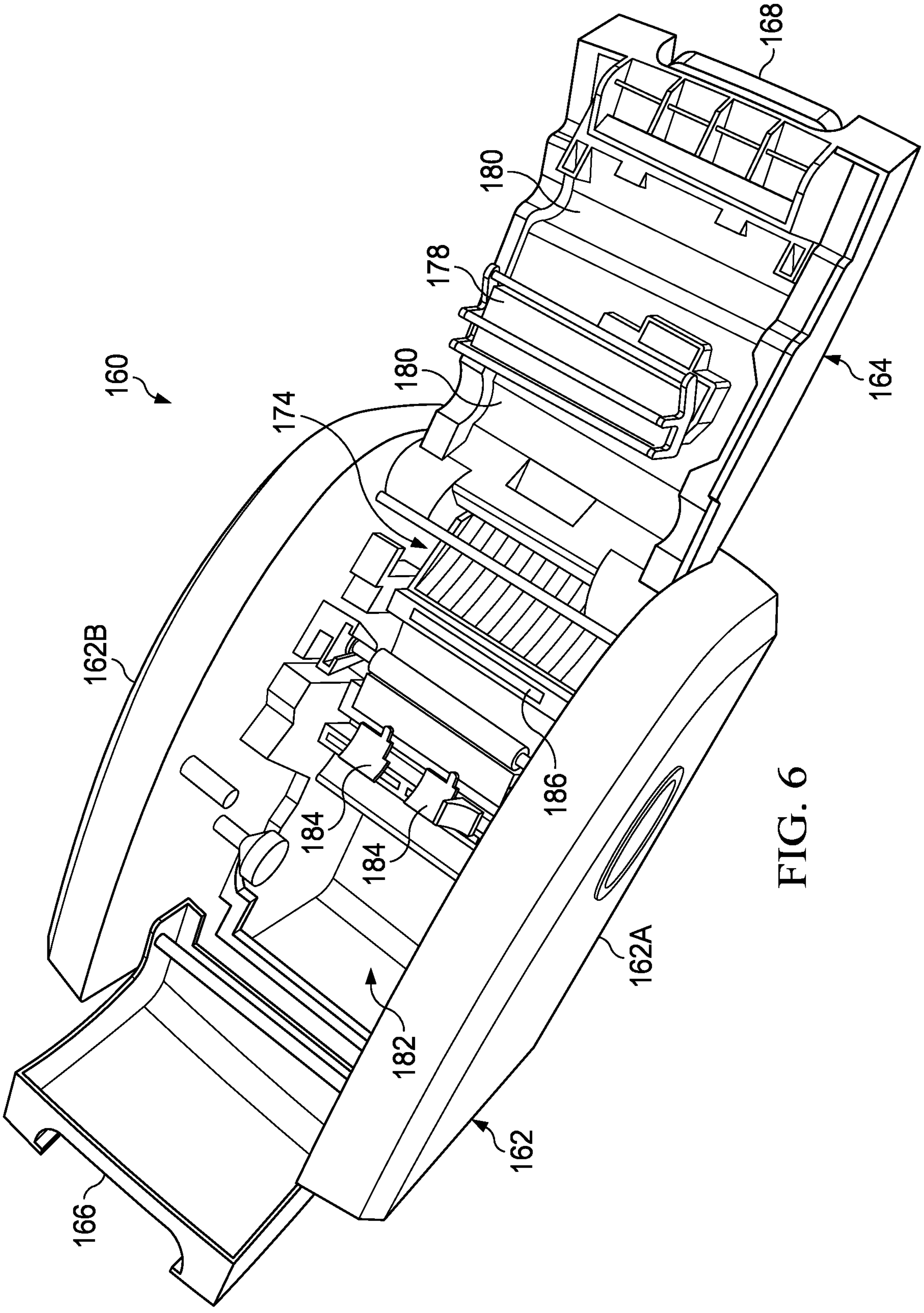
FIG. 6 illustrates a top isometric view of the printer of FIG. 4 in a fully open configuration.

Referring now to FIGS. 4-6, an exemplary thermal printer 160 for use with the material holder disclosed herein is depicted. The thermal printer 160 may be provided in the form of a direct thermal printer, a thermal transfer printer, a handheld thermal printer, or any other comparable device. The thermal printer 160 includes a body 162 defined by a first body portion 162A and a second body portion 162B opposing the first body portion 162A. The thermal printer 160 may include a first cover panel 164 and a second cover panel 166. The first and second body portions 162A, 162B together with the first and second cover panels 164, 166 may define an enclosure that retains the internal components of the thermal printer 160. The first cover panel 164 may include one or more of a release latch 168, a display 170, and a power button 172. The thermal printer 160 may include an output region 174 disposed beneath the first cover panel 164 and extending between the first body portion 162A and the second body portion 162B.

Turning to FIG. 5, the thermal printer 160 may be designed to articulate between a closed position whereby the second cover panel 166 is flush with the first cover panel 164, and an open position, thereby exposing the components enclosed within the first and second body portions 162A, 162B and the first and second cover panels 164, 166. The release latch 168 may engage a connection between the first and second cover panels 164, 166 such that a user 176 may separate or de-couple the first and second cover panels 164, 166 by pulling up on the release latch 168. The first and second cover panels 164, 166 may each be hingedly connected to the first and second body portions 162A, 162B via a hinge (not shown) or other connection means. Thus, when the release latch 168 is pulled by the user 176, the user 176 may then move each of the first and second cover panels 164, 166 up and away from the enclosed space, thereby exposing the internal components of the thermal printer 160.

Referring now to FIG. 6, the thermal printer 160 may include a printhead 178 and a ribbon holder 180 positioned on an interior surface of the first cover panel 164. A label well 182 may be positioned underneath the second cover panel 166, and one or more media guides 184 may be positioned between the label well 182 and the output region 174. The thermal printer 160 may include a cutter 186 positioned between the media guides 184 and the output region 174. Thus, printable media (e.g., a roll of printable labels) may be installed in the label well 182 before the thermal printer 160 is used. Such printable media may be fed through the media guides 184, printed on by the printhead 178 and ribbon (not shown) disposed in the ribbon holder 180, and cut by the cutter 186 before being dispensed from the thermal printer 160 via the output region 174.

Although a specific exemplary thermal printer 160 is described, it should be appreciated that the thermal printer 160 for use with the material holder disclosed herein may include or omit additional components as known in the art.

Figure 7:
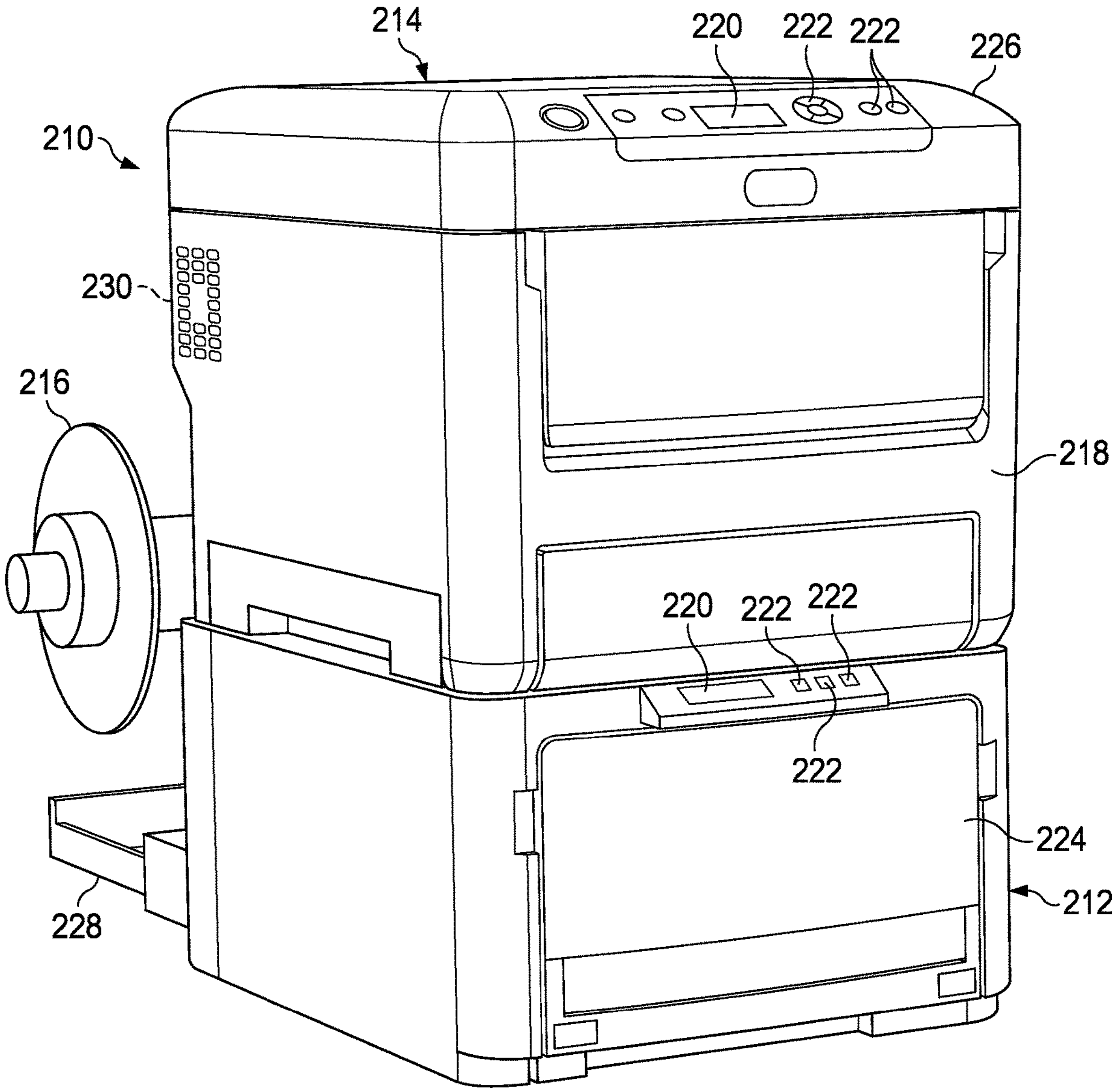
FIG. 7 illustrates an isometric view of a third exemplary printer.
Figure 8:
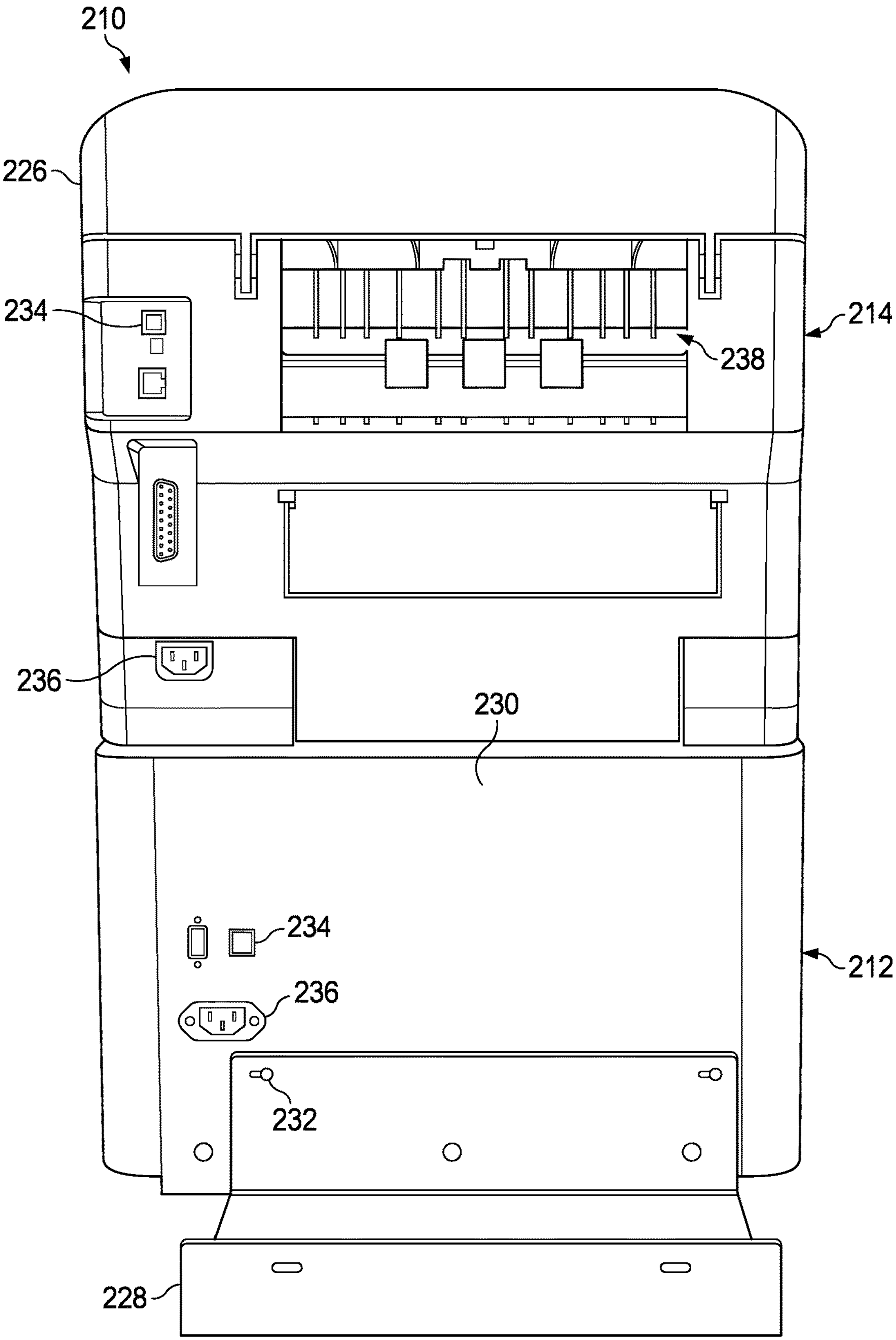
FIG. 8 illustrates a rear elevational view of the printer of FIG. 7.
Figure 9:
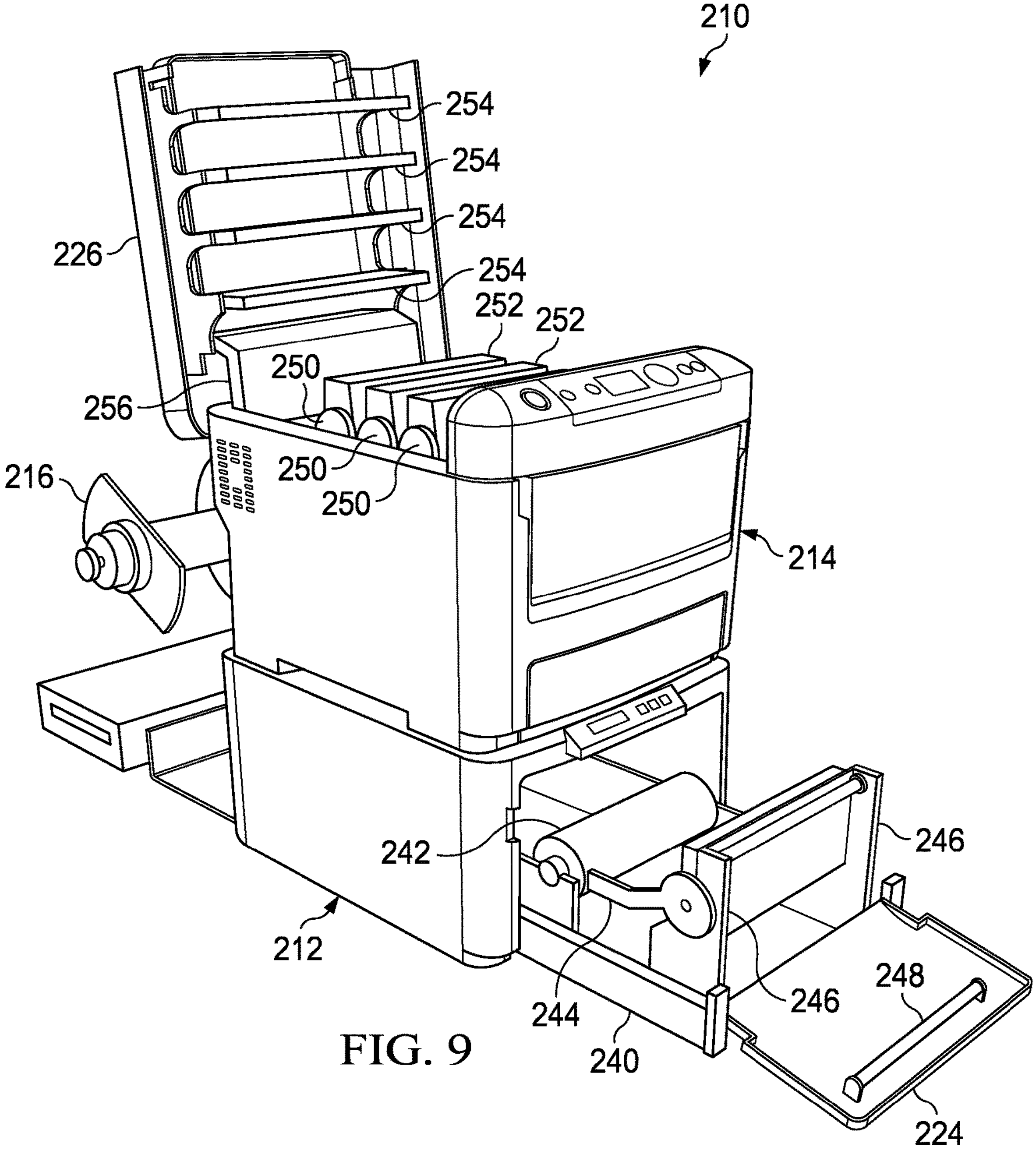
FIG. 9 illustrates an isometric view of the printer of FIG. 7 in an open configuration.

Turning to FIGS. 7-9, an exemplary LED or laser printer 210 may include a feeder assembly 212, a printer device 214 positioned on and supported by the feeder assembly 212, and a rewinder 216. On a front side 218 of the laser printer 210, one or more of the feeder assembly 212 and/or the printer device 214 may include a display 220 via which a user may interact with the laser printer 210 and one or more buttons 222 which may correspond to various settings or functionalities of the laser printer 210. The feeder assembly may include a front cover 224 positioned on the front side 218. The printer device 214 may include a top cover 226 positioned opposite the feeder assembly 212. The rewinder 216 may be positioned on a support plate 228. As shown best in FIG. 8, showing a back side 230 of the laser printer 210 without the rewinder 216, the support plate 228 may be coupled to the back side 230 via one or more fasteners 232. The laser printer 210 may also include one or more ports 234, one or more power outlets 236, and an exit slot 238 positioned on the back side 230.

Referring to FIG. 9, the front cover 224 and top cover 226 may be opened to expose various internal components of the feeder assembly 212 and printer device 214, respectively. Internal components of the feeder assembly 212 may be positioned on and supported by a tray 240. The tray 240 may be slidably coupled to the feeder assembly 212 such that it may be retracted when the front cover 224 is opened. The tray 240 of the feeder assembly 212 may support one or more of a spindle pin 242, an extension arm 244, one or more media guides 246, and a static bar 248. The spindle pin 242 may provide a rotatable support structure for printable media to be imprinted by the printer device 214. The extension arm 244 and media guides 246 may help support or guide the media toward an opening (not shown) through which the media may pass from the feeder assembly 212 to the printer device 214. The media may be directed to pass over the static bar 248 before entering the printer device 214 and the static bar 248 may condition the media to attract toner (e.g., by imparting the media with an electrical charge).

Internal components of the printer device 214 may include one or more drum units 250, one or more toner cartridges 252, and one or more LED heads 254. In the exemplary printer of FIG. 9, the printer device 214 may include four drum units 250, four toner cartridges 252 (e.g., C, M, Y, and K toners), and four LED heads 254. The drum units 250 may be imparted uniformly or substantially uniformly with an initial electrical charge. For example, the printer device 214 may include a high voltage wire or a charge roller (not shown) configured to impart an electrical charge upon the drum units 250. The LED heads 254 may be arranged to direct light toward the drum units 250 and the light produced by the LED heads 254 may reverse the localized electrical charge of the drum units 250 in the areas impacted by the light. Thus, the LED heads 254 may selectively direct light toward particular areas of the drum units 250 that correspond to the image or text being printed.

Areas of the drum units 250 whose electrical charge has been reversed by the LED heads 254 may attract toner from the toner cartridges 252 (e.g., the toner may be imparted with an opposite electrical charge relative to the areas of the drum units 250 impacted by the LED heads 254). The toner may then be transferred to the printable media being fed to the printer device 214 from the feeder assembly 212 as the media (having been charged by the static bar 248) passes over the drum units 250. The media may then pass through a fuser (not shown), which may be provided in the form of one or more heated rollers that may melt the toner, thereby "fusing" the toner or otherwise causing the toner to adhere to the media. The printer device 214 may include a fuser release lever 256 extending upwardly from the fuser (not shown) such that a user may lift or remove the fuser from the printer device 214 (e.g., for maintenance).

In some instances, the printer device 214 may include a laser beam (not shown) and one or more mirrors (not shown) in lieu of the LED heads 254. In these instances, the laser beam may be selectively directed toward the drum units 250 to reverse the localized electrical charge in areas corresponding to the text or image being printed such that toner is attracted to those areas. The laser beam may be static, and a movable mirror or a plurality of movable mirrors may be configured to direct the laser beam toward particular areas of the drum units 250.

Although a specific exemplary laser printer 210 is described, it should be appreciated that the laser printer 210 for use with the material holder disclosed herein may include or omit additional components as known in the art.

Figure 10:
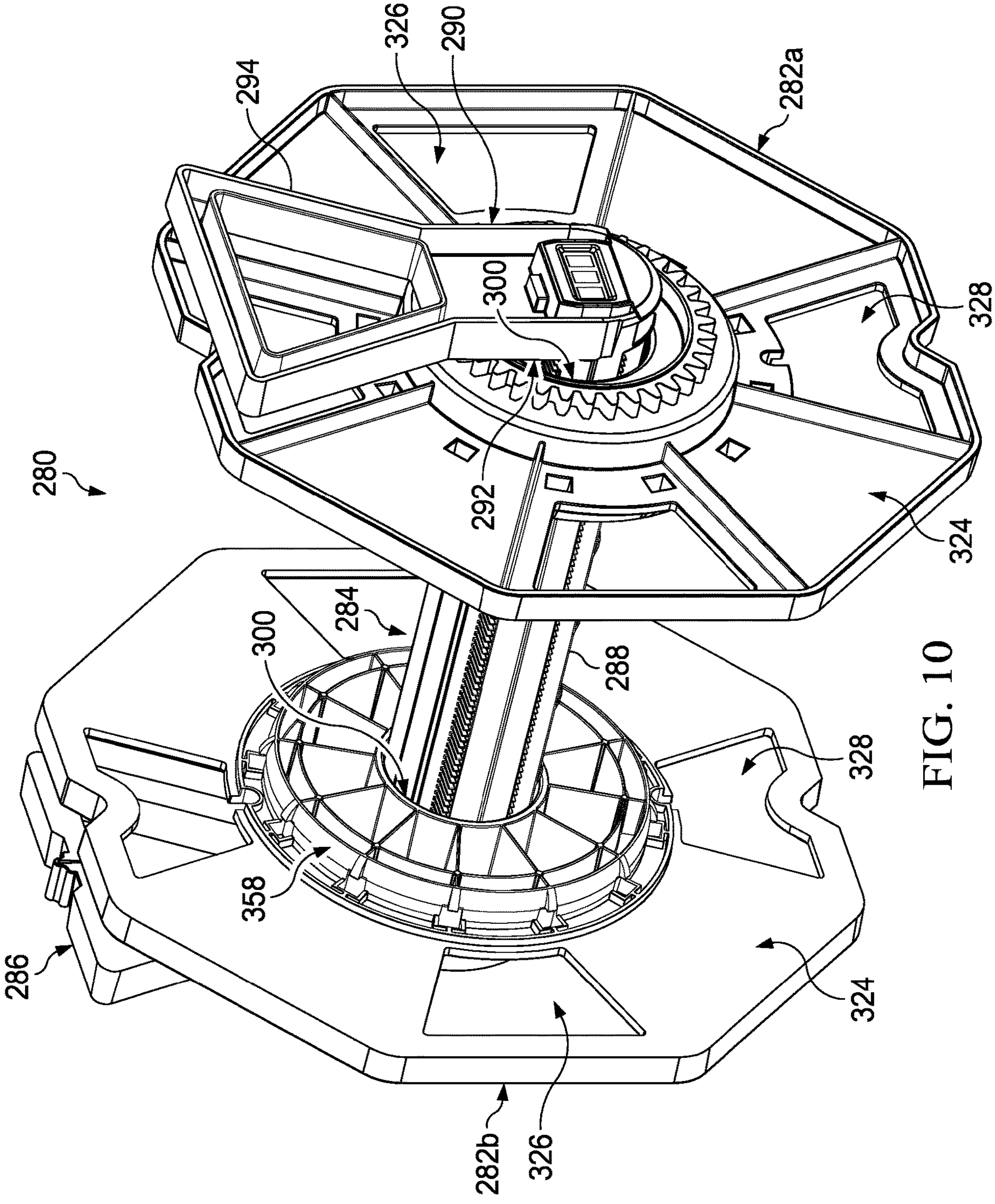
FIG. 10 illustrates a first side isometric view of a material holder for use with one or more of the printers of FIGS. 1-9 constructed according to the teachings of the present disclosure.

Now turning to FIG. 10, a material holder 280 may be designed to retain and support rolls of printable media having various widths. The material holder 280 may be used with the inkjet printer 100, thermal printer 160, laser printer 210, or any other suitable printing device. For example, the material holder 280 may be installed in the media region 126 of the inkjet printer 100, the label well 182 of the thermal printer 160, or within the feeder assembly 212 of the laser printer 210. The material holder 280 may be installed within or otherwise configured for use with the printers disclosed herein in manners known in the art.

The material holder 280 is provided in the form of a frame having two opposing flanges 282*a*, 282*b*, a spindle 284 disposed therebetween, and a side clip 286. As best seen in FIG. 10, the flanges 282*a*, 282*b* may be substantially identical with respect to each other. It is envisioned, however, that in other instances the material holder 280 may include one or more flanges 282 that are not identical.

Figure 11:
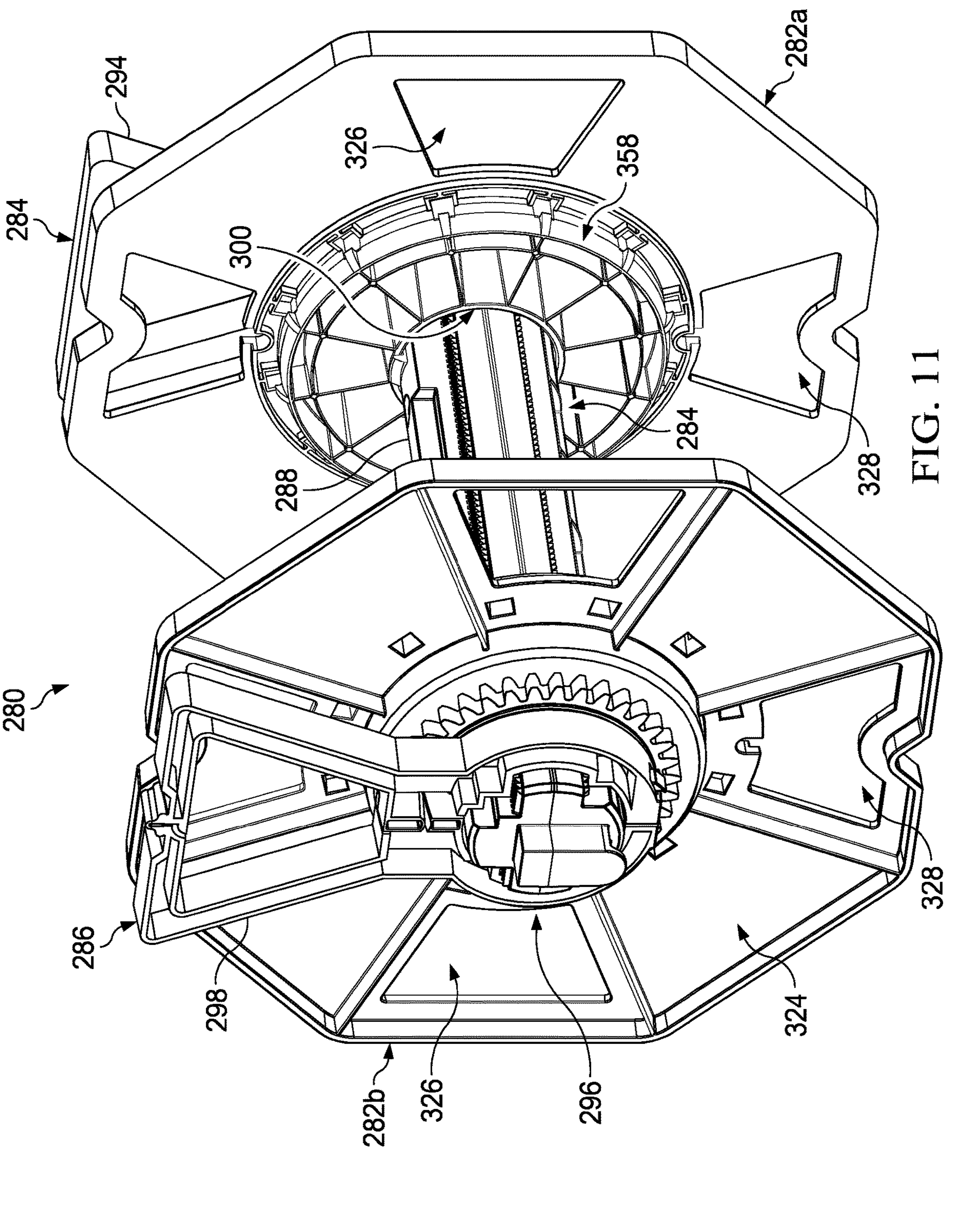
FIG. 11 illustrates a second side isometric view of the material holder of FIG. 10.
Figure 12:
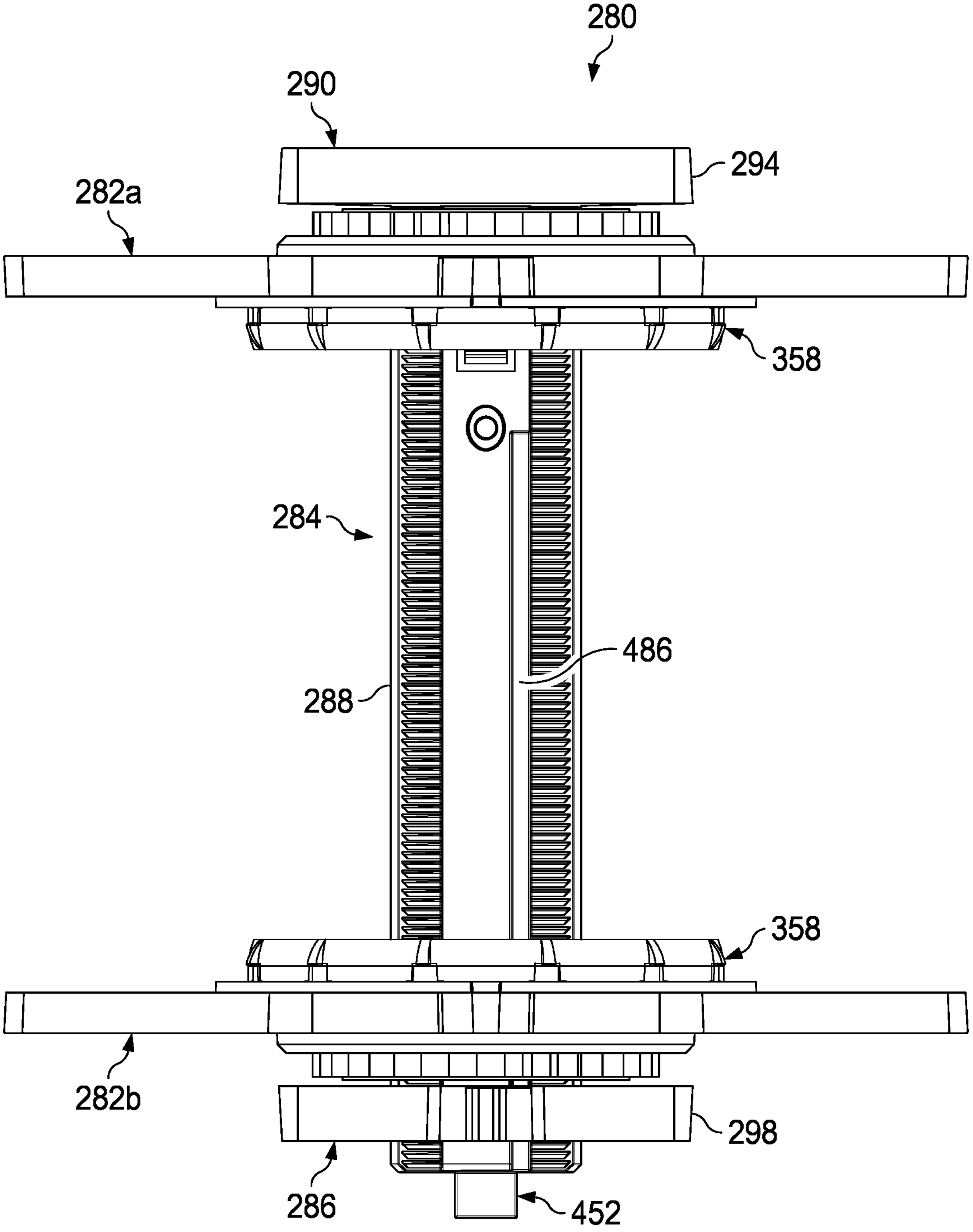
FIG. 12 illustrates a top plan view of the material holder of FIG. 10.
Figure 13:
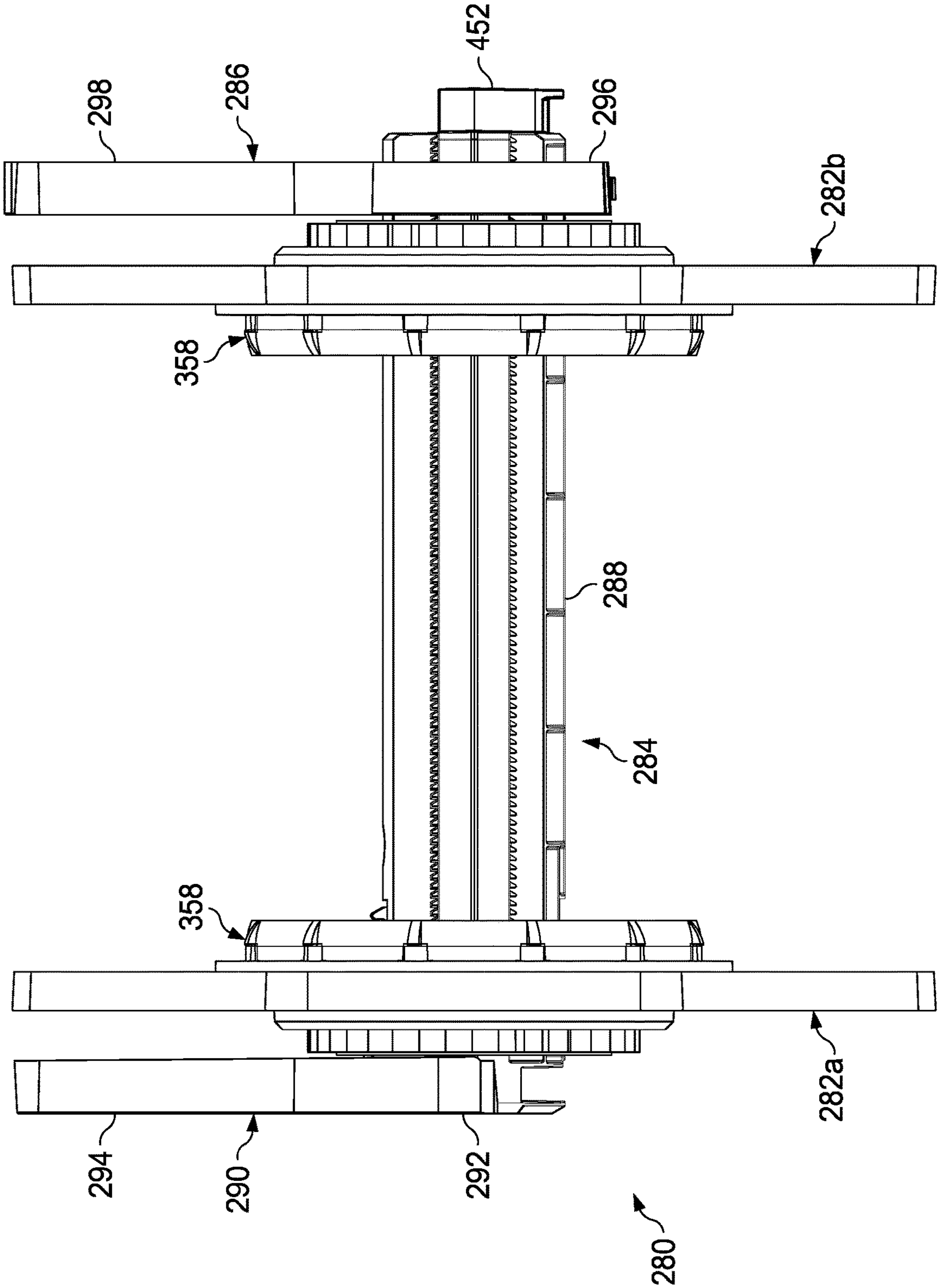
FIG. 13 illustrates a front elevational view of the material holder of FIG. 10.

The spindle 284 extends between the flanges 282*a*, 282*b* and includes a substantially cylindrical arm 288 and a keyhole region 290 at an end thereof. The keyhole region 290 may include a base 292 and a spindle handle 294 coupled to and extending upwardly from the base 292. As best shown in FIG. 11, the side clip 286 may include an attachment zone 296 and a discontinuous side clip handle 298 positioned above the attachment zone 296 and connected thereto. The shape of the side clip 286 may mirror or be substantially similar to the shape of the keyhole region 290 of the spindle 284. For example, the shape of the spindle handle 294 may be identical to or may mirror the shape of the side clip handle 298.

Each flange 282 may include a central opening 300 configured to allow the arm 288 of the spindle 284 to pass therethrough. For example, the geometry of the opening 300 may substantially mirror the external geometry of the arm 288 or may be substantially circular. Thus, each opening 300 may receive the arm 288 of the spindle 284 such that each of the flanges 282*a*, 282*b* may be slidably or adjustably coupled to the spindle 284 at any position along the arm 288. At the same time, the flanges 282*a*, 282*b* may be configured to rotate about the arm 288. The flanges 282*a*, 282*b* may be arranged on the spindle 284 such that the flanges 282*a*, 282*b* are spaced apart from one another along the arm 288. As shown best in FIG. 11, the attachment zone 296 of the side clip 286 may be designed to facilitate a secure attachment of the side clip 286 to the spindle 284 along the length of the arm 288. For example, the side clip 286 may be attached to the spindle 284 such that the side clip 286 is disposed along the arm 288 in a location adjacent to the flange 282*b* and opposite the flange 282*a*.

In some instances, the flanges 282, spindle 284, and side clip 286 may be formed from high density polyethylene (HDPE). For example, the flanges 282, spindle 284, and side clip 286 may be formed from Hostalen GC 7260, which has a resin code of 2 (e.g., it is highly recyclable). The flanges 282, spindle 284, and side clip 286 may also be formed from polypropylene, although polypropylene may be less recyclable than HDPE. In other instances, the flanges 282, spindle 284, and side clip 286 may be formed from any suitable material having a coefficient of friction of from greater than 0 to less than about 0.4 and/or a resin code of 1 or 2.

Now turning to FIGS. 14-19, each flange 282 may be imparted with a substantially polygonal shape. A "polygonal shape" is a closed-plane figure bounded by at least three sides. In one instance depicted in FIG. 14, each flange 282 may be substantially octagonal in shape. However, in other instances, each flange 282 may be substantially triangular, quadrilateral, pentagonal, or any other suitable shape, including irregular shapes. Imparting the flange 282 with a polygonal shape having edges that are substantially flat may cause the flange 282 to be resistant to rolling on smooth and/or sloped surfaces or cause a higher resistance due to friction.

An annular ring 302 may be provided in a central position on an outside face 304 of the flange 282. The ring 302 may be formed integrally with the flange 282, or the ring 302 may be coupled to the outside face 304 and extend outwardly therefrom. The ring 302 may include an exterior surface 306 and a first interior surface 308, each of which may be substantially smooth. The first interior surface 308 of the ring 302 may be imparted with a size and shape substantially equal to the size and shape of the opening 300. The first interior surface 308 may align with and be substantially equal in size and shape to a first bearing surface 301. The first bearing surface 301 may be substantially cylindrical in shape and may define the opening 300. The ring 302 may also have a stepped annular face 310 adjoined with and extending between the exterior surface 306 and first interior surface 308.

In addition, each flange 282 may include a driven gear 312 connected to the ring 302. The driven gear 312 may be formed integrally with the ring 302 or may be coupled to the annular face 310 of the ring 302 and protrude outwardly therefrom. The driven gear 312 may be substantially annular in shape and may be substantially coaxial with the ring 302. A second interior surface 314 of the driven gear 312 may be substantially smooth. The driven gear 312 may have a plurality of teeth 316 circumscribing and evenly spaced along the outer perimeter of the driven gear 312 opposite the second interior surface 314. In some instances, the teeth 316 of the driven gear 312 may be imparted with an involute, cycloidal, or trochoidal profile. In other instances, the teeth 316 may be imparted with any other suitable profile. The driven gear 312 may be configured to align with and be engaged by a gear drive assembly of a printer (not shown), for example, the inkjet printer 100, thermal printer 160, laser printer 210, or any other suitable printing device, when the material holder is installed. The flanges 282 are preferably not formed from polycarbonate (PC) material, as the coefficient of friction between the flanges 282 and the gear drive assembly may be excessively high and lead to damage or a malfunction of the material holder 280.

Figure 14:
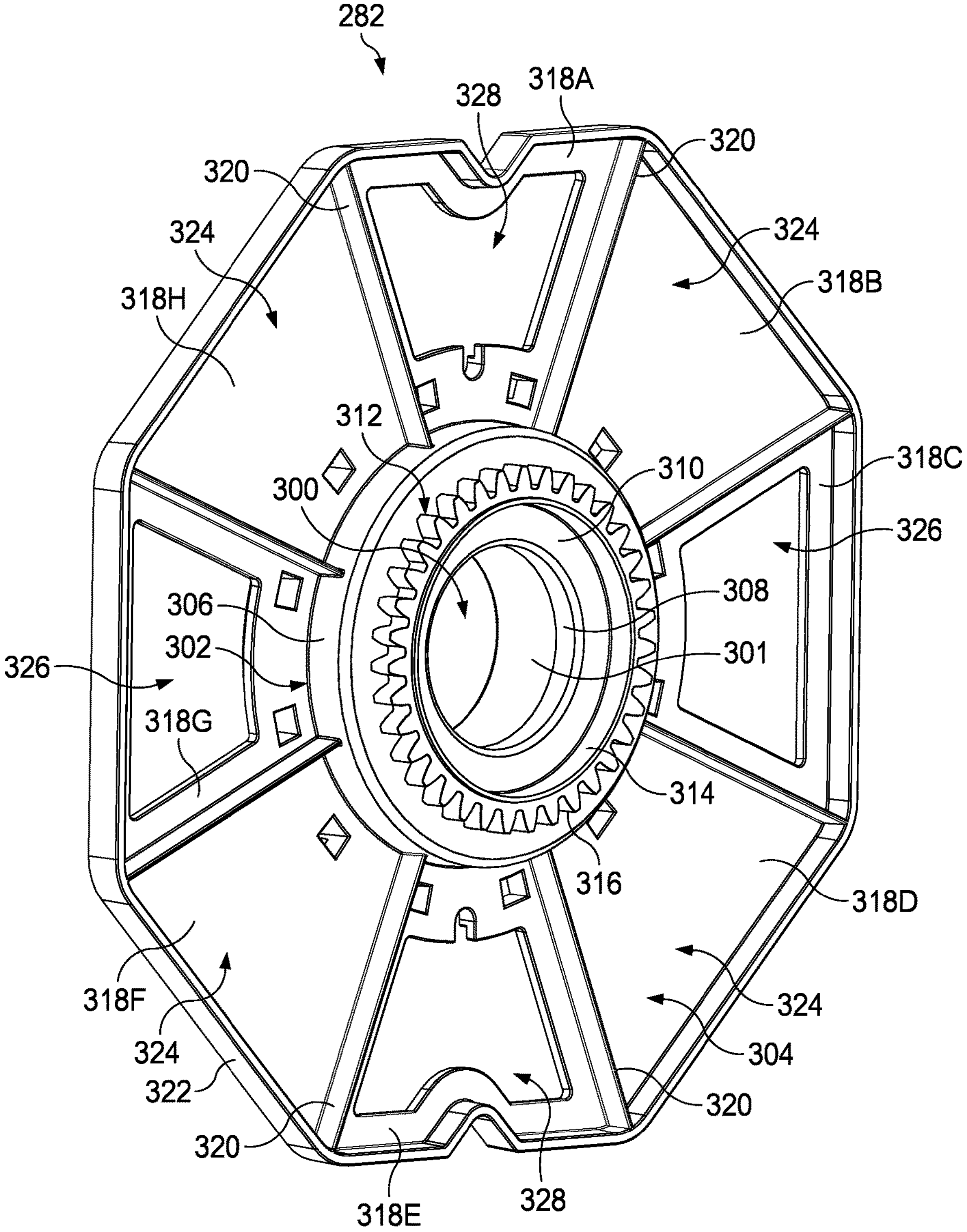
FIG. 14 illustrates a front isometric view of a flange of the material holder of FIG. 10.
Figure 15:
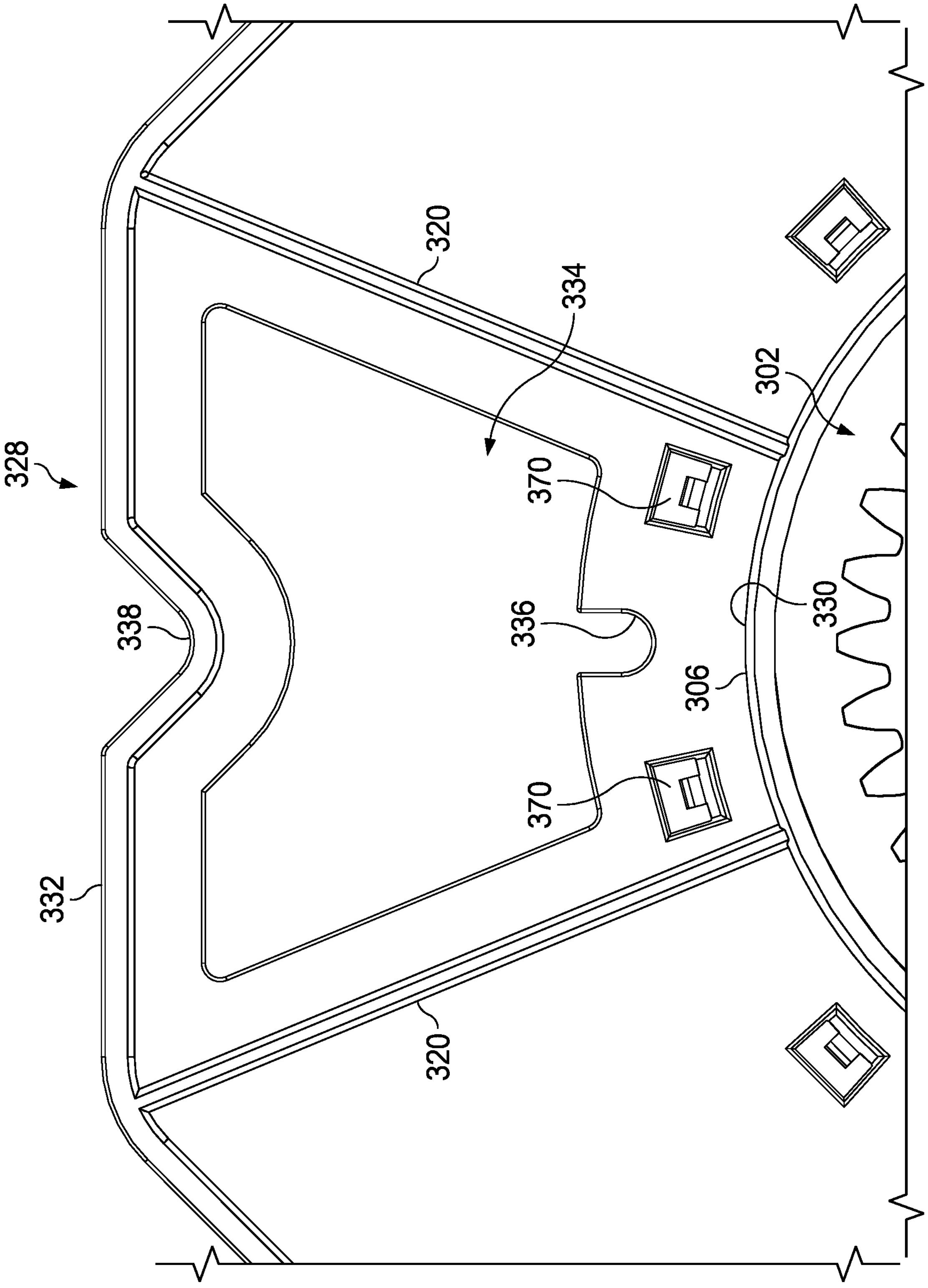
FIG. 15 illustrates an enlarged view of a portion of the flange of FIG. 14.

Each flange 282 defines a plurality of sectors 318 extending therearound. As shown in FIG. 14, each flange 282 may include eight sectors 318A-H encircling the ring 302. Each sector 318 may be substantially similar in shape and size. In other instances, each flange 282 may include any number of sectors 318 depending on the general shape with which the flange 282 is imparted. As shown in FIGS. 14 and 15, a plurality of structural ribs 320 may extend between the ring 302 and a peripheral edge 322 of the flange 282. The structural ribs 320 may define the lateral boundaries of the sectors 318, whereas the upper and lower boundaries of the sectors 318 may be defined, respectively, by the peripheral edge 322 of the flange 282 and the exterior surface 306 of the ring 302. In some instances, each flange 282 includes eight structural ribs 320. However, in other instances, the flanges 282 may include any number of structural ribs 320 depending on the general shape with which the flange 282 is imparted.

Each sector 318 may be provided in the form of one of a solid pane sector 324, a standard window sector 326, or a viewing window sector 328. Solid pane sectors 324 may be opaque, whereas standard window sectors 326 and viewing window sectors 328 may include a through hole that may provide visibility to a user (e.g., to observe how much of a roll of printable media has been used). The sectors 318 may be arranged such that each adjacent sector 318 alternates between a solid pane sector 324 and either a standard window sector 326 or a viewing window sector 328. In other instances, however, the sectors 318 may be arranged in any other suitable configuration. For example, in other instances the flanges 282 may include any number of sectors 318, all of which may be provided in the form of viewing window sectors 328.

Still referring to FIG. 14, in some instances, the sectors 318 may be configured such that each flange 282 includes four solid pane sectors 324, two standard window sectors 326, and two viewing window sectors 328. For example, the sectors 318B, 318D, 318F, 318H may be provided in the form of solid pane sectors 324, the sectors 318C, 318G may be provided in the form of standard window sectors 326, and the sectors 318A, 318E may be provided in the form of viewing window sectors 328.

As best shown in FIG. 15, each viewing window sector 328 may include a proximal end 330 and a distal end 332. The proximal end 330, the distal end 332, and two adjacent structural ribs 320 may define the boundaries of the viewing window sector 328. A viewing window 334 may be disposed between the proximal and distal ends 330, 332 and between the two adjacent structural ribs 320. The viewing window 334 may include a core viewing notch 336 positioned adjacent to the proximal end 330. The core viewing notch 336 may be provided in the form of an archtop rectangle with the "arched top" positioned proximate to the proximal end 330. In other instances, however, the core viewing notch 336 may be provided in any suitable shape. The core viewing notch 336, in conjunction with the viewing window 334, may allow a user to observe how much of a roll of printable media (not shown) is left relative to the roll's core.

The viewing window sector 328 may also include an outer locating notch 338 positioned adjacent to the distal end 332. The outer locating notch 338 may be disposed on the peripheral edge 322 and may be positioned approximately equidistant from each of the two adjacent structural ribs 320. The outer locating notch 338 may be provided in the form of a triangular divot or indentation with a rounded edge. In other instances, however, the outer locating notch may have any other suitable shape or configuration. When installing a roll of printable media (not shown), the outer locating notch 338 may assist a user in orienting and positioning the roll symmetrically and in a central position with respect to one or more flanges 282.

Figure 16:
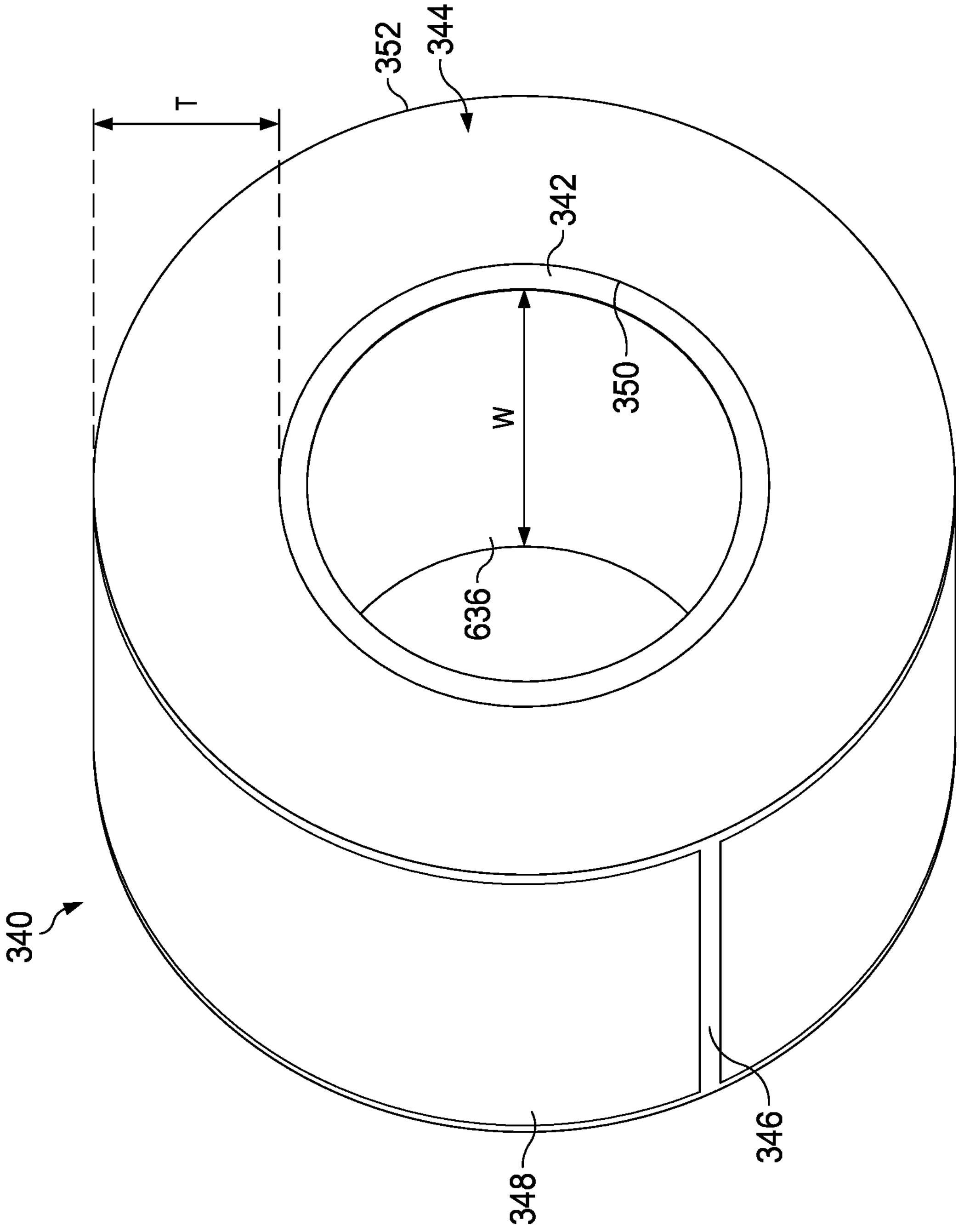
FIG. 16 illustrates an isometric view of an exemplary media roll for use with the material holder disclosed herein.

Now turning to FIG. 16, a media roll 340 for use with the material holder 280 disclosed herein is depicted. The media roll 340 may include a core 342 and a media supply 344 and may be positioned or mounted between the flanges 282*a*, 282*b* (see FIG. 44C). The core 342 may be provided in the form of an annular cylinder and may be formed from cardboard or any other suitable material. The media roll 340 may be defined by a width W, which may extend linearly in a direction substantially parallel with the axis of radial symmetry of the media roll 340.

The media supply 344 may be provided in the form of a continuous strip of printable media. For example, in some instances, the media supply 344 may be provided in the form of a continuous strip of liner 346 with a plurality of adhesive labels 348 positioned thereon and evenly spaced from one another. In other instances, however, the media supply 344 may be provided in the form of any other printable media (e.g., a roll of wristbands connected end-to-end, a roll of paper, a roll of tags connected end-to-end, a roll of plastic, a roll of magnetic material or foil, a roll of a continuous strip of adhesive label optionally positioned on a continuous strip of liner, etc.). In some instances, the media supply 344 may be wound around the core 342 such that the media supply 344 forms a neatly coiled, multi-layered roll. Thus, the media supply 344 may unfurl smoothly from the outermost layer inward as the media supply 344 is used up during the printing process.

When the media supply 344 is wound around the core 342, the media supply 344 may be defined by a thickness T. The thickness T may be measured radially between an external diameter 350 of the core 342 and an outer perimeter 352 of the media roll 340. As the media supply 344 is used up, the thickness T may decrease. Thus, the thickness T may be indicative of a lifespan of the media roll 340 (e.g., how much of the media supply 344 remains before the media roll 340 must be replaced).

Figure 17:
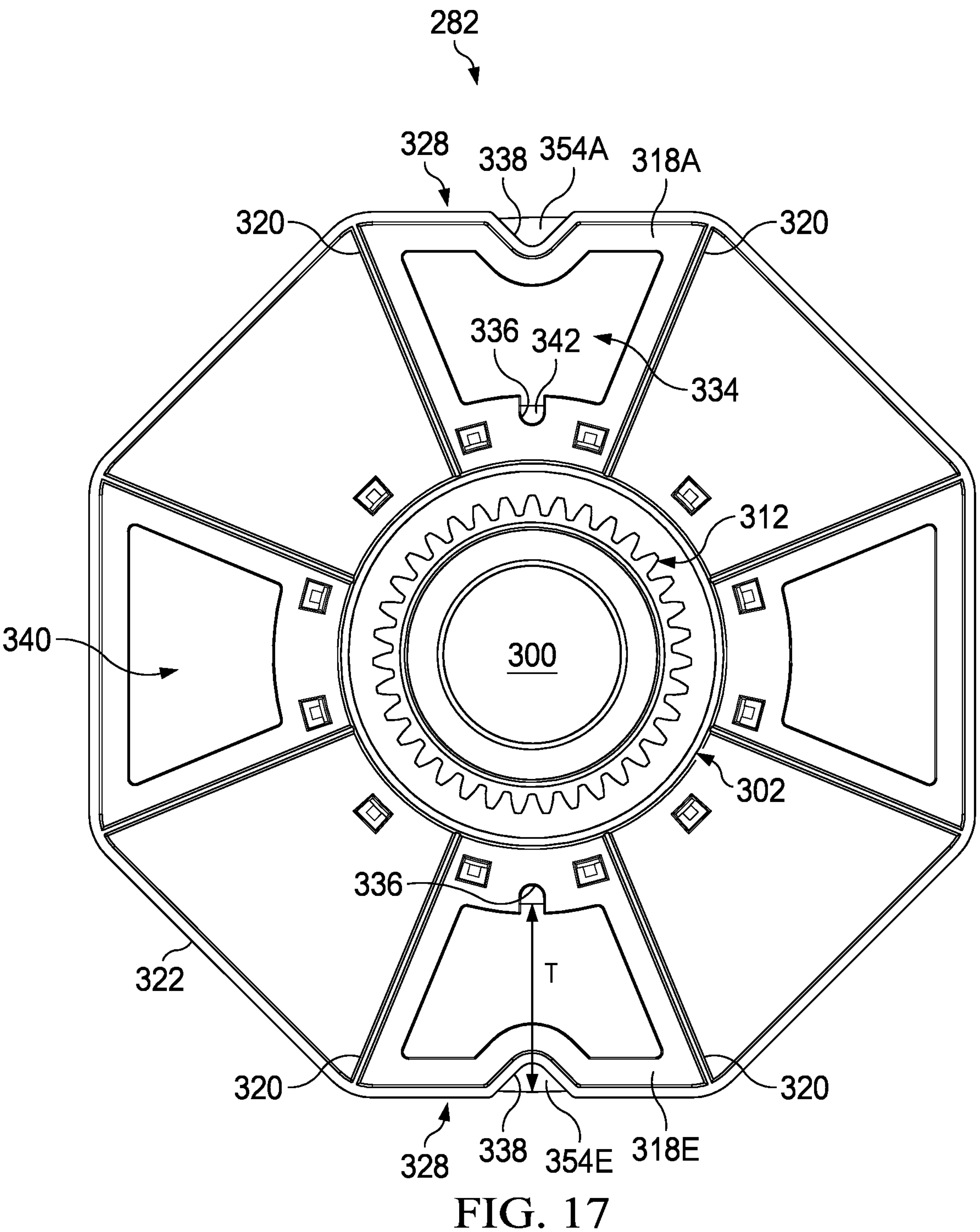
FIG. 17 illustrates a front elevational view of the flange of FIG. 14.

As shown in FIG. 17, the viewing window sectors 328 may enable a user to observe, or at least to estimate, the thickness T (e.g., determine how much of the media supply 344 remains) without disassembling the material holder 280. When a media roll 340 is positioned between two flanges 282, at least a portion of the core 342 may be visible via the core viewing notch 336. Additionally, at least a portion of the media supply 344 may be visible via the viewing window 334 and/or the outer locating notch 338. Thus, one or more of the viewing window sectors 328 may enable a user to observe or estimate the thickness T of the media supply 344.

The outer locating notches 338 may expose a portion of the media supply 344. For example, a first visible portion 354A of the media supply 344 may be visible via the outer locating notch 338 of the sector 318A, and a second visible portion 354E of the media supply 344 may be visible via the outer locating notch 338 of the sector 318E. Thus, a user may orient the media roll 340 centrally and symmetrically with respect to one or more flanges 282 by comparing the first and second visible portions 354A, 354E. For example, the user may adjust the positioning of the media roll 340 such that the portions of the outer locating notches 338 visibly occupied by the first and second visible portions 354A, 354E are substantially equal.

Figure 18:
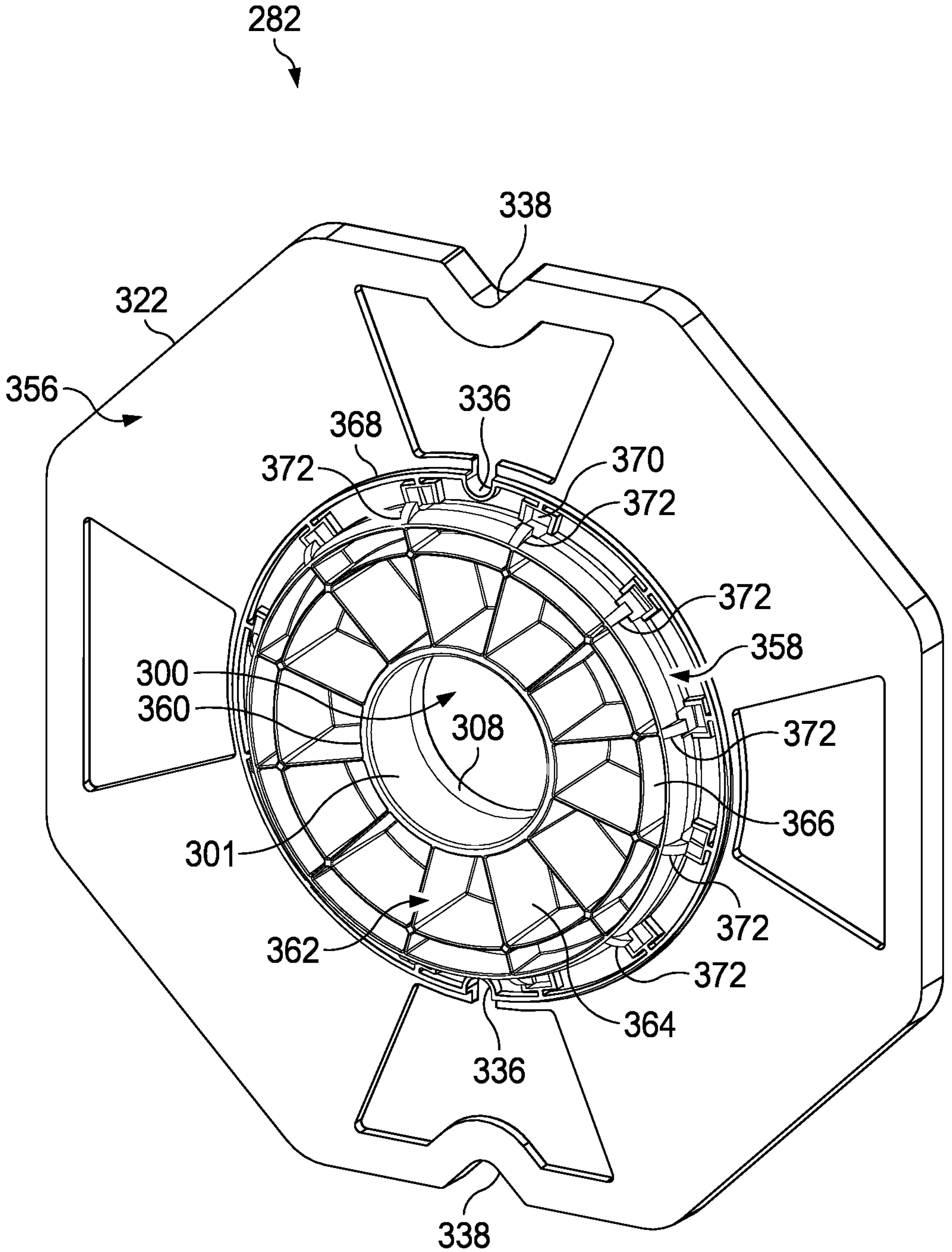
FIG. 18 illustrates a rear isometric view of the flange of FIG. 14.

Turning to FIG. 18, a back face 356 of each flange 282 may have a toothed ring 358 connected thereto. The first bearing surface 301 may form an inner surface of a hub 360. The hub 360 may be formed integrally with the back face 356 or may be coupled to the back face 356 and extend outwardly therefrom. The toothed ring 358 and the hub 360 may be substantially coaxial (e.g., concentric) and may each be substantially cylindrical in shape.

The flange 282 may also include a support structure 362 disposed between toothed ring 358 and the hub 360. The support structure 362 may be provided in the form of a plurality of spokes 364 and a support ring 366. The plurality of spokes 364 may be evenly spaced from one another and may extend radially between the toothed ring 358 and the hub 360. The support ring 366 may be disposed between and may be substantially coaxial with the toothed ring 358 and the hub 360. The support ring 366 may be connected to or formed integrally with the plurality of spokes 364 and may extend in a circular fashion between the plurality of spokes 364. However, in other instances, the support structure 362 may be provided in any other suitable form. The support structure 362 may, for example, add stability and/or structural rigidity to the toothed ring 358, the hub 360, and/or other components of the flange 282.

A peripheral ring 368 may circumscribe the toothed ring 358. One or more core viewing notches 336 may be positioned along the circumference of the peripheral ring 368. Excluding the core viewing notches 336, the peripheral ring 368 may be substantially circular in shape and may be substantially coaxial (e.g., concentric) with the toothed ring 358, the support ring 366, and/or the hub 360. The peripheral ring 368 may be formed integrally with the back face 356 or may be coupled to the back face 356 and protrude outwardly therefrom. A plurality of apertures 370 may be formed in the back face 356. The plurality of apertures 370 may be disposed between the peripheral ring 368 and the toothed ring 358 and may be radially spaced apart from one another. As best seen in FIG. 18, the plurality of apertures 370 may be radially aligned with the plurality of spokes 364 of the support structure 362. However, in other instances, the flange 282 may be provided with any number of apertures 370, and the apertures 370 may be arranged in in any suitable configuration.

A plurality of barbs 372 may circumscribe the toothed ring 358. The barbs 372 may be configured to engage (e.g., dig into) the core 342 (e.g., a cardboard core) of the media roll 340 when the material holder 280 is assembled for use. As shown best in FIG. 19, the plurality of barbs 372 may be connected to and protrude radially away from a sloped wall 374 of the toothed ring 358. In some instances, the plurality of barbs 372 may be imparted with a “snake-bite” geometry. In other instances, the plurality of barbs 372 may be imparted with a sloped geometry or any other suitable geometry that causes releasable engagement between the plurality of barbs 372 and the core 342 of the media roll 340. In this way, the plurality of barbs 372 may increase the amount of engagement between the flanges 282 and the core 342 through cylindrical hoop stress.

Figure 19:
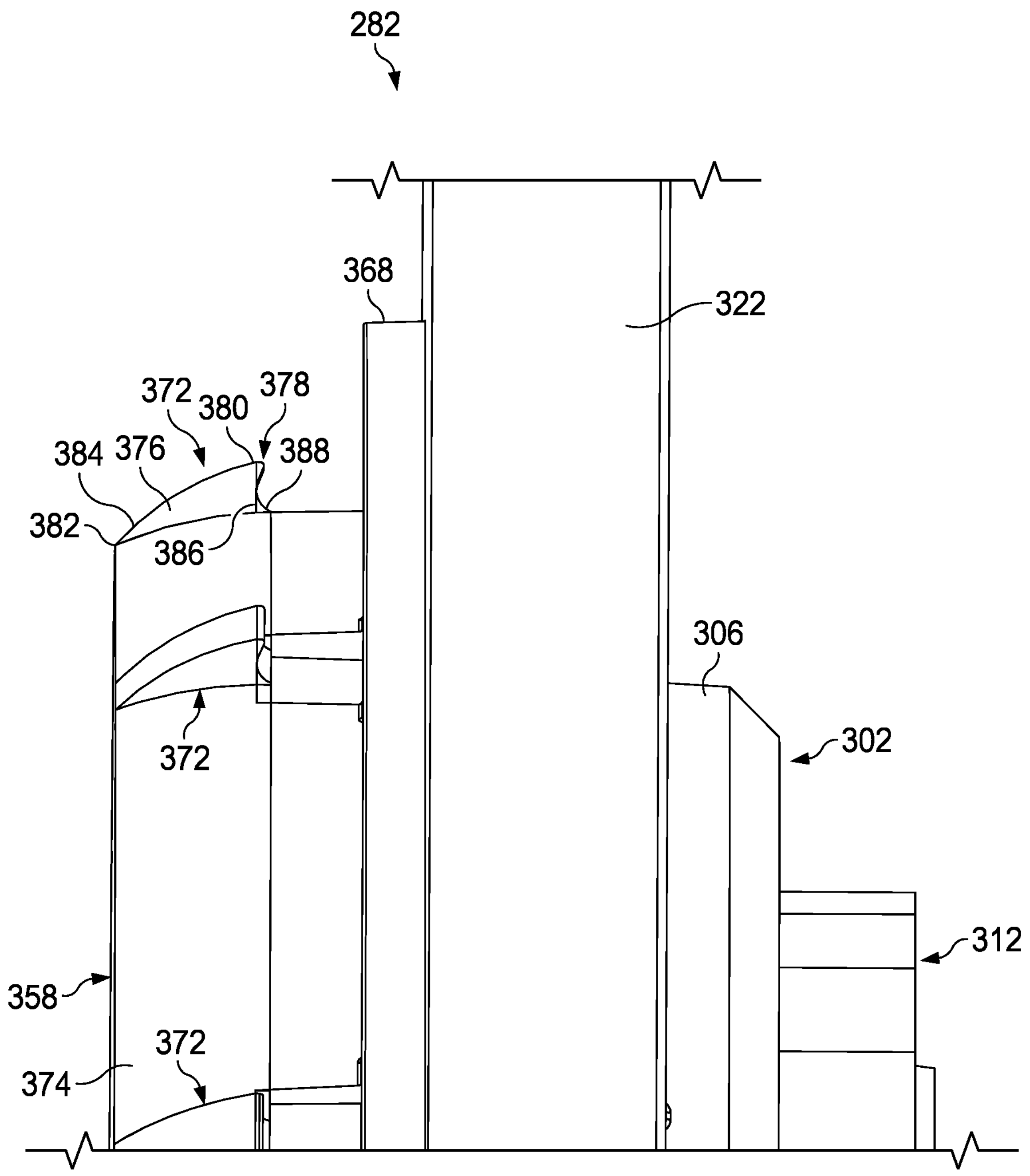
FIG. 19 illustrates an enlarged side isometric view of a portion of the flange of FIG. 14.

As seen in FIG. 19, each barb 372 may be provided in the form of a body portion 376 and an end portion 378. The shape of the body portion 376 may be defined by a wedge having a base 380 positioned proximate to the end portion 378 and a point 382 opposing the base 380. For example, the body portion 376 may protrude from the sloped wall 374 of the toothed ring 358 by an amount that is greater at the base 380 than at the point 382. An upper surface 384 of the body portion 376 may extend between the first and second ends 380, 382. The upper surface 384 may be imparted with a sloped geometry and may curve in a downward direction (e.g., toward the toothed ring 358) from the base 380 to the point 382. For example, the upper surface 384 may be substantially parabolic, concave, logarithmic, or any other suitable shape. In other instances, the upper surface 384 may be substantially linear.

The end portion 378 may include a first side 386 proximate to the body portion 376 and a second side 388 opposing the first side 386. The first side 386 may be substantially linear, whereas the second side 388 may be imparted with a parabolic or other curved geometry. The end portion 378 may be formed integrally with the body portion 376 or may be coupled to the body portion 376 by adjoining the first side 386 of the end portion 378 with the base 380 of the body portion 376.

Figure 20:
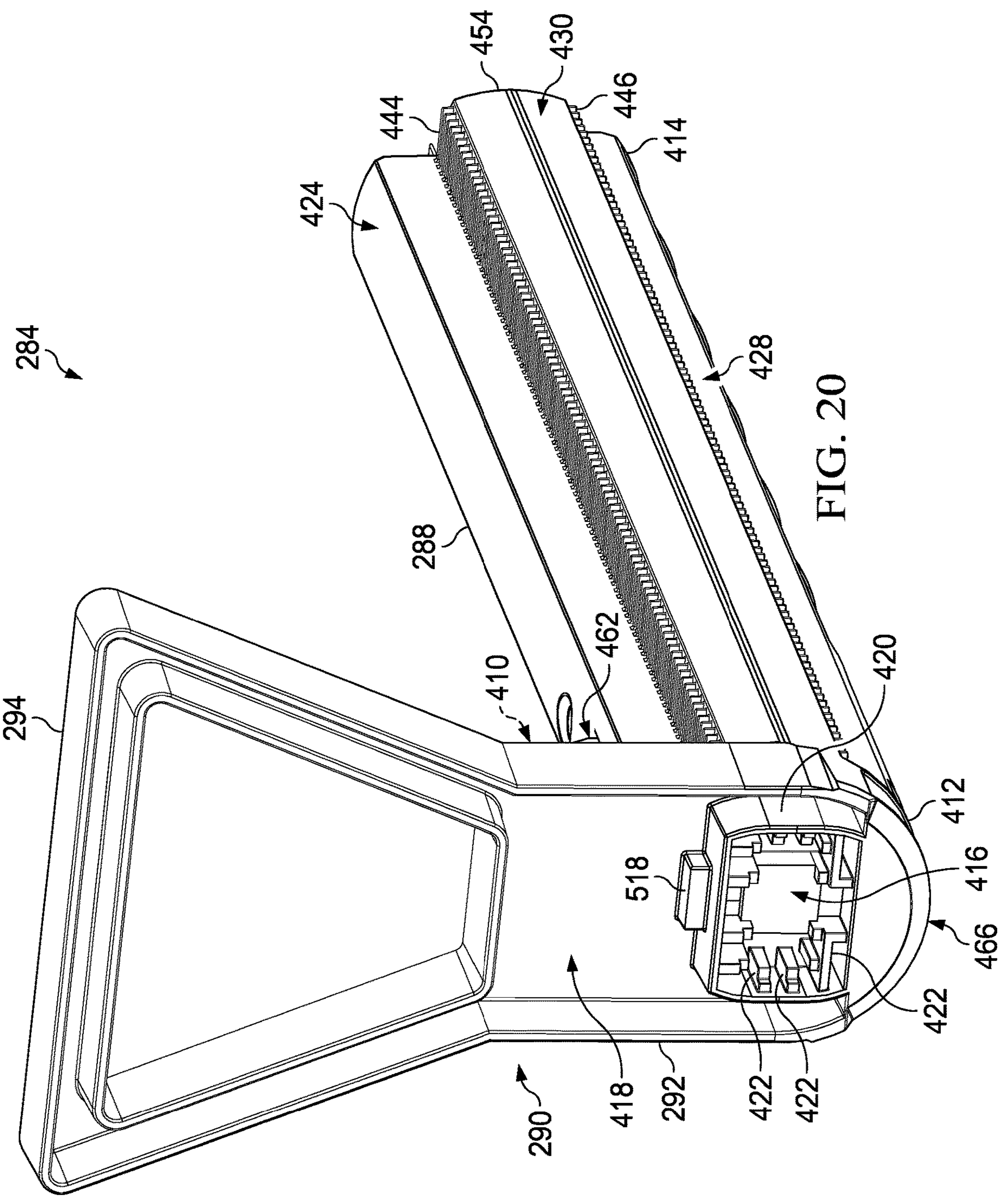
FIG. 20 illustrates a front isometric view of a spindle of the material holder of FIG. 10.
Figure 21:
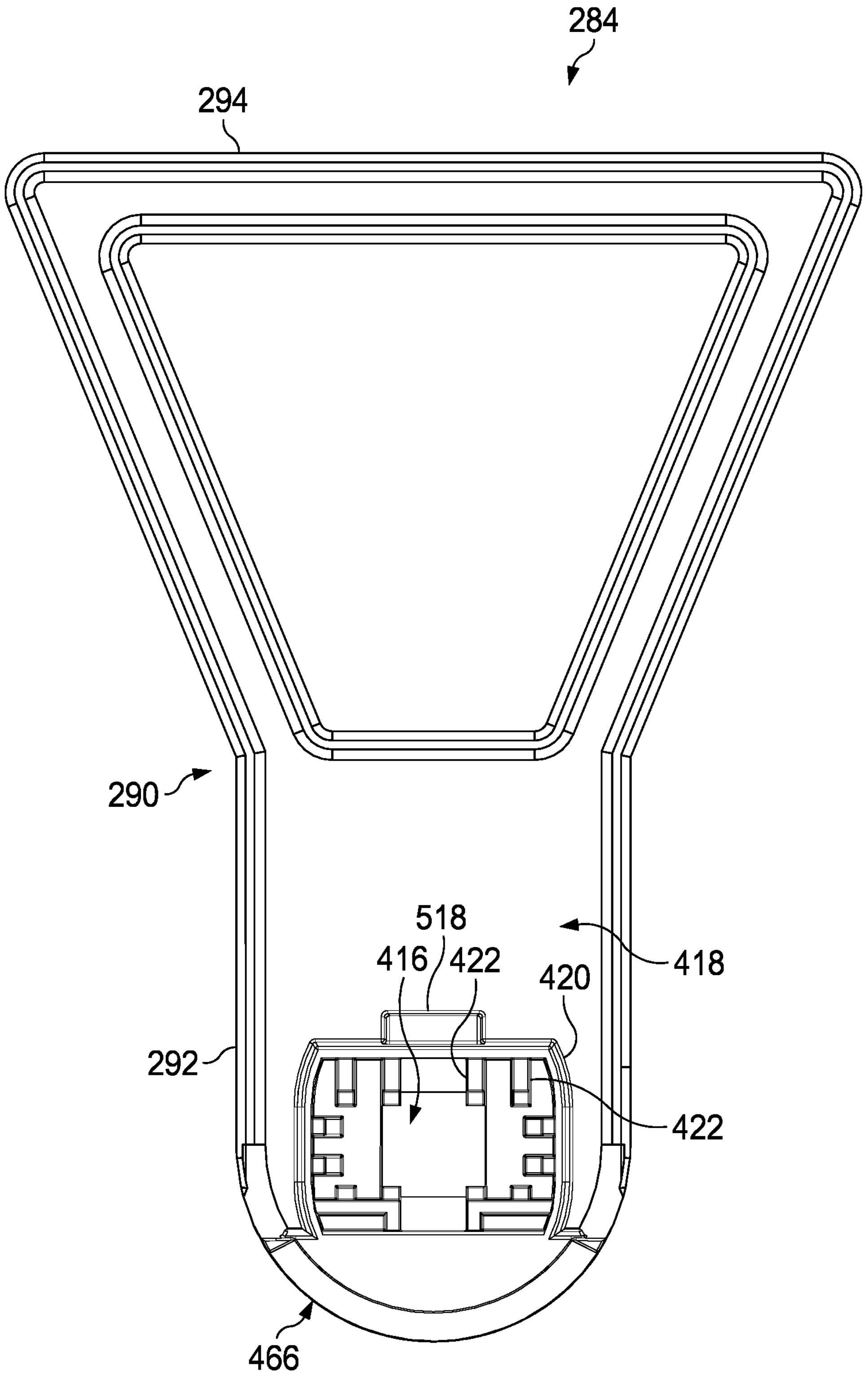
FIG. 21 illustrates a front elevational view of the spindle of FIG. 20.

Turning to FIGS. 20 and 21, the spindle 284 may provide an axis about which the media roll 340 may rotate. The spindle 284 may generally include the arm 288 and the keyhole region 290 including the base 292 and the spindle handle 294. The arm 288 may be formed integrally with the keyhole region 290 or may be coupled to an inside face 410 of the keyhole region 290 and extend outwardly therefrom. The arm 288 is defined by a first end 412 proximate to the keyhole region 290 and a second end 414 opposing the first end 412. A smart cell bay 416 may be disposed on an outside face 418 of the keyhole region 290. The outside face 418 may be positioned opposite the inside face 410. The smart cell bay 416 may be formed integrally with the keyhole region 290 or may be coupled to the outside face 418 and protrude outwardly therefrom. The smart cell bay 416 is provided in the form of a housing 420 and a plurality of support elements 422 coupled to the housing and extending inwardly therefrom.

Figure 22:
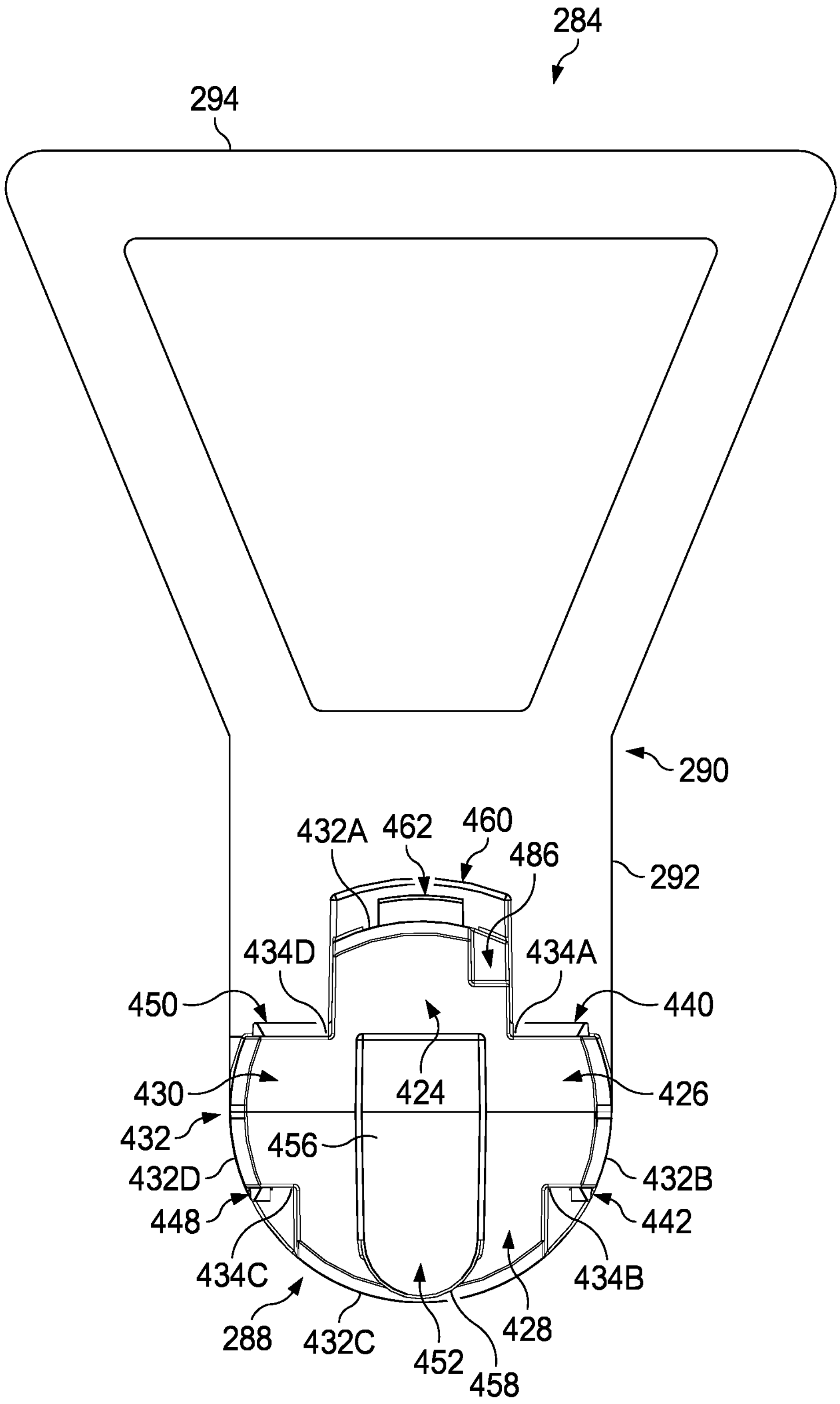
FIG. 22 illustrates a rear elevational view of the spindle of FIG. 20.

As best shown in FIG. 22 and viewed clockwise around the arm 288, the arm 288 is defined by a top portion 424, a first side rail 426, a base portion 428, and a second side rail 430. The top portion 424, first side rail 426, base portion 428, and second side rail 430 may be configured such that the arm 288 is imparted with a substantially T-shaped geometry. Second bearing surface segments 432A-432D may be formed on the outermost surface of the top portion 424, first side rail 426, base portion 428, and second side rail 430, respectively. The second bearing surface segments 432A-432D may each be provided in the form of an arc (i.e., segment or portion) taken from various areas of a single, substantially circular or elliptical shape. Together, the second bearing surface segments 432A-423D may constitute a second bearing surface 432, which may correspond to and substantially mirror the geometry of the first bearing surface 301 of one or more flanges 282.

Junctions 434A-434D may be disposed between any two of the top portion 424, first side rail 426, base portion 428, and second side rail 430. For example, the top portion 424 and first side rail 426 may be adjoined at junction 434A; the first side rail 426 and base portion 428 may be adjoined at junction 434B; the base portion 428 and the second side rail 430 may be adjoined at junction 434C, and the second side rail 430 and top portion 424 may be adjoined at junction 434D. As shown in FIG. 22, the junctions 434A-434D may each be provided in the form of a right angle. However, in other instances, the junctions 434A-434D may be provided in any suitable shape.

Figure 23:
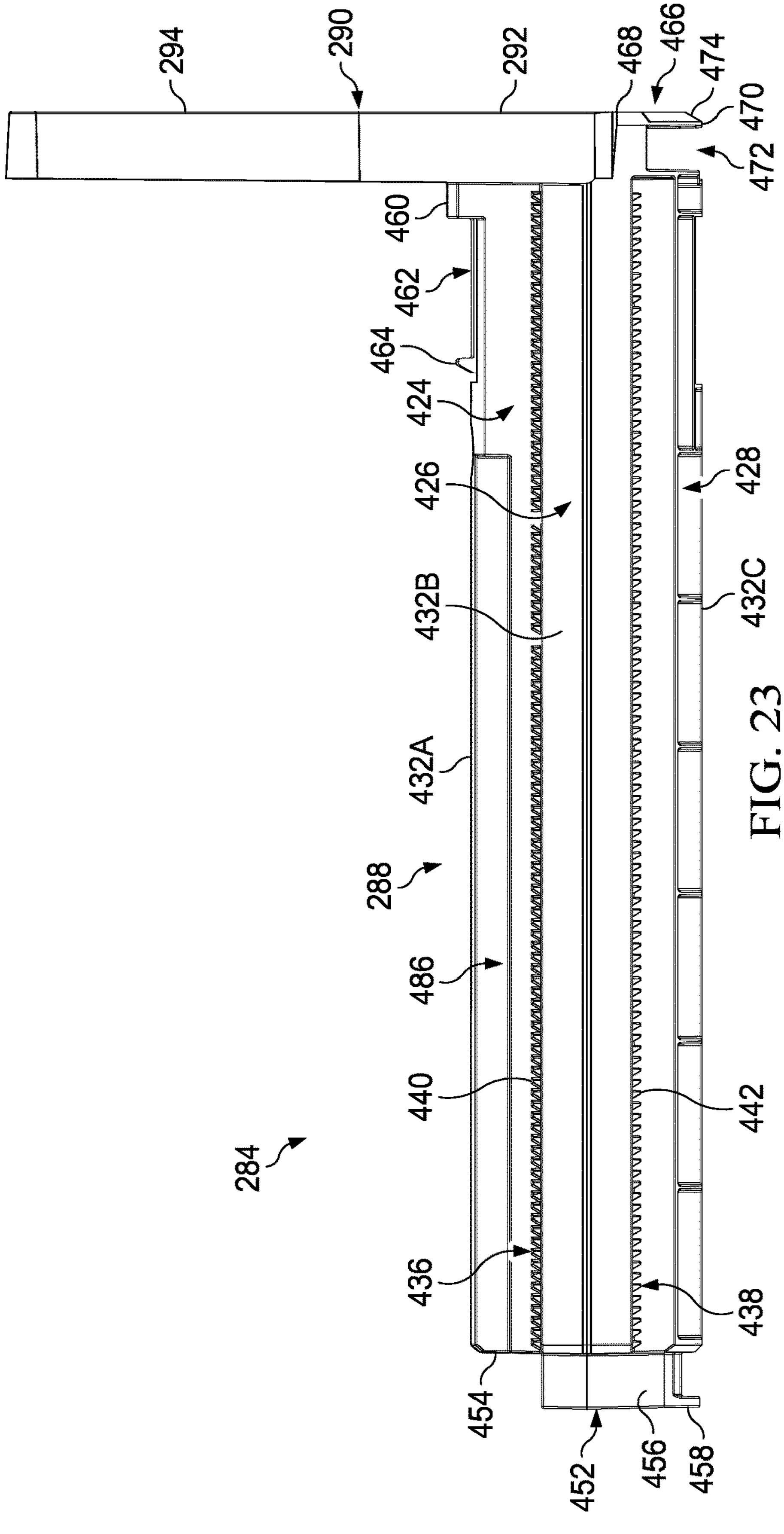
FIG. 23 illustrates a first elevational view of the spindle of FIG. 20.

Turning to FIG. 23, the first side rail 426 may imparted with a first serrated surface 436 disposed above the first side rail 426 (e.g., proximate to the top portion 424) and a second serrated surface 438 disposed below the first side rail 426 (e.g., proximate to the base portion 428). The first serrated surface 436 may include a first plurality of teeth 440 and the second serrated surface 438 may include a second plurality of teeth 442. As shown best in FIG. 22, the first plurality of teeth 440 may be connected to the first side rail 426 proximate the junction 434A and extend upwardly therefrom, and the second plurality of teeth 442 may be connected to the first side rail 426 proximate the junction 434B and extend downwardly therefrom.

Figure 24:
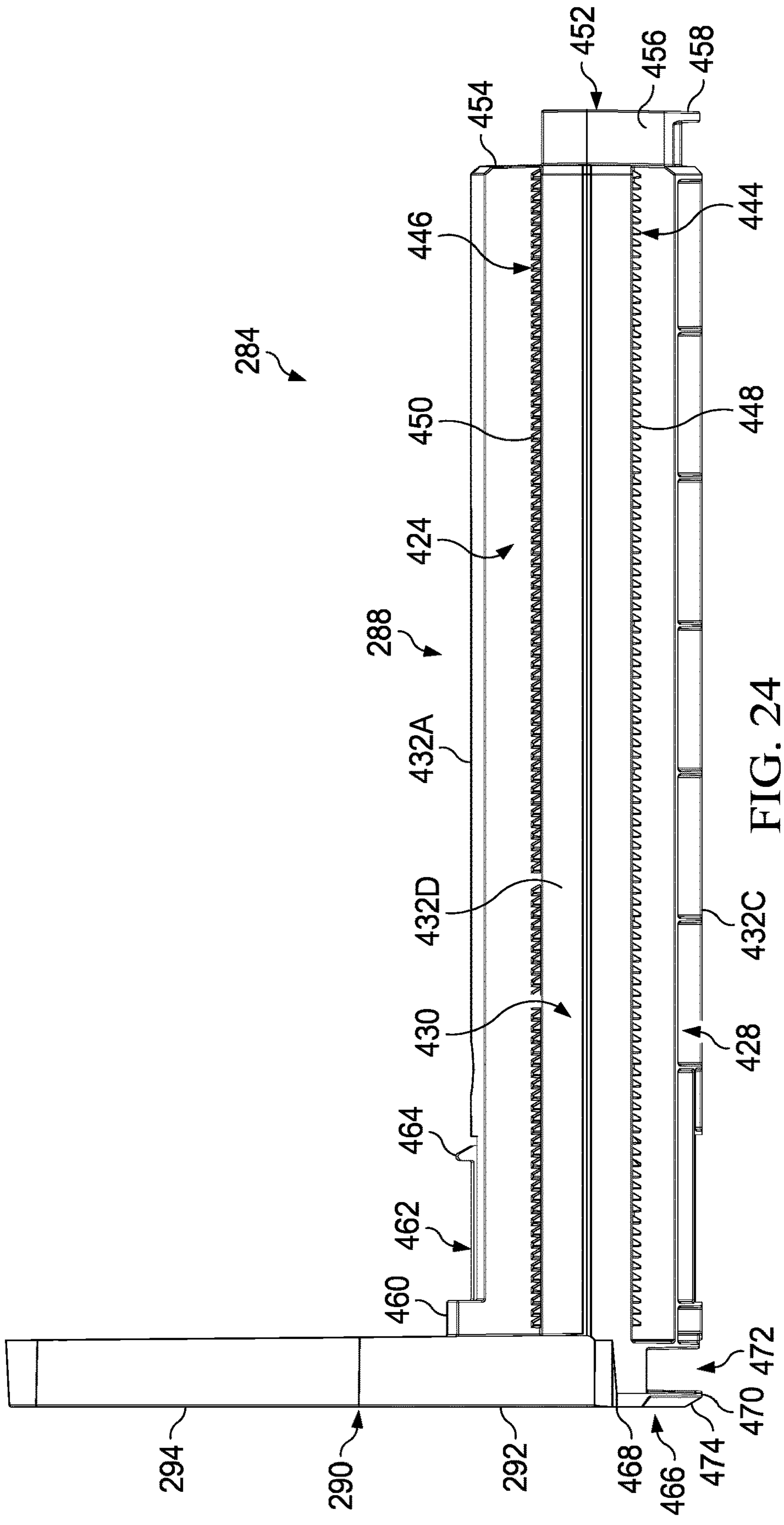
FIG. 24 illustrates a second side elevational view of the spindle of FIG. 20.

The second side rail 430, shown in FIG. 24, may be provided in substantially the same form as the first side rail 426. The second side rail 430 may include a third serrated surface 444 disposed below the second side rail 430 (e.g., proximate to the base portion 428) and a fourth serrated surface 446 disposed above the second side rail 430 (e.g., proximate to the top portion 424). The third serrated surface 444 may include a third plurality of teeth 448 and the fourth serrated surface 446 may include a fourth plurality of teeth 450. Referring again to FIG. 22, the third plurality of teeth 448 may be connected to the second side rail 430 proximate the junction 434C and extend downwardly therefrom, and the fourth plurality of teeth 450 may be connected to the second side rail 430 proximate to the 434D and extend upwardly.

The first, second, third, and fourth pluralities of teeth 440, 442, 448, 450 may be provided in the form of, for example, buttress thread style teeth. Alternatively, the first, second, third, and fourth pluralities of teeth 440, 442, 448, 450 may be provided in the form of sawtooth style teeth or breech-lock style teeth. In other instances, the first, second, third, and fourth pluralities of teeth 440, 442, 448, 450 may be provided in any other suitable form. In some forms, one or more of the first, second, third, and fourth pluralities of teeth 440, 442, 448, 450 may be imparted with a different configuration with respect to one of the other first, second, third, and fourth pluralities of teeth 440, 442, 448, 450.

As can be seen in FIGS. 23 and 24, the arm 288 protrudes outwardly from the base 292 of the keyhole region 290 and terminates at an end nub 452 positioned opposite the keyhole region 290. The end nub 452 may include a body portion 456 which may be substantially rectangular or rectilinear in shape and an appendage 458 connected to the body portion 456 and extending downwardly therefrom.

The arm 288 may also include a wall stop 460 and a spring tab 462 having a catch 464. The wall stop 460 may be positioned on the top portion 424 proximate to the base 292 of the keyhole region 290. The spring tab 462 may also be positioned on the top portion 424 proximate to the base 292 and may abut the wall stop 460.

A locating wall 466 may be disposed below the base 292 of the keyhole region 290 (e.g., opposite the spindle handle 294 with respect to the base 292). The locating wall 466 may include a first end 468 adjacent to the base 292 and a second end 470 opposing the first end 468. The locating wall 466 may be formed integrally with the keyhole region 290 and/or the arm 288, or the locating wall 466 may be coupled to and extend downwardly from the keyhole region 290 and/or the arm 288. The locating wall 466 may be configured such that a gap 472 is formed between the locating wall 466 and the base portion 428 of the arm 288. The gap 472 may, for example, be substantially rectangular in shape. However, in other instances, the gap 472 may be imparted with any suitable shape.

The locating wall 466 protrudes downwardly from the first end 468 of the base 292 and terminates at a chamfered surface 474. The chamfered surface 474 defines an angled edge of the locating wall 466. For example, due to the chamfered surface 474, the locating wall 466 may have a greater width (measured in a direction substantially parallel with the arm 288) at the first end 468 than at the second end 470.

Figure 25:
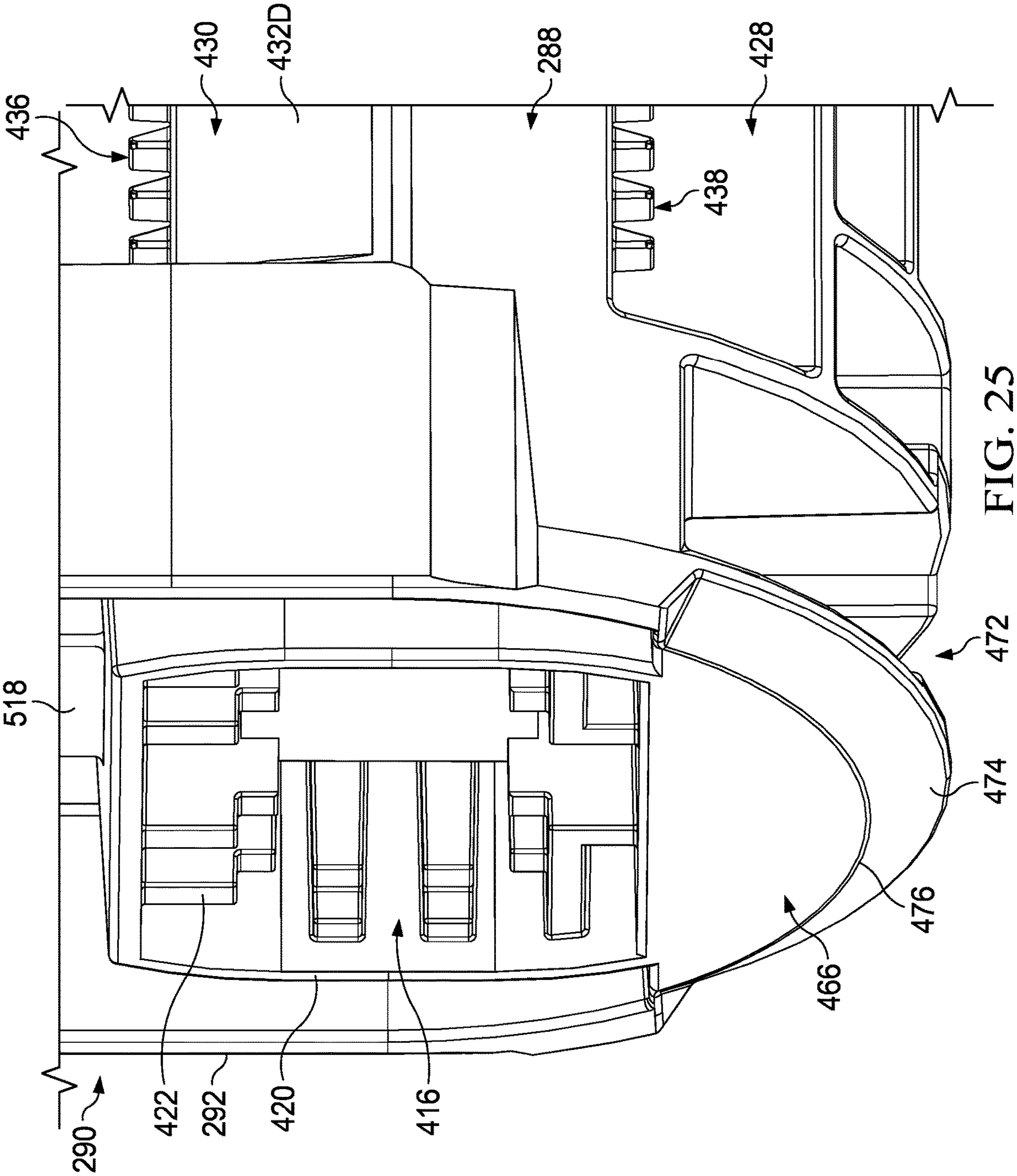
FIG. 25 illustrates an enlarged isometric view of a portion of the spindle of FIG. 20.
Figure 26:
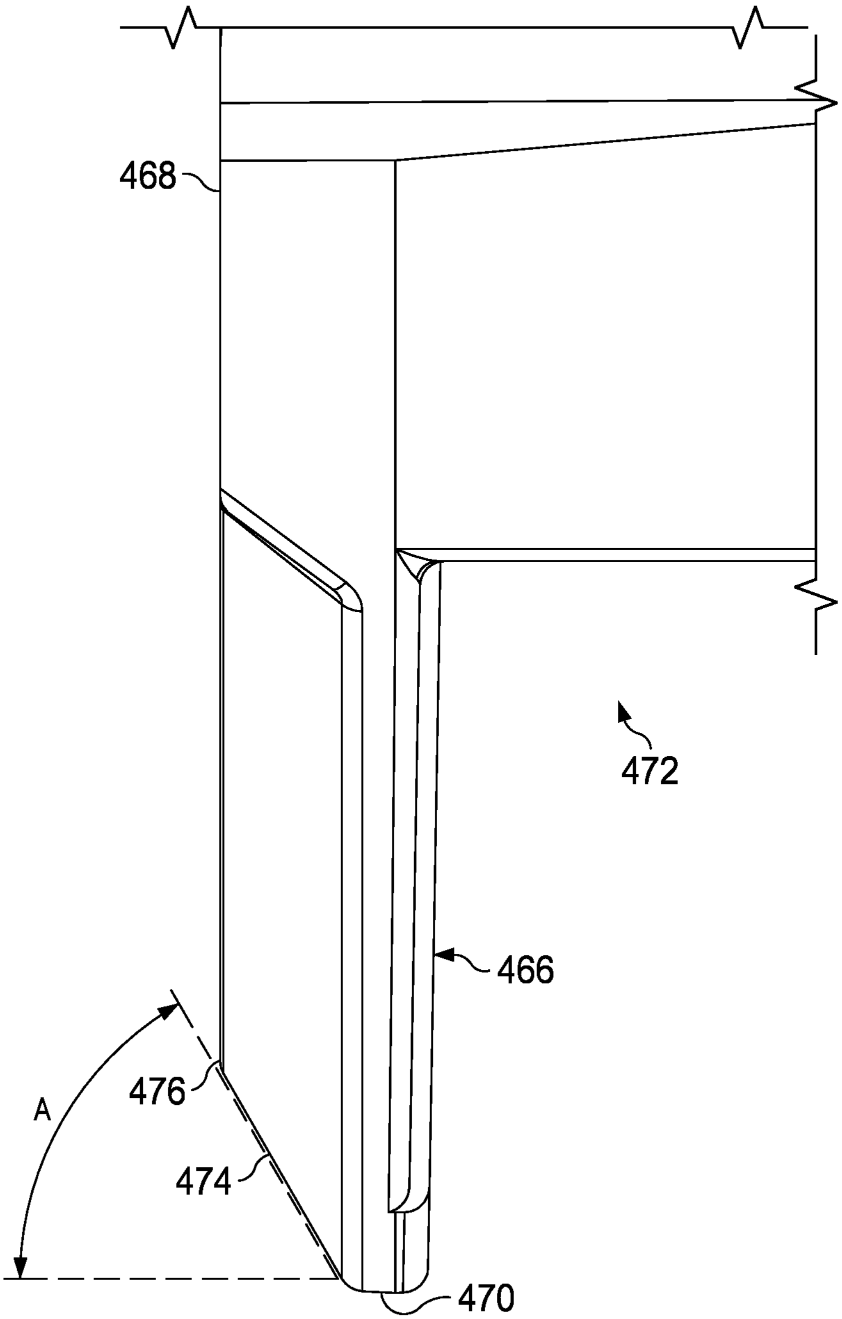
FIG. 26 illustrates a side elevational view of the portion of the spindle shown in FIG. 25.

As best shown in FIG. 25, the locating wall 466 may be substantially semi-circular in shape. The chamfered surface 474 may thus be provided in the form of an arc which substantially mirrors the curvature of the locating wall 466 and may be disposed about a perimeter 476 of the locating wall 466 and defined by an angle A (see FIG. 26). The angle A may be imparted with a value of about 10 to about 80 degrees. For example, the angle A may be imparted with a value of about 20 to about 70 degrees, or about 30 to about 60 degrees, or about 40 to about 50 degrees. In some instances, the angle A may be imparted with a value of about 45 degrees. However, in other instances, the angle A may be imparted with any suitable value. The chamfered surface 474 may aid in installation of the material holder 280. For example, the chamfered surface 474 may be arranged to align with and be received by a complementary angled surface of a printer (e.g., the inkjet printer 100, thermal printer 160, laser printer 210, or any other suitable printing device) when the material holder 280 is installed for use (see FIG. 34). For at least this reason, the locating wall 466 may aid a user in installing the material holder 280 in a printer with the proper orientation and/or position.

Figure 27:
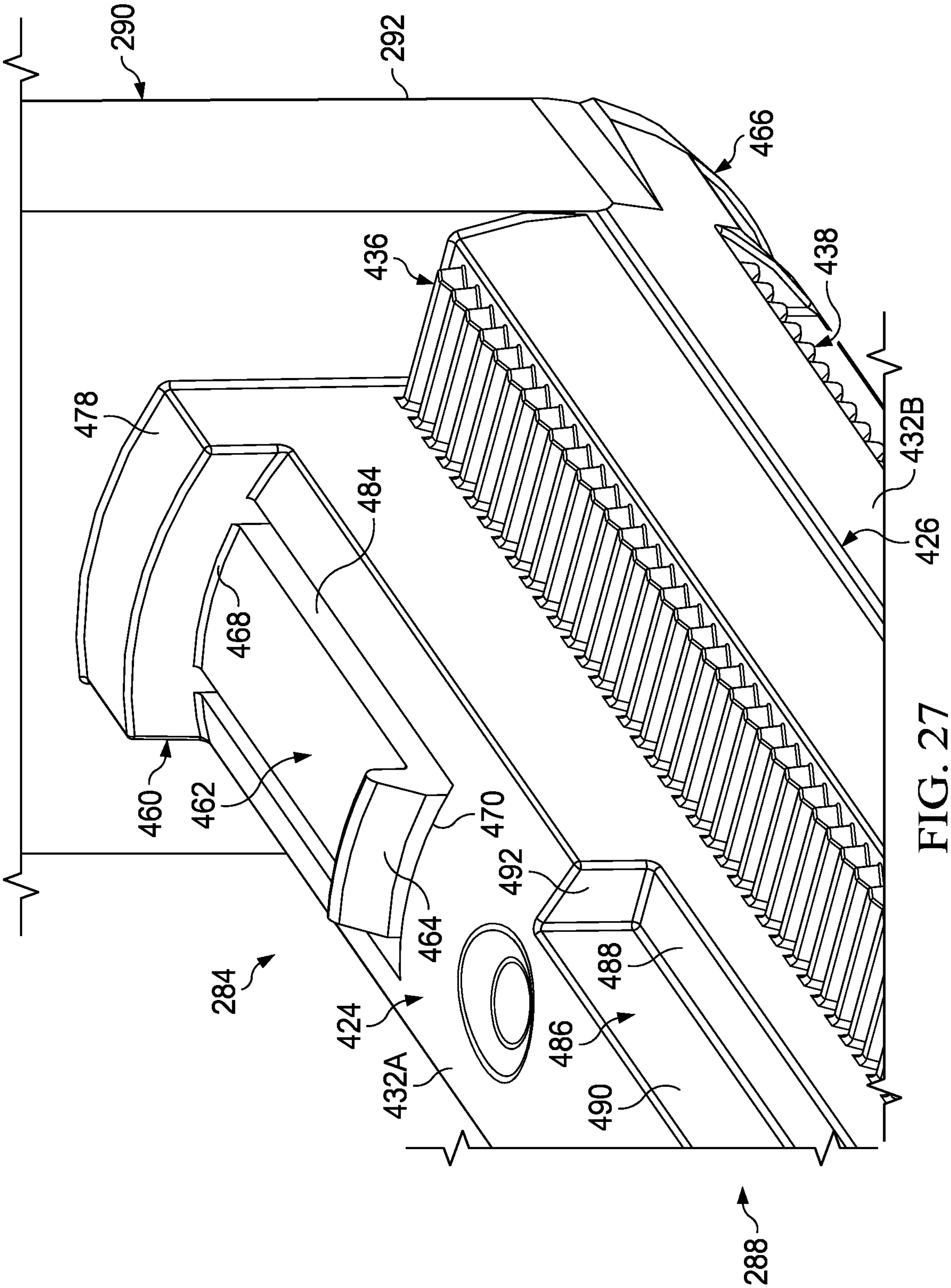
FIG. 27 illustrates an enlarged isometric view of another portion of the spindle of FIG. 20.
Figure 28:
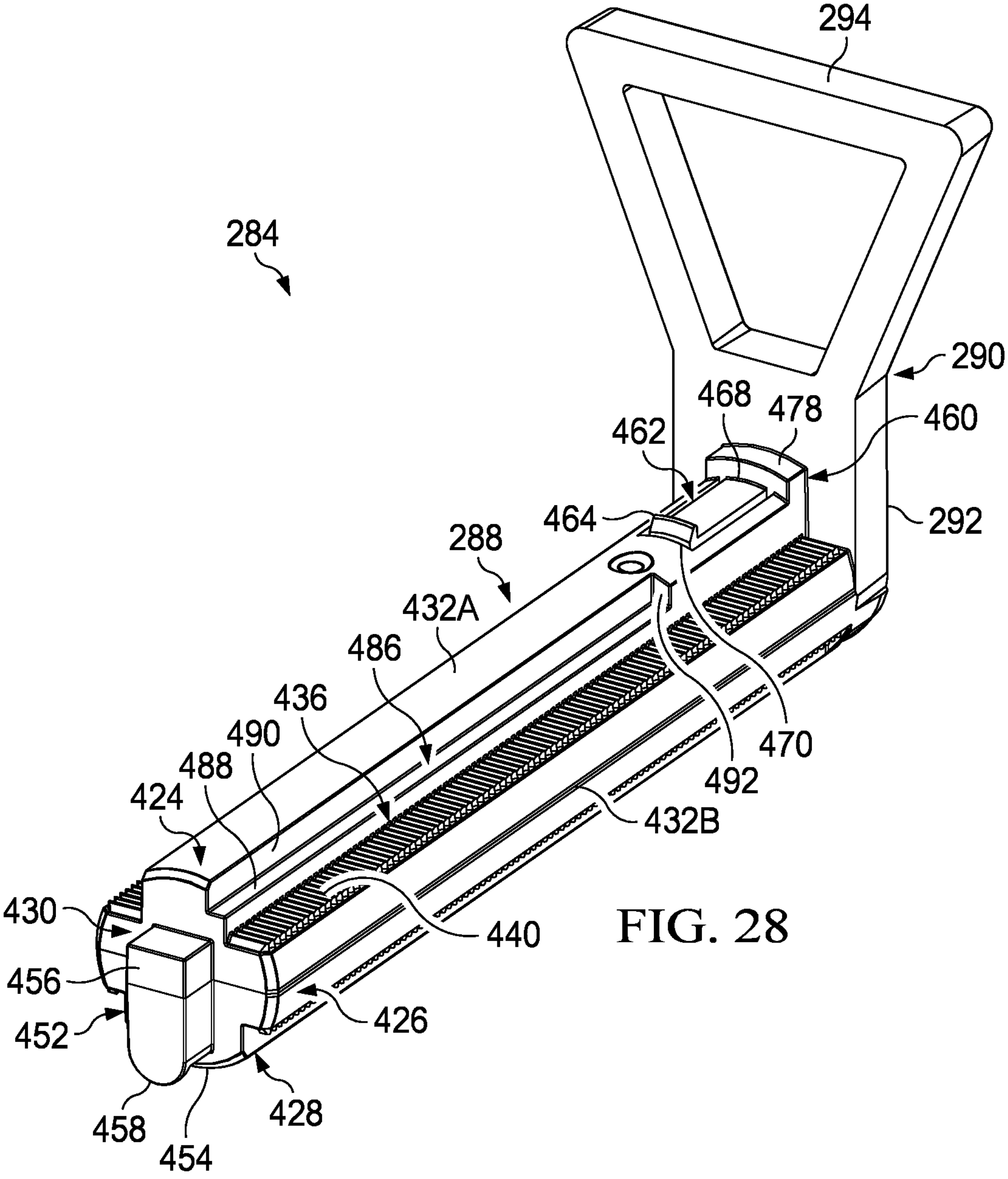
FIG. 28 illustrates a first rear isometric view of the spindle of FIG. 20.
Figure 29:
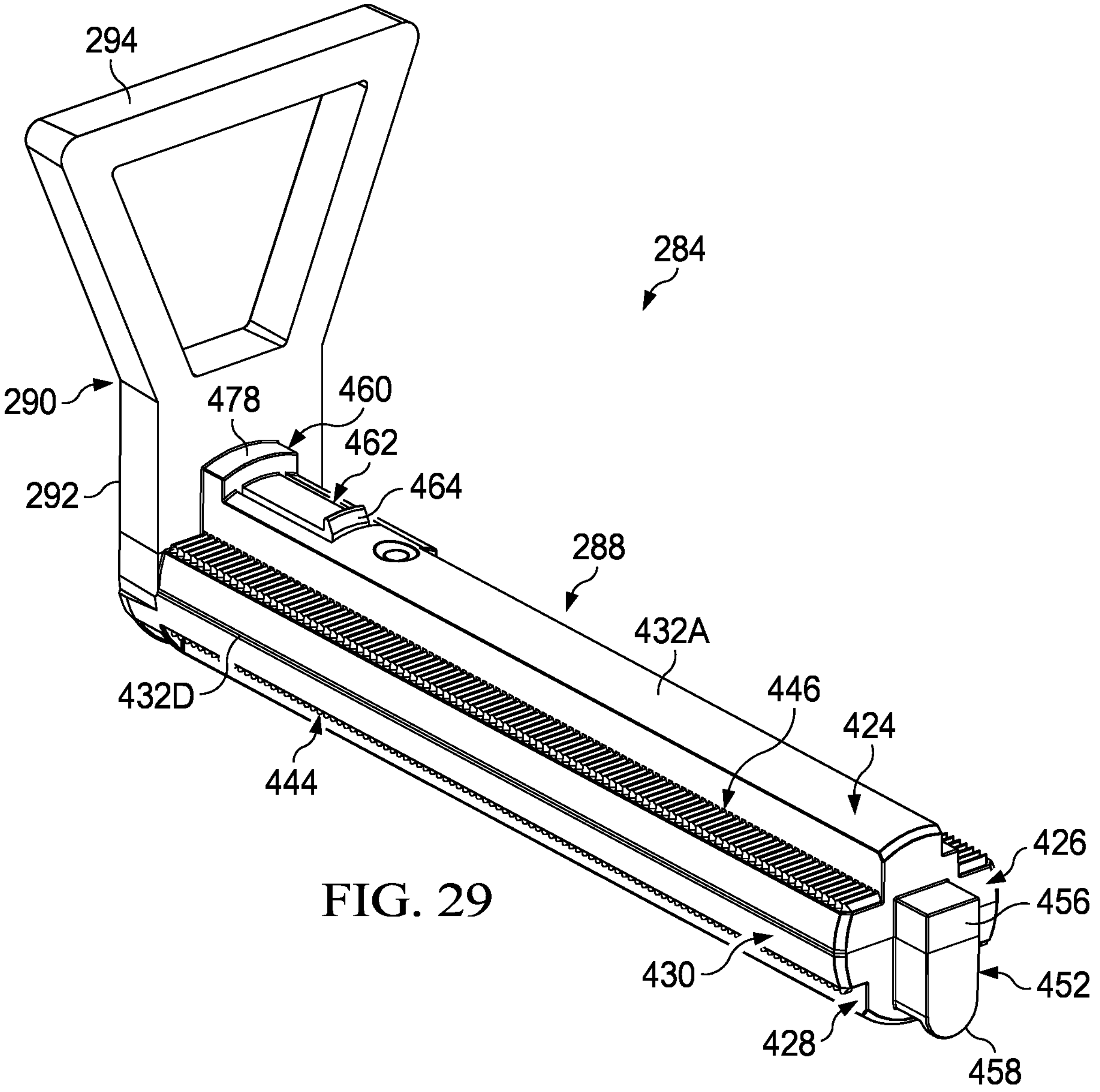
FIG. 29 illustrates a second rear isometric view of the spindle of FIG. 20.

As shown best in FIG. 27, the wall stop 460 may protrude upwardly from the top portion 424 and terminate at a canopy 478 that is provided in the form of a substantially smooth, curved surface. The curvature of the canopy 478 may substantially mirror the curvature of the second bearing surface segment 432A. The spring tab 462 may be positioned opposite the base 292 with respect to the wall stop 460. A first end 480 of the spring tab 462 may abut the wall stop 460. The catch 464 may be positioned at a second end 482 of the spring tab 462 opposite the first end 480. The catch 464 may be formed integrally with the spring tab 462 or may be coupled to the spring tab 462 and extend upwardly therefrom.

A channel 484 may surround the spring tab 462 on at least one side. As shown in FIG. 27, the channel 484 may surround the spring tab 462 on three sides (excluding the side of the spring tab 462 at the first end 480 where the spring tab 462 and wall stop 460 adjoin). The channel 484 may be provided in the form of an angular recess or trough formed in the top portion 424 adjacent to the perimeter of the spring tab 462. In other instances, however, the channel 484 may be provided in any suitable form and positioned in any suitable manner.

The arm 288 may include a poke yoke 486 provided in the form of a rectilinear recess or channel formed in or carved out of the top portion 424. For example, with reference to FIG. 22, the poke yoke 486 may be positioned between the junction 434A and the second bearing surface segment 432A. As best seen in FIG. 27, the poke yoke 486 is defined by a floor 488, a sidewall 490, and a back stop 492. However, in other instances, the poke yoke 486 may be imparted with any suitable shape or structure. The poke yoke 486 may extend along at least a portion of the length of the top portion 424. The back stop 492 may be positioned proximate to the second end 470 of the spring tab 462. The floor 488 and sidewall 490 may extend linearly in a direction substantially parallel with the arm 288 between the back stop 492 and the distal end 454 of the arm 288. However, in other instances, the poke yoke 486 may be positioned in any other suitable way.

Figure 30:
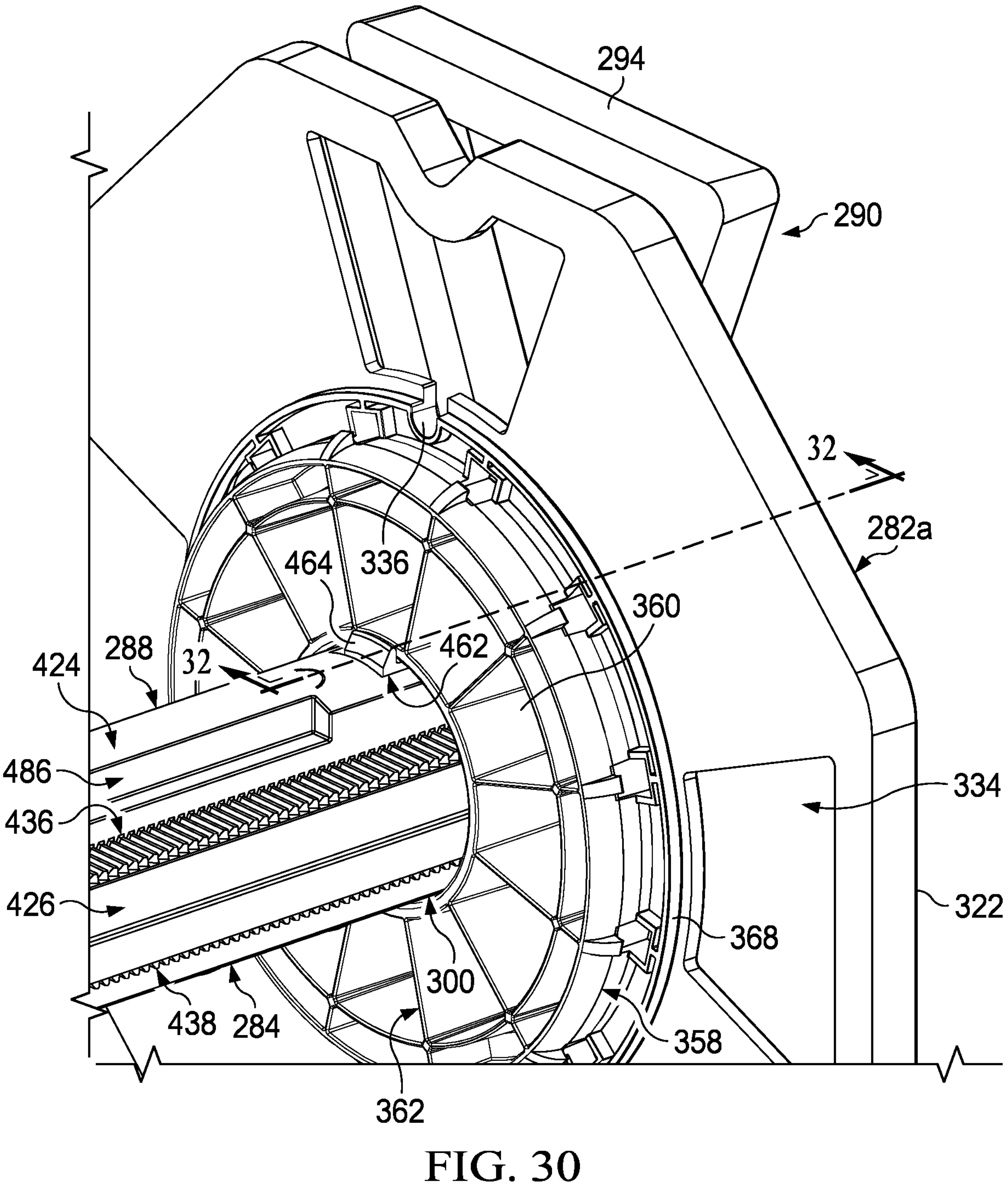
FIG. 30 illustrates an isometric view of the flange of FIG. 14 engaged with the spindle of FIG. 20.
Figure 31:
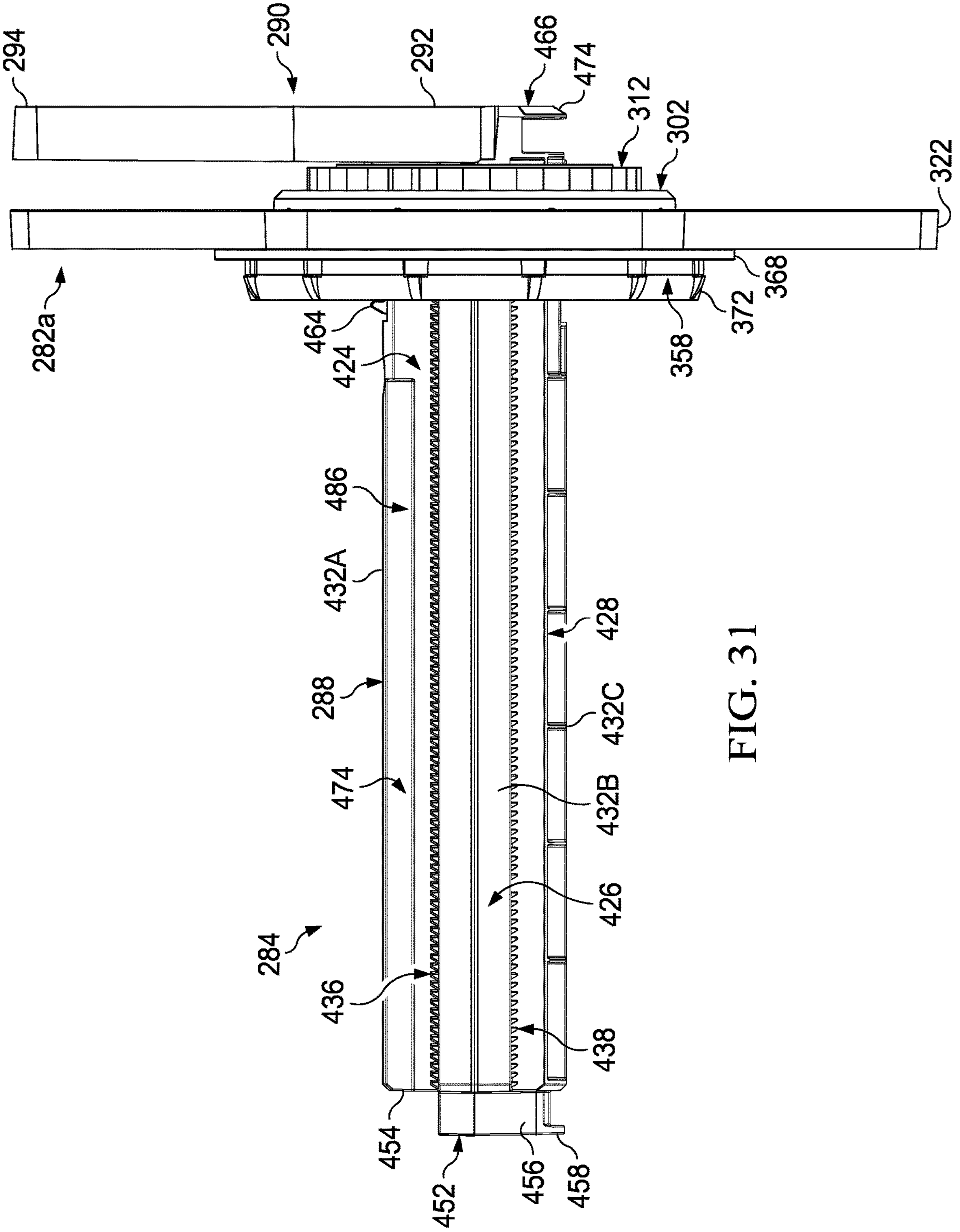
FIG. 31 illustrates a side elevational view of the flange of FIG. 14 engaged with the spindle of FIG. 20.
Figure 32:
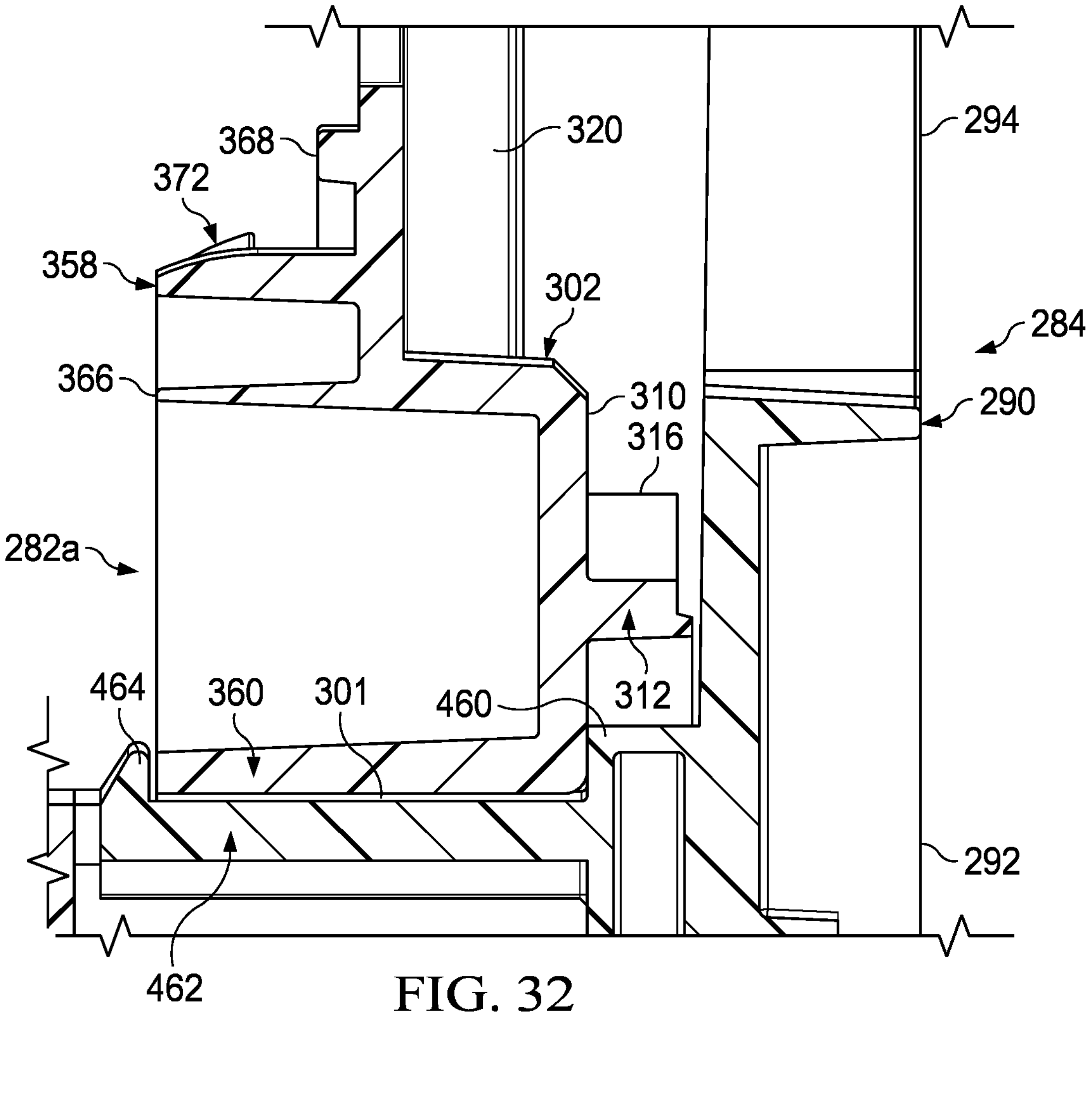
FIG. 32 illustrates a cross-sectional view of the flange and the spindle of FIG. 31 taken along the line 32-32 of FIG. 31.

Now referring to FIGS. 30-32, the flange 282*a* may be installed or docked on the spindle 284 via engagement with the spring tab 462. For example, the flange 282*a* may be disposed along the arm 288 and positioned adjacent to the keyhole region 290. The flange 282*a* may slide over the spring tab 462 such that the catch 464 engages the hub 360 and prevents the flange 282*a* from moving unintentionally away from the keyhole region 290. The engagement between the catch 464 and the hub 360 may allow the flange 282*a* and spindle 284 to be securely coupled to one another, thereby decreasing the likelihood that the material holder 280 may break or become disassembled during use, transit, or in the event of an accident (e.g., dropping the material holder 280). The catch 464, in conjunction with the wall stop 460, may locate the flange 282*a* as close as possible to keyhole region 290 of the spindle 284. Preventing the flange 282*a* from tracking or moving linearly away from the keyhole region 290 along the arm 288 may increase an engagement between the driven gear 312 and a gear drive assembly (not shown) of a printer (e.g., inkjet printer 100, thermal printer 160, laser printer 210, or any other suitable printing device) with which the material holder 280 is used.

The flange 282*a* and spindle 284 may be designed and constructed with complementary geometries which may facilitate a secure fit when the flange 282*a* is installed on the spindle 284 adjacent to the keyhole region 290. As best shown in the cross-sectional view of FIG. 32, in some instances, the hub 360 may engage and circumscribe the arm 288 such that the first bearing surface 301 is substantially flush with the spring tab 462. The hub 360 may be positioned between the catch 464 on one side and the wall stop 460 on the other and the annular face 310 of the ring 302 may be substantially flush with the wall stop 460. In other instances, the flange 282*a* and spindle 284 may be imparted with any suitable complementary geometries or structural characteristics to facilitate engagement.

Figure 33:
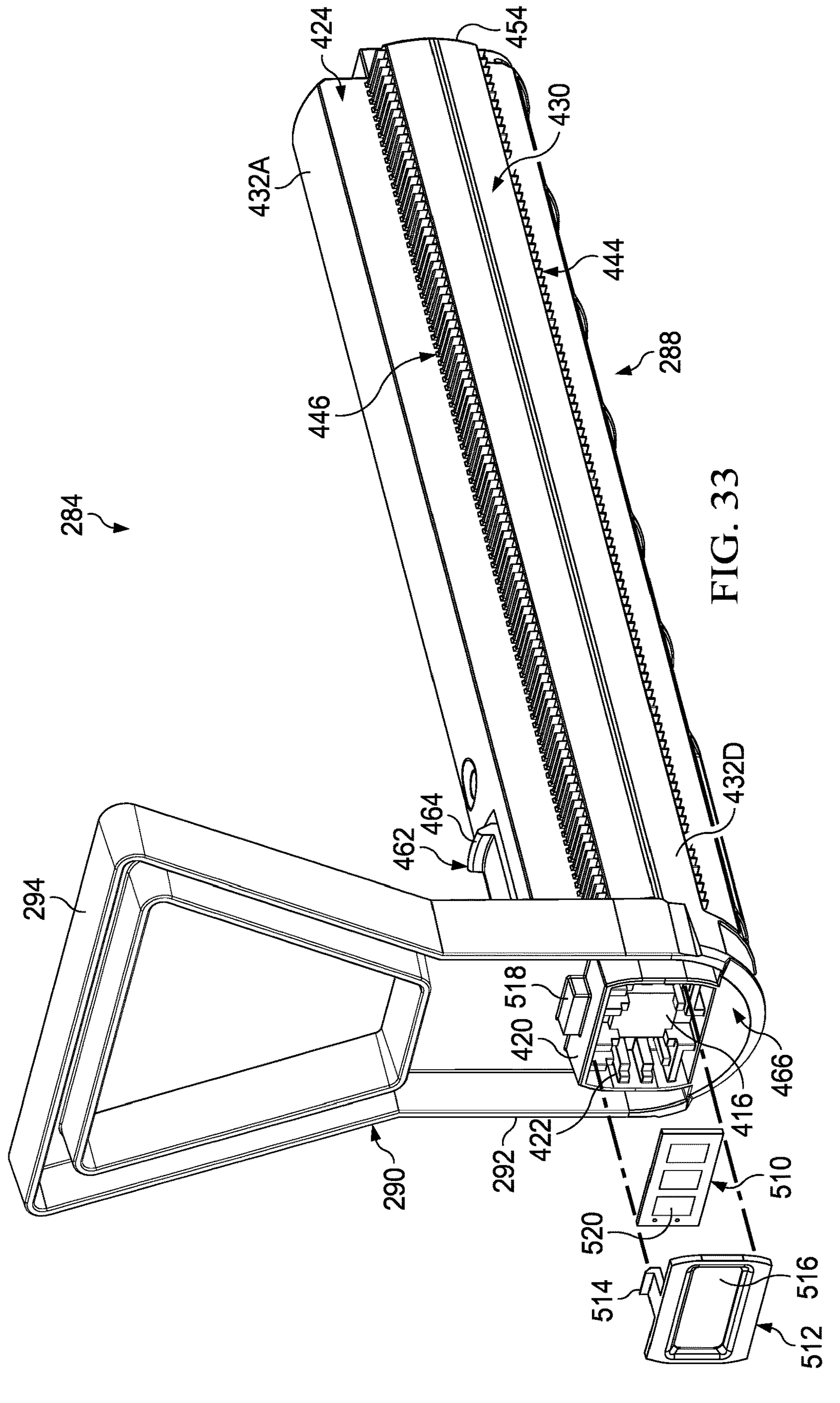
FIG. 33 illustrates an exploded view of a spindle including a smart cell.

Turning to FIG. 33, the spindle 284 may include a smart cell 510 designed to be disposed in the smart cell bay 416. In particular, the smart cell 510 may be positioned within the housing 420 of the smart cell bay 416 and may be at least partially secured in place by the surrounding plurality of support elements 422. A smart cell cover 512 having a barbed member 514 and an opening 516 may be provided to help prevent the smart cell 510 from coming loose or being unintentionally ejected from the smart cell bay 416 (e.g., if the spindle 284 is dropped). The barbed member 514 of the smart cell cover 512 may correspond to a receiving member (not shown) disposed within the housing 420. Thus, after positioning the smart cell 510 within the housing 420, the opening 516 of the smart cell cover 512 may be aligned with the smart cell 510, and the smart cell cover 512 may be pressed in the direction of the spindle 284 until the barbed member 514 engages the receiving member of the housing 420. This engagement between the barbed member 514 and the receiving member of the housing 420 may secure the smart cell cover 512, and thus the smart cell 510, in place. In order to remove the smart cell cover 512 and/or the smart cell 510, a user may depress a button 518 disposed on the housing 420. The button 518 may align with the position of the barbed member 514 within the housing 420 such that pressing down on the button 518 may apply downward pressure on the barbed member 514 and disengage the barbed member 514 from the receiving member of the housing 420.

The smart cell 510 may include one or more conduction panes 520. In the example of FIG. 33, the smart cell 510 includes three conduction panes 520. In other instances, however, the smart cell 510 may include any number of conduction panes 520. The conduction panes 520 may facilitate an electrical connection or communication between the smart cell 510 and a printer (e.g., the inkjet printer 100, thermal printer 160, laser printer 210, or any other suitable printing device) with which the material holder 280 is used.

Figure 34:
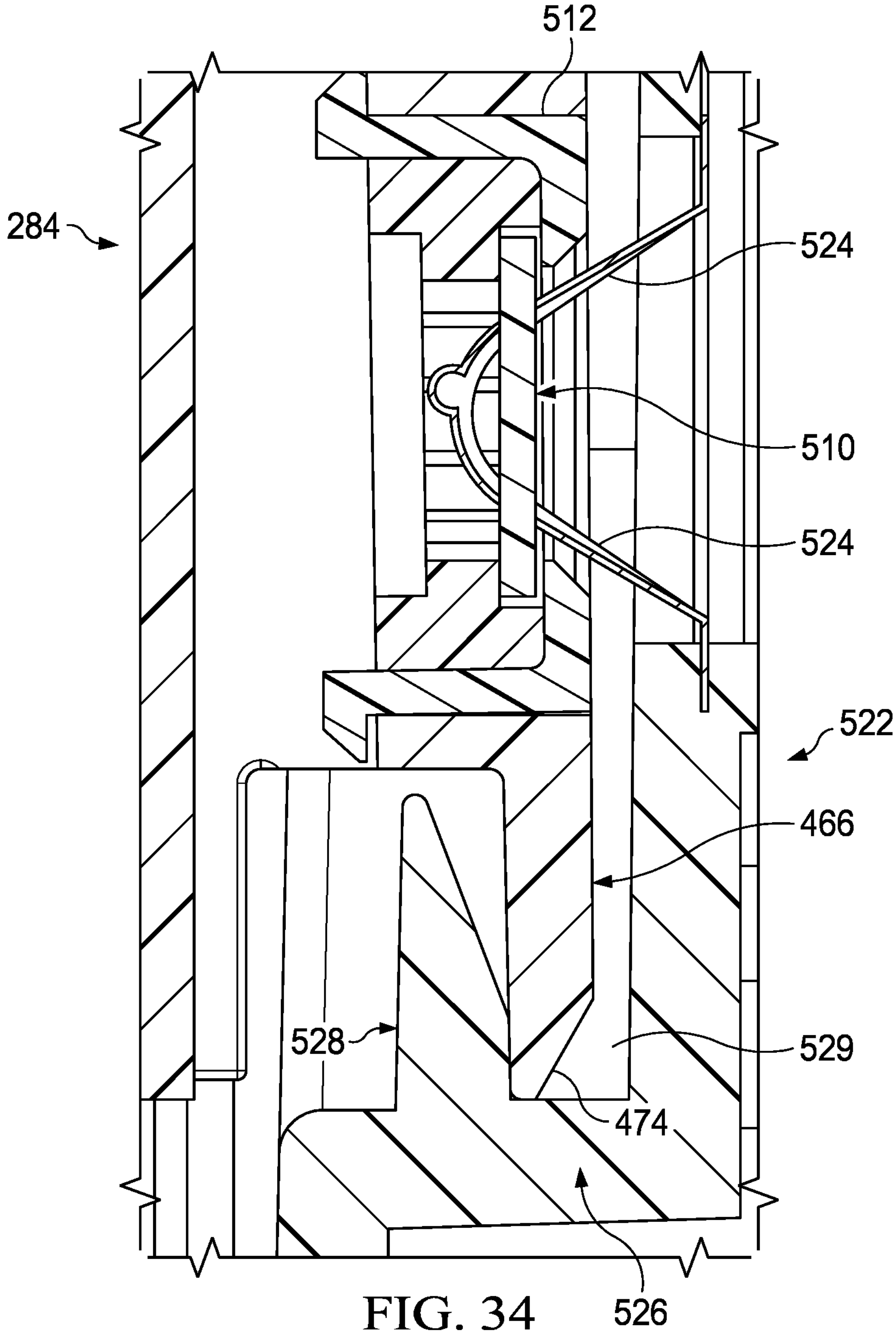
FIG. 34 illustrates a cross-sectional view of the spindle of FIG. 33 installed in a printer.

As best shown in FIG. 34, the material holder may be used with a printer 522 including one or more contacts 524 configured to read the smart cell 510. The printer 522 may further include a chassis 526 including a locating fixture 528. The locating fixture 528 may correspond to and/or complement the locating wall 466 of the spindle 284 such that, when the material holder 280 is installed in the printer 522, the chassis 526 may ensure the spindle 284 is positioned in a location where the smart cell 510 can be read by the contacts 524. In this way, the locating wall 466 may also prevent the material holder 280 from being installed backwards. Additionally, the locating fixture 528 may include an angled member 529 which may be configured to align with and receive the chamfered surface 474 of the locating wall 466, thereby ensuring a proper orientation and/or position of the material holder 280 with respect to the printer 522.

The smart cell 510 may identify the material holder 280 and/or the media roll 340 provided with the material holder 280 as either suitable or unsuitable for use with the printer 522. For example, the printer 522 may be designed to work exclusively with printable media produced by a particular manufacturer. In that case, the printer 522 may read the smart cell 510 via the contacts 524 to determine whether the material holder 280 and/or media roll 340 were produced by the desired manufacturer. If so, the printer 522 may proceed with printing or another operation. If not, the printer 522 may be inoperable until a suitable material holder 280 and/or media roll 340 is installed. In the example of FIG. 34, the printer 522 is not shown in its entirety but may be provided in substantially the same form as the inkjet printer 100, thermal printer 160, laser printer 210, or any other suitable printing device.

Figure 35:
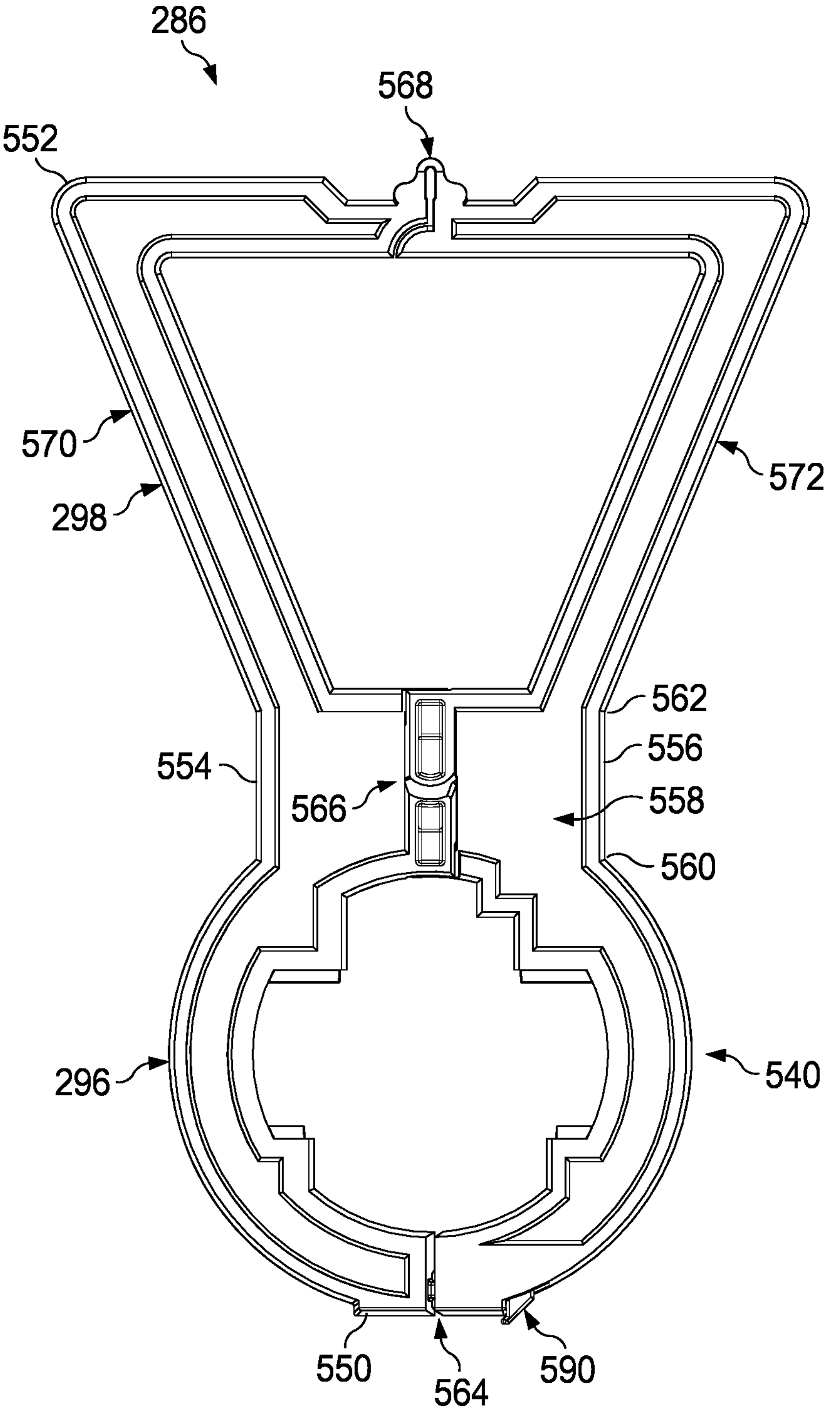
FIG. 35 illustrates a front isometric view of a side clip of the material holder of FIG. 10.

Turning to FIG. 35, the side clip 286 may have a body 540 defined by a first end 550 and a second end 552 opposing the first end 550. Likewise, the side clip 286 may have a first side 554 and a second side 556 opposing the first side 554. The body 540 is defined by the attachment zone 296 proximate to the first end 550, the side clip handle 298 proximate to the second end 552, and a midsection 558 disposed between the attachment zone 296 and the side clip handle 298. The midsection 558 may have a bottom end 560 proximate to the attachment zone 296 and a top end 562 proximate to the side clip handle 298. In some instances, the attachment zone 296, side clip handle 298, and midsection 558 may each be formed integrally with one another. In other instances, the attachment zone 296 may be connected with the bottom end 560 of the midsection 558 and extend downwardly therefrom and the side clip handle 298 may be connected with the top end 562 of the midsection 558 and extend upwardly therefrom.

In some instances, the side clip may include a first locking mechanism 564, a second locking mechanism 566, and a living hinge 568. The first locking mechanism 564 may be disposed on the attachment zone 296 proximate to the first end 550 of the side clip 286. The second locking mechanism 566 may be disposed on the midsection 558 between the attachment zone 296 and the side clip handle 298. The living hinge 568 may be disposed on the side clip handle 298 proximate to the second end 552 of the side clip 286.

The side clip 286 may include a first half 570 and a second half 572 and is designed to articulate between an open configuration and a closed configuration. The first and second halves 570, 572 may be rotatably coupled to one another via the living hinge 568 and may be detachably coupled to one another via the first and second locking mechanisms 564, 566. To transition the side clip 286 between the closed configuration (shown in FIG. 35) and the open configuration (shown in FIG. 36), a user may rotate one of the first or second halves 570, 572 with respect to the other of the first or second halves 570, 572 about the living hinge 568.

Figure 36:
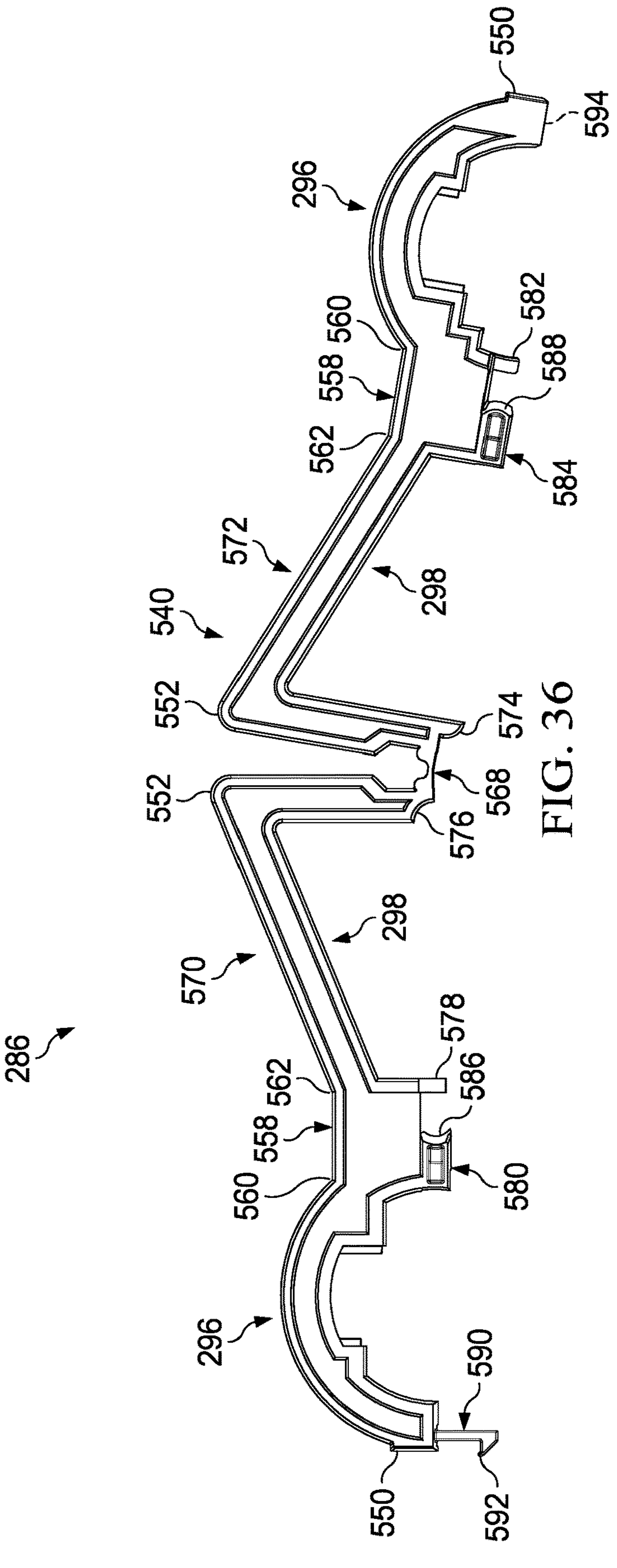
FIG. 36 illustrates a front elevational view of the side clip of FIG. 35 in an open configuration.

As shown in FIG. 36, the side clip 286 may include an extension piece 574 and a seat 576, each of which may be disposed at the second end 552 of the side clip 286 proximate to the living hinge 568. The extension piece 574 and the seat 576 may be designed and arranged to complement one another such that, when the side clip 286 is transitioned from the open configuration to the closed configuration, the seat 576 may receive the extension piece 574.

The second locking mechanism 566 may be imparted with a rounded interference geometry such that the second locking mechanism 566 may snap together when the side clip 286 is transitioned from the open configuration to the closed configuration. For example, the second locking mechanism may include a first stud 578 and a first fit member 580 disposed on the first half 570 at the midsection 558 and a second stud 582 and a second fit member 584 disposed on the second half 572 at the midsection 558. The first fit member 580 may be positioned on the first half 570 such that it may abut or be located proximate to the bottom end 560 of the midsection 558, whereas the second fit member 584 may be positioned on the second half 572 such that it may abut or be located proximate to the top end 562 of the midsection 558.

The first fit member 580 may include a first mating surface 586 positioned opposite the bottom end 560 of the midsection 558. The second fit member 584 may include a second mating surface 588 positioned opposite the top end 562 of the midsection 558. The first and second mating surfaces 586, 588 may each be imparted with a curved geometry. For example, the first mating surface 586 may be imparted with a concave geometry, and the second mating surface 588 may be imparted with a convex geometry that substantially mirrors and/or complements the concave geometry of the first mating surface 586. Thus, the first and second fit members 580, 584 may facilitate a "snap fit" coupling between the first and second halves 570, 572. For example, the first and second mating surfaces 586, 588 may enable the first and second fit members 580, 584 to be coupled to one another via a press fit, an interference fit, or the like when the side clip 286 is converted from the open configuration to the closed configuration.

Figure 37:
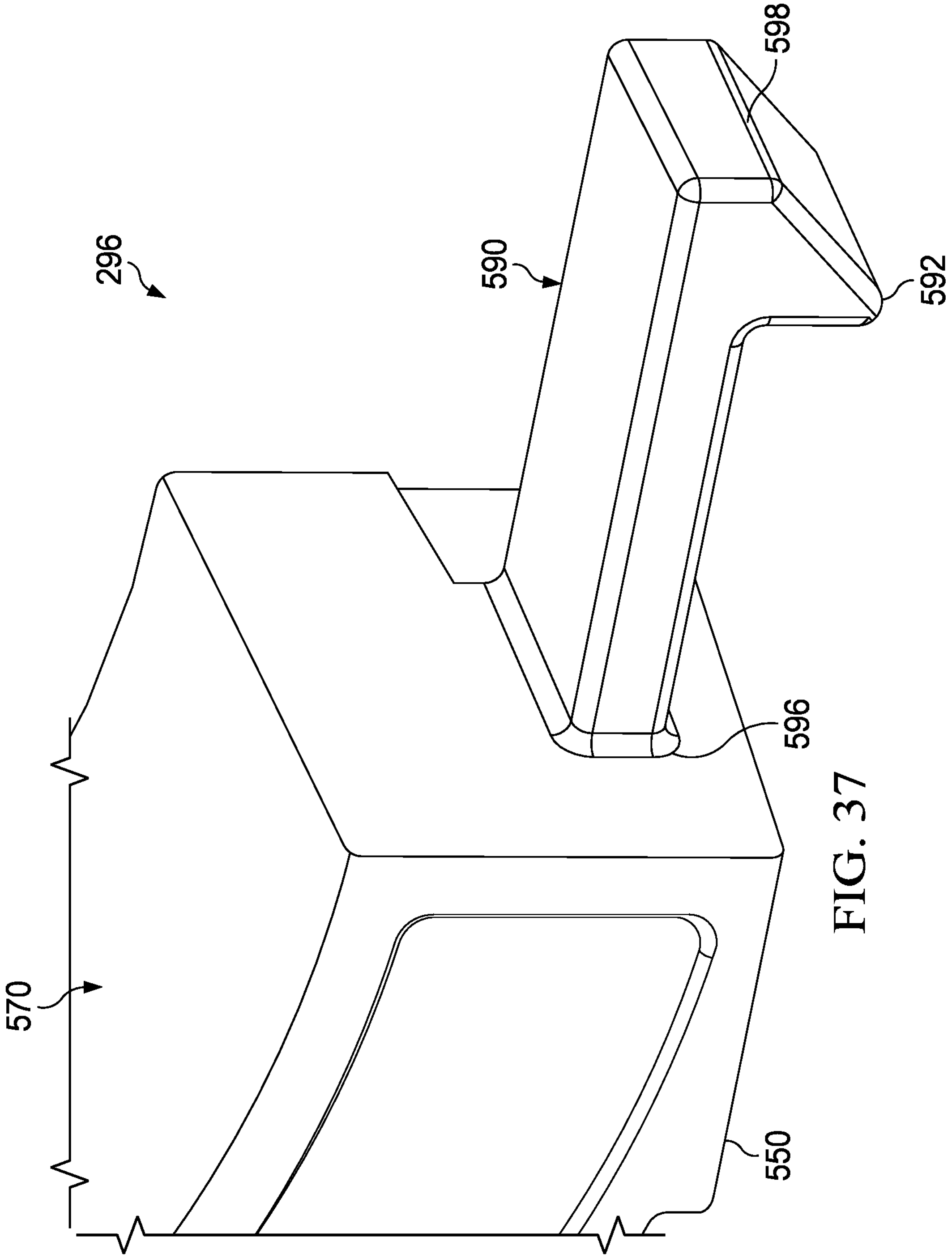
FIG. 37 illustrates an enlarged view of an insert of a first attachment mechanism of the side clip of FIG. 36 in an open configuration.
Figure 38:
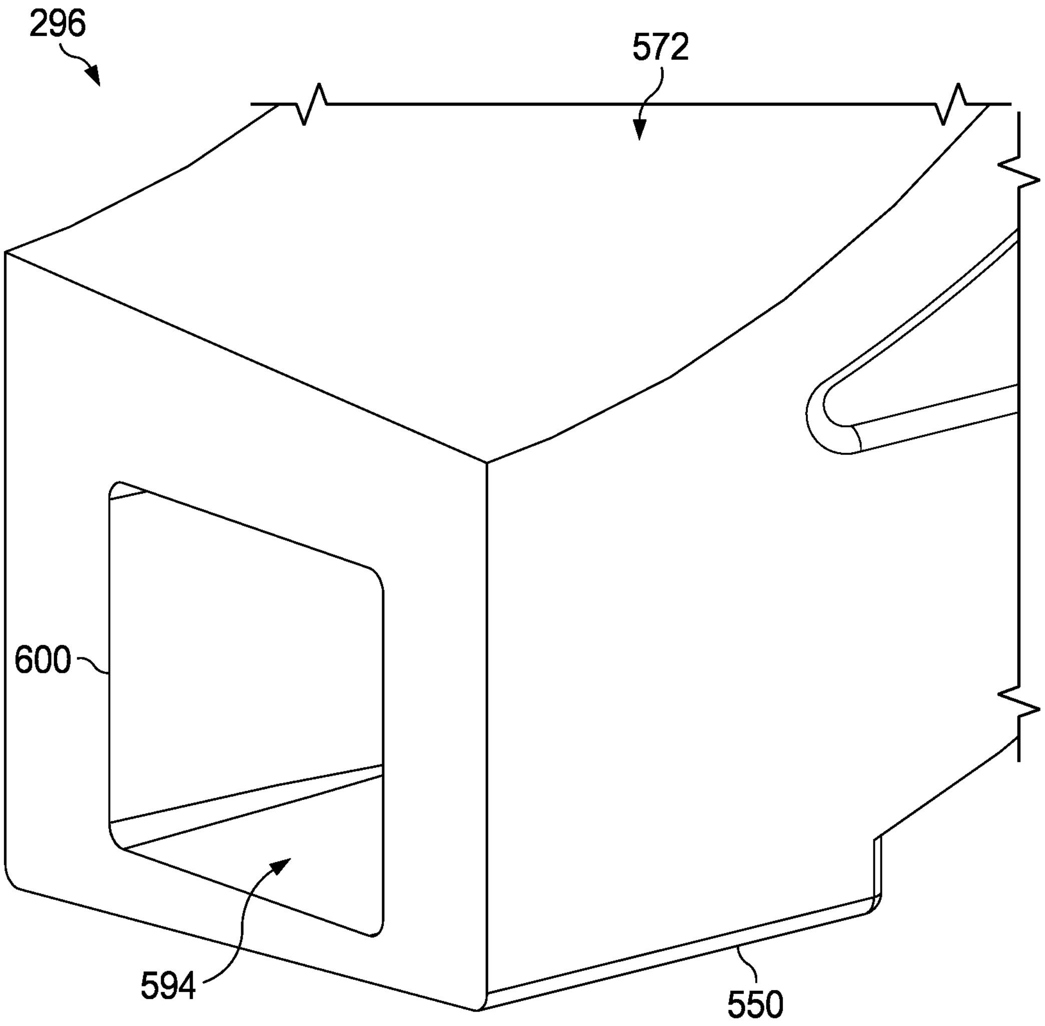
FIG. 38 illustrates an enlarged view of cavity of a first attachment mechanism of the side clip of FIG. 36 in an open configuration.
Figure 39:
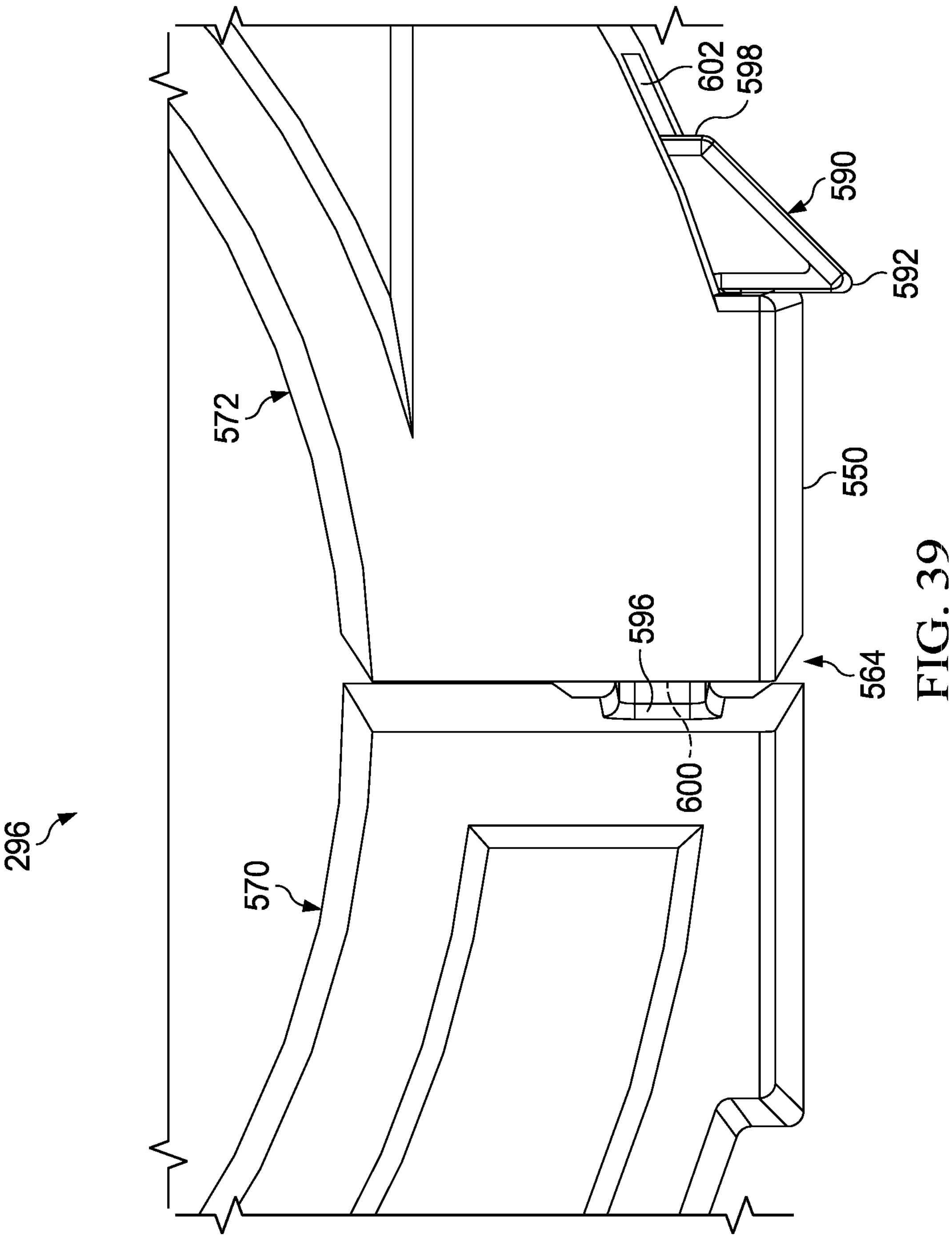
FIG. 39 illustrates an enlarged view of a first attachment mechanism of the side clip of FIG. 35 in a closed configuration.

Coupling between the first and second halves 570, 572 of the side clip 286 may also be facilitated by the first locking mechanism 564. The first locking mechanism 564 may be provided in the form of a tab or insert disposed on the first half 570 of the side clip 286 that "snaps in" to a housing or cavity disposed on the second half 572 of the side clip 286. For example, as best shown in FIGS. 37-39, the first locking mechanism 564 may include an insert 590 disposed on the first half 570 of the side clip 286 at the first end 550 (see FIG. 37). The insert 590 may include a hook 592. The first locking mechanism 564 may also include a cavity 594 formed in the second half 572 at the first end 550 of the side clip 286 (see FIG. 38). The cavity 594 may be arranged to receive the insert 590 (see FIG. 39).

As best seen in FIG. 37, the insert 590 may be substantially rectilinear in shape. In other instances, however, the insert 590 may be imparted with any suitable shape or structure. The insert 590 may be formed integrally with the first half 570 of the side clip 286 or a proximal end 596 of the insert 590 may be coupled to the first half 570 and the insert 590 may extend outwardly therefrom. The hook 592 may be disposed at a distal end 598 of the insert 590 opposite the proximal end 596.

As shown in FIG. 38, the cavity 594 may include a first opening 600 which may be substantially quadrilateral in shape. In other instances, however, the insert 590 and/or the first opening 600 may be imparted with any suitable shape or size. However, the cavity 594 and the first opening 600 may be configured such that the cavity 594 is capable of receiving the distal end 598 of the insert 590 when the side clip 286 is converted from the open configuration to the closed configuration.

As best shown in FIG. 39, when the insert 590 is positioned within the cavity 594 (not shown in FIG. 39), the first and second halves 570, 572 may come within a negligible distance of one another or may directly contact one another. In some instances, the insert 590 may extend through a second opening 602 of the cavity 594. The second opening 602 may be located opposite the first opening 600. When the distal end 598 of the insert 590 extends through the second opening 602, the hook 592 may engage the first end 550 of the second half 572 and prevent the insert 590 from being retracted from the cavity 594 via the first opening 600. In order to disengage the first locking mechanism 564, a user may apply upward pressure on the hook 592 such that the hook 592 no longer engages the first end 550 of the second half 572 of the side clip 286. Thus, the user may remove the insert 590 from the cavity 594 by rotating the first half 570 away from the second half 572 via the living hinge 568 (e.g., simultaneously disengaging the second locking mechanism 566).

Figure 40:
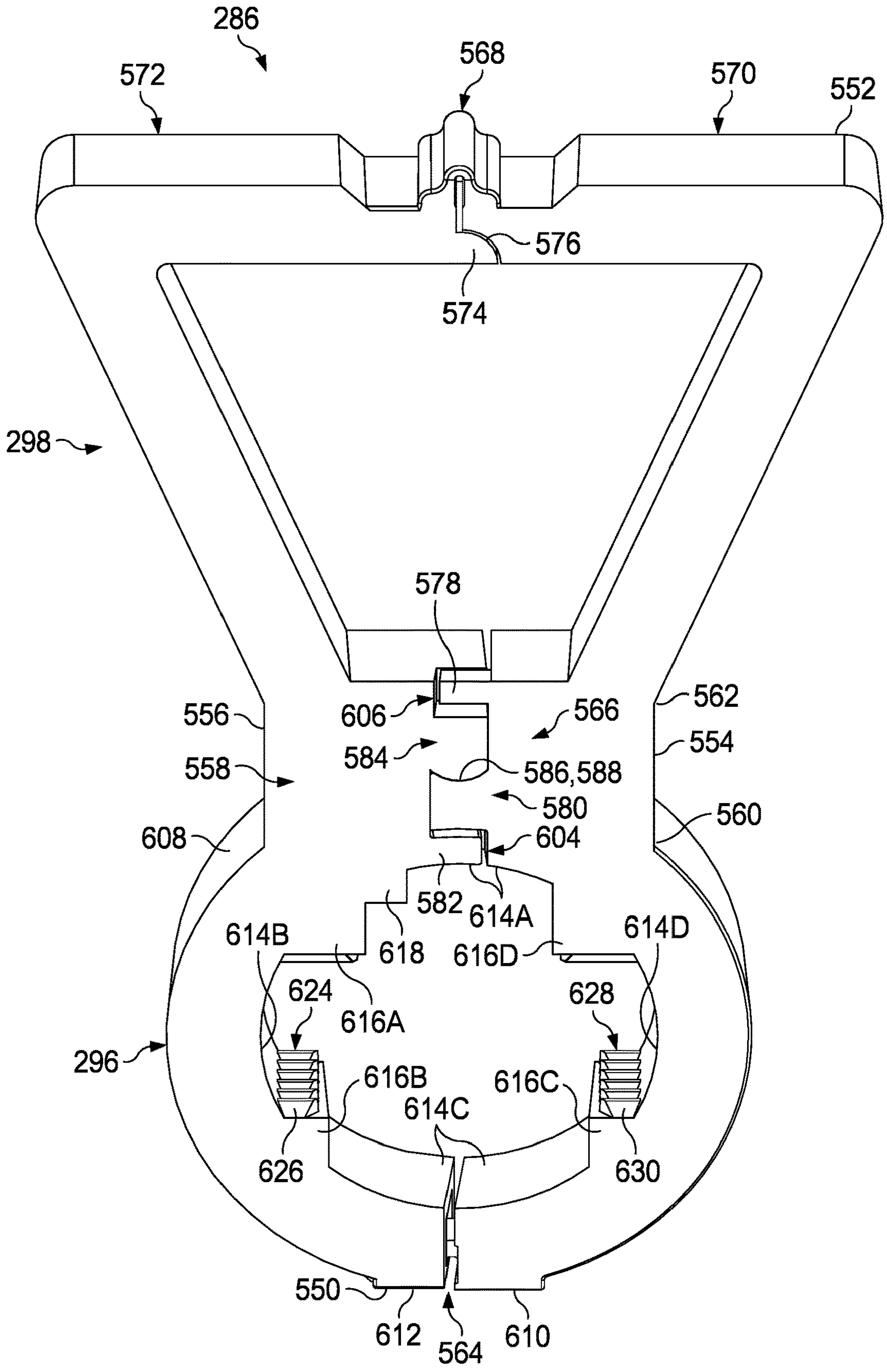
FIG. 40 illustrates a first rear isometric view of the side clip of FIG. 35.
Figure 41:
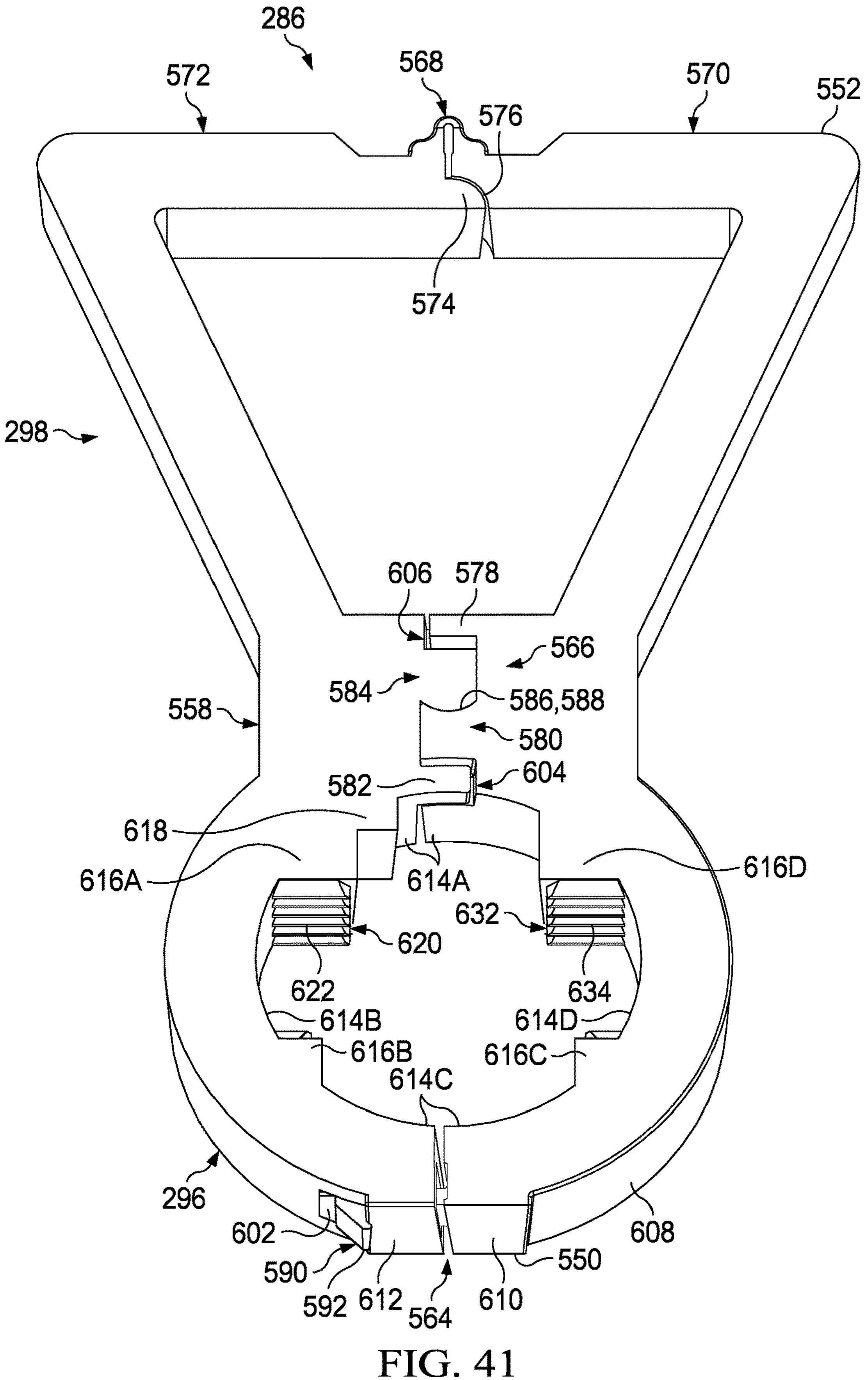
FIG. 41 illustrates a second rear isometric view of the side clip of FIG. 35.

Turning to FIGS. 40 and 41, the second locking mechanism 566 may be positioned at the midsection 558 between the first and second sides 554, 556 of the side clip 286. The second locking mechanism 566 may facilitate coupling between the first and second halves 570, 572 of the side clip 286 via, for example, the press fit or other connection between the first and second fit members 580, 584 described above with reference to FIG. 36. The second locking mechanism 566 may include one or more lap joints, which may limit torsion about the center of the second locking mechanism 566 (e.g., forces which may oppose the fit between the first and second fit members 580, 584). In this way, one or more lap joints may mitigate potential failures of the second locking mechanism 566. For example, a first lap joint 604 may be formed at the bottom end 560 of the midsection 558 between the first fit member 580 and the second stud 582. A second lap joint 606 may be formed at the top end 562 of the midsection 558 between the second fit member 584 and the first stud 578.

The attachment zone 296 may be designed to facilitate coupling between the side clip 286 and the arm 288 of the spindle 284. As best seen in FIG. 41, an outside surface 608 of the attachment zone 296 may be substantially cylindrical in shape, except that the outside surface 608 may include a first base member 610 positioned at the first end 550 of the first half 570 and a second base member 612 positioned at the first end 550 of the second half 572. The first and second base members 610, 612 may be formed integrally with the first and second halves 570, 572, respectively, or the first and second base members 610, 612 may be coupled to the first and second halves 570, 572, respectively, and extend minimally downwardly therefrom. The second base member 612 may be adjacent to and substantially flush with the first base member 610. For example, together, the first and second base members 610, 612 may provide a flat surface upon which the side clip 286 may be capable of resting in an upright position. In this way, the first and second base members 610, 612 may provide security and stability to the material holder 280.

The interior of the attachment zone 296 (e.g., the surface positioned opposite the outside surface 608) may be imparted with structural characteristics which may mirror and/or complement the structural characteristics of the arm 288 of the spindle 284.

For example, the attachment zone 296 may include inner curved surface segments 614A-D that correspond to the second bearing surface segments 432A-D of the arm 288. The inner curved surface segment 614A may be positioned proximate to the midsection 558 and may include at least a portion disposed on each of the first and second halves 570, 572 of the side clip 286. The inner curved surface segment 614A may be imparted with a curved geometry which mirrors or complements the curved geometry of the second bearing surface segment 432A. The inner curved surface segment 614B may be positioned on the second half 572 between the midsection 558 and the first end 550 and may be imparted with a curved geometry that mirrors or complements the curved geometry of the second bearing surface segment 432B. The inner curved surface segment 614C may be positioned proximate to the first end 550 opposing the inner curved surface segment 614A and may include at least a portion disposed on each of the first and second halves 570, 572 of the side clip 286. The inner curved surface segment 614C may be imparted with a curved geometry which mirrors or complements the curved geometry of the second bearing surface segment 432C. The inner curved surface segment 614D may be positioned on the first half 570 between the midsection 558 and the first end 550 and may be imparted with a curved geometry that mirrors or complements the curved geometry of the second bearing surface segment 432D.

Additionally, the attachment zone 296 may include ledges 616A-D which may correspond to the junctions 434A-D of the arm 288. For example, the ledge 616A may be positioned between the inner curved surface segments 614A, 614B and may be configured to be received by the junction 434A. The ledge 616B may be positioned between the inner curved surface segments 614B, 614C and may be configured to be received by the junction 434B. The ledge 616C may be positioned between the inner curved surface segments 614C, 614D and may be configured to be received by the junction 434C. The ledge 616D may be positioned between the inner curved surface segments 614D, 614A and may be configured to be received by the junction 434D.

The attachment zone 296 may further include an orienting ledge 618 positioned between the inner curved surface segment 614A and the ledge 616A. The orienting ledge 618 may correspond to and be configured to be received by the poke yoke 486. Thus, the orienting ledge 618 may ensure that the side clip 286 is installed on the arm 288 of the spindle 284 in the proper orientation.

The attachment zone 296 may include a fifth serrated surface 620 having a fifth plurality of teeth 622 (see FIG. 41), a sixth serrated surface 624 having a sixth plurality of teeth 626 (see FIG. 40), a seventh serrated surface 628 having a seventh plurality of teeth 630 (see FIG. 40), and an eighth serrated surface 632 having an eighth plurality of teeth 634 (see FIG. 41). The fifth serrated surface 620 may be disposed on the ledge 616A and the fifth plurality of teeth 622 may protrude from the ledge 616A in the direction of the first end 550 of the side clip 286. The sixth serrated surface 624 may be disposed on the ledge 616B and the sixth plurality of teeth 626 may protrude from the ledge 616B in the direction of the second end 552 of the side clip 286. The seventh serrated surface 628 may be disposed on the ledge 616C and the seventh plurality of teeth 630 may protrude from the ledge 616C in the direction of the second end 552. The eighth serrated surface 632 may be disposed on the ledge 616D and the eighth plurality of teeth 634 may protrude from the ledge 616D in the direction of the first end 550. The fifth, sixth, seventh, and eighth pluralities of teeth 622, 626, 630, 634 may each be provided in a form that complements the structure and geometry of the first, second, third, and fourth pluralities of teeth 440, 442, 448, 450.

Figure 42:
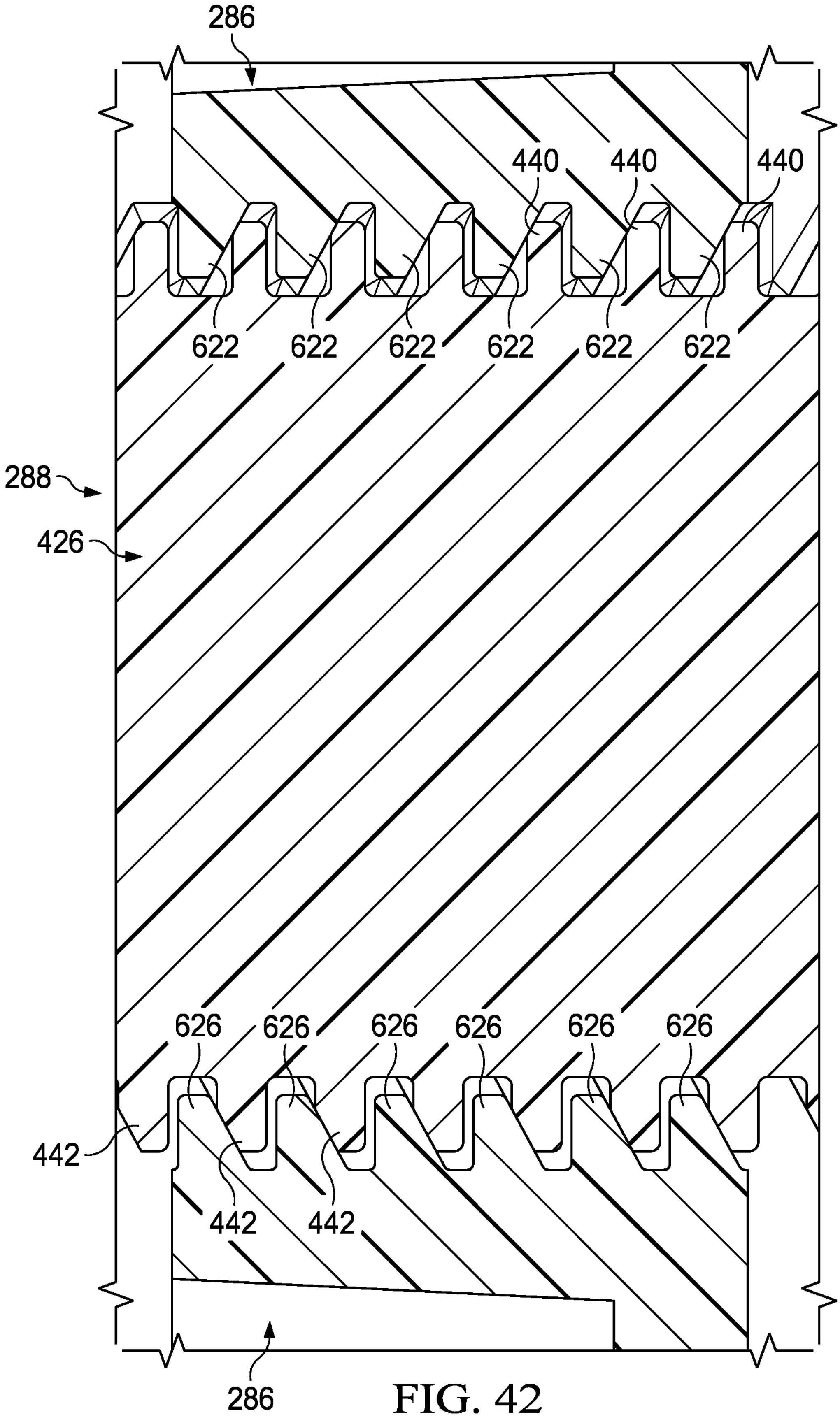
FIG. 42 illustrates a schematic view of a portion of the side clip of FIG. 35 coupled to a portion of the spindle of FIG. 20.

FIG. 42 illustrates an example of the engagement between the fifth and sixth pluralities of teeth 622, 626 and the first and second pluralities of teeth 440, 442, respectively, when the side clip 286 is installed on the arm 288. The fifth and sixth pluralities of teeth 622, 626 may be provided in the form of one-directional teeth, which may mitigate side load due to tracking or an accidental drop. In other instances, however, the fifth and sixth pluralities of teeth 622, 626 may be imparted in any suitable form that provides engagement between the fifth and sixth pluralities of teeth 622, 626 and the first and second pluralities of teeth 440, 442, respectively. The foregoing may be equally true with respect to the seventh and eighth pluralities of teeth 630, 634 and the third and fourth pluralities of teeth 448, 450.

Figure 43:
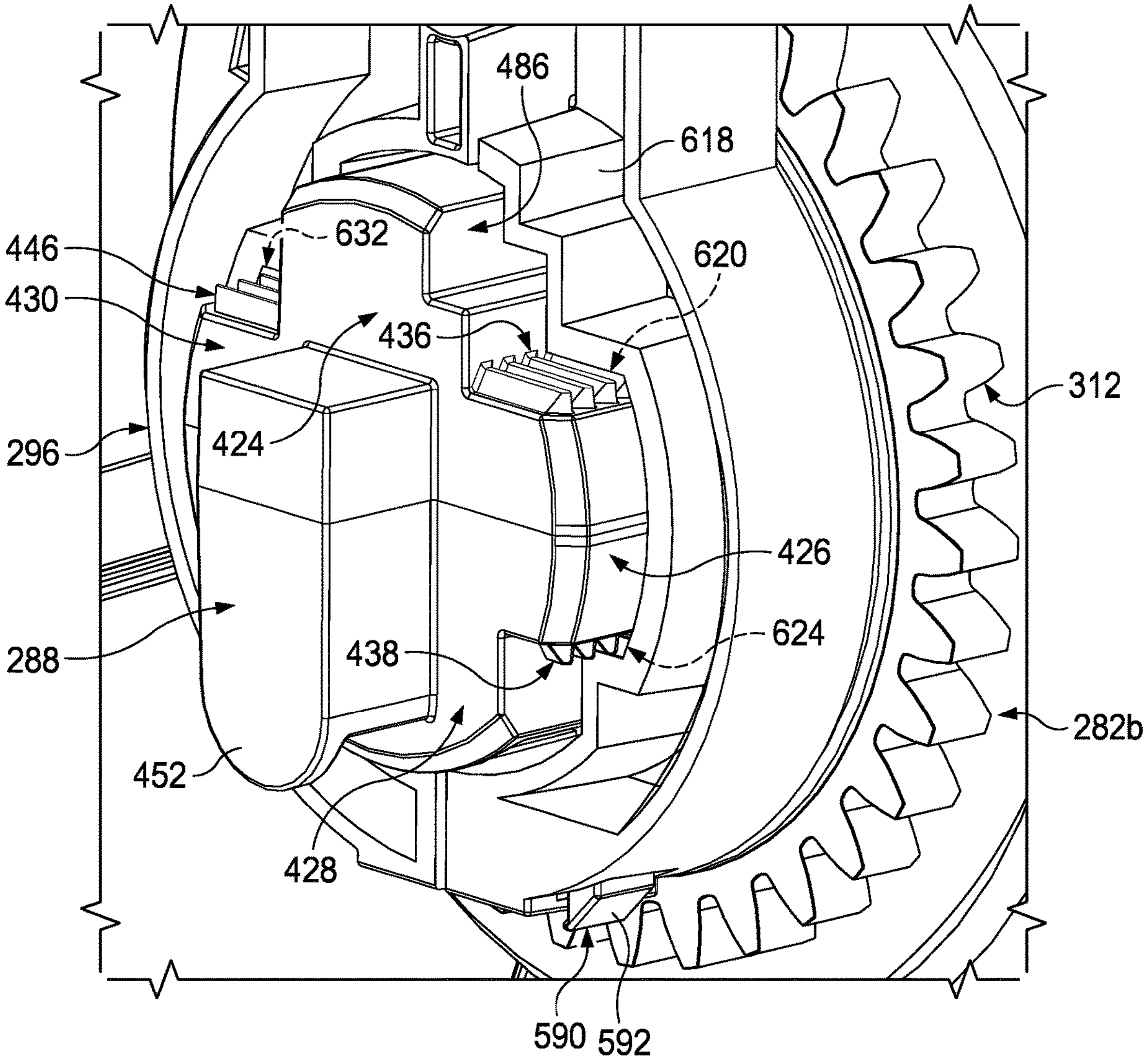
FIG. 43 illustrates an enlarged view of a portion of the material holder of FIG. 10.

Thus, as seen in FIG. 43, when the side clip 286 is installed on the arm 288, the first serrated surface 436 may align with and engage the fifth serrated surface 620, the second serrated surface 438 may align with and engage the sixth serrated surface 624, the third serrated surface 444 (not shown in FIG. 43) may align with and engage the seventh serrated surface 628 (not shown in FIG. 43), and the fourth serrated surface 446 may align with and engage the eighth serrated surface 632. This engagement between the attachment zone 296 and the arm 288 may prevent the side clip 286 from unintentionally tracking or moving relative to the arm 288 while the material holder 280 is, for example, in use or in transport.

Figure 44A:
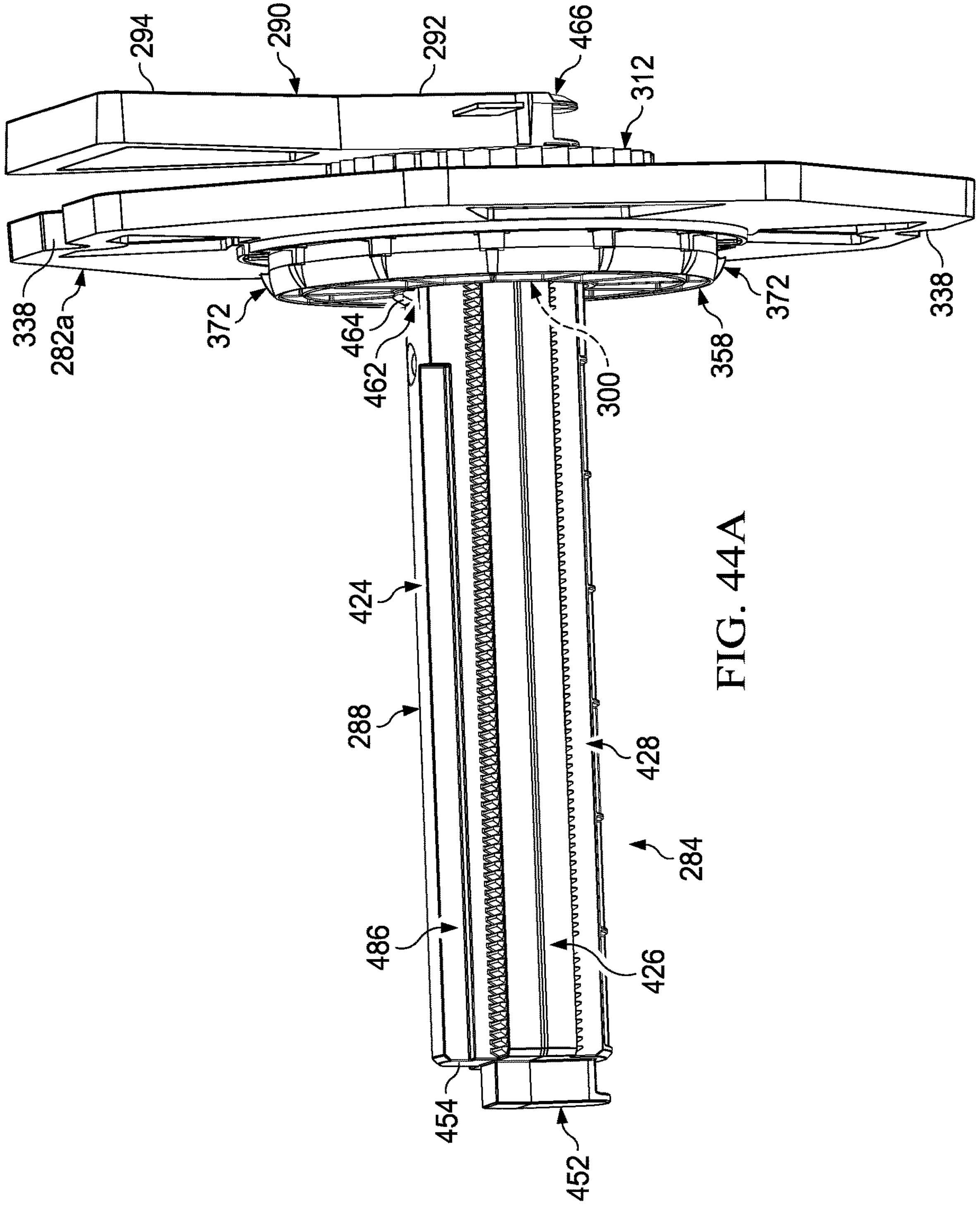
FIG. 44A illustrates a first step in a method of assembling the material holder of FIG. 10.

With reference to FIGS. 44A-D, a method of assembling the material holder 280 for use with a printer (e.g., inkjet printer 100, thermal printer 160, or laser printer 210) is described. As shown in FIG. 44A, a first flange 282*a* is installed on the spindle 286. In particular, a user may insert the distal end 454 of the arm 288 of the spindle 286 into the opening 300 of the first flange 282*a*. The user may move the first flange 282*a* along the entire length of the arm 288 in the direction of the keyhole region 290 until the first flange 282*a* is received by the spring tab 462 as described above with reference to FIGS. 30-32. For example, the first flange 282*a*, when installed, may be situated or secured between the catch 464 and the base 292 of the keyhole region 290. The first flange 282*a* may be oriented on the arm 288 such that the driven gear 312 of the first flange 282*a* abuts the base 292 of the keyhole region 290. The toothed ring 358 may extend from the first flange 282*a* in the direction of the distal end 454 of the arm 288 and may be configured to receive the media roll 340.

Figure 44B:
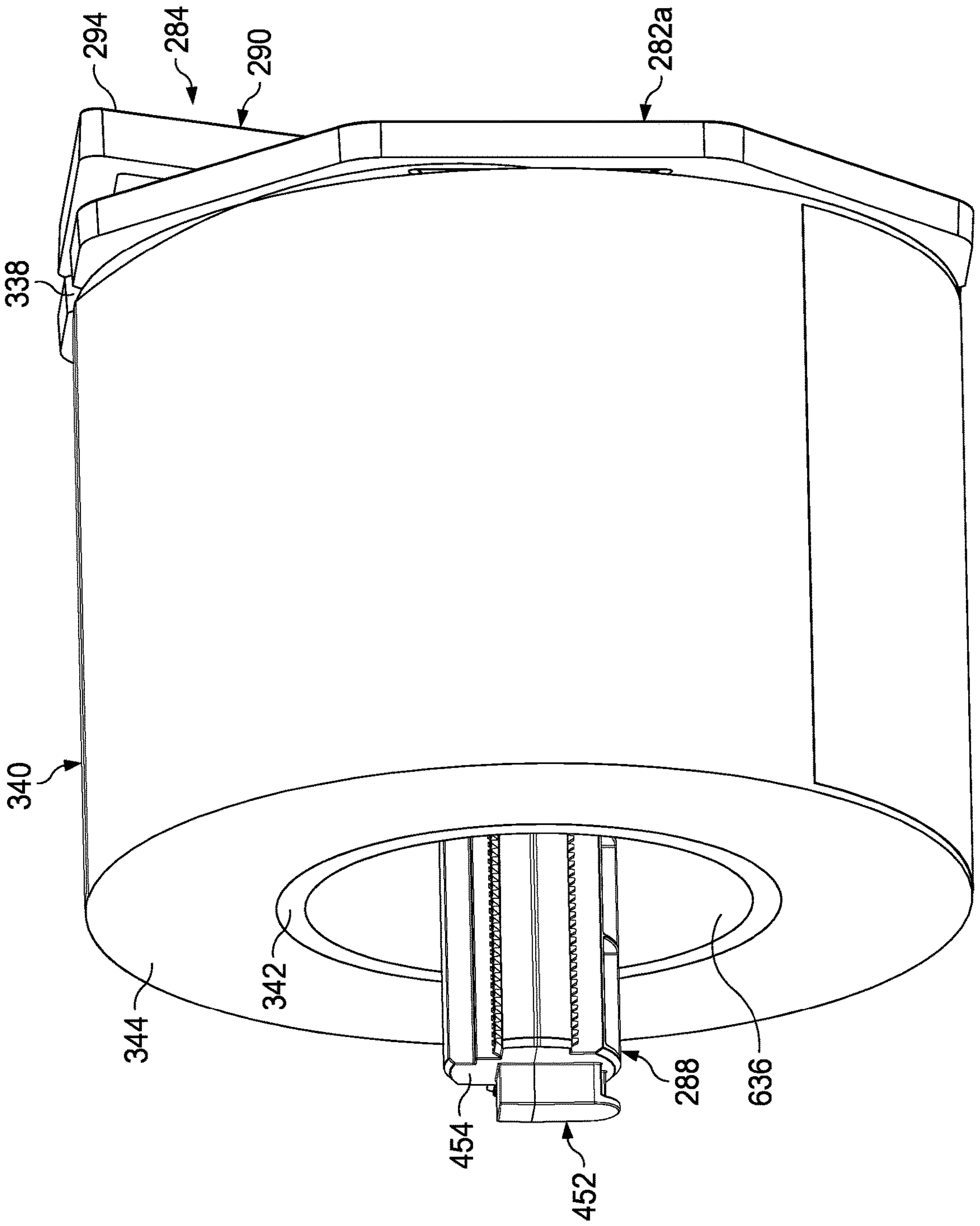
FIG. 44B illustrates a second step in a method of assembling the material holder of FIG. 10.

As shown in FIG. 44B, the media roll 340 is positioned along the arm 288 of the spindle 284 adjacent to the first flange 282*a*. A user may align the media roll 340 symmetrically and centrally with respect to the first flange 282*a* using the outer locating notches 338 of the first flange 282*a* as described above with reference to FIG. 17. A user may press the media roll 340 in the direction of the first flange 282*a*, thereby causing the toothed ring 358 to engage the core 342 (e.g., a cardboard core) of the media roll 340. For example, the core 342 may be imparted with a circular profile having substantially the same dimensions as the toothed ring 358. Thus, when the media roll 340 is pressed into the first flange 282*a*, the core 342 may slide over the barbs 372 and the barbs 372 may engage an inner surface 636 of the core 342. This engagement may cause the media roll 340 to be coupled to the first flange 282*a* via a press fit, interference fit, friction fit, or the like. The barbs 372 (described above with reference to FIG. 19) may increase the amount of engagement between the toothed ring 358 of the first flange 282*a* and the core 342 of the media roll 340 via cylindrical hoop stress.

Figure 44C:
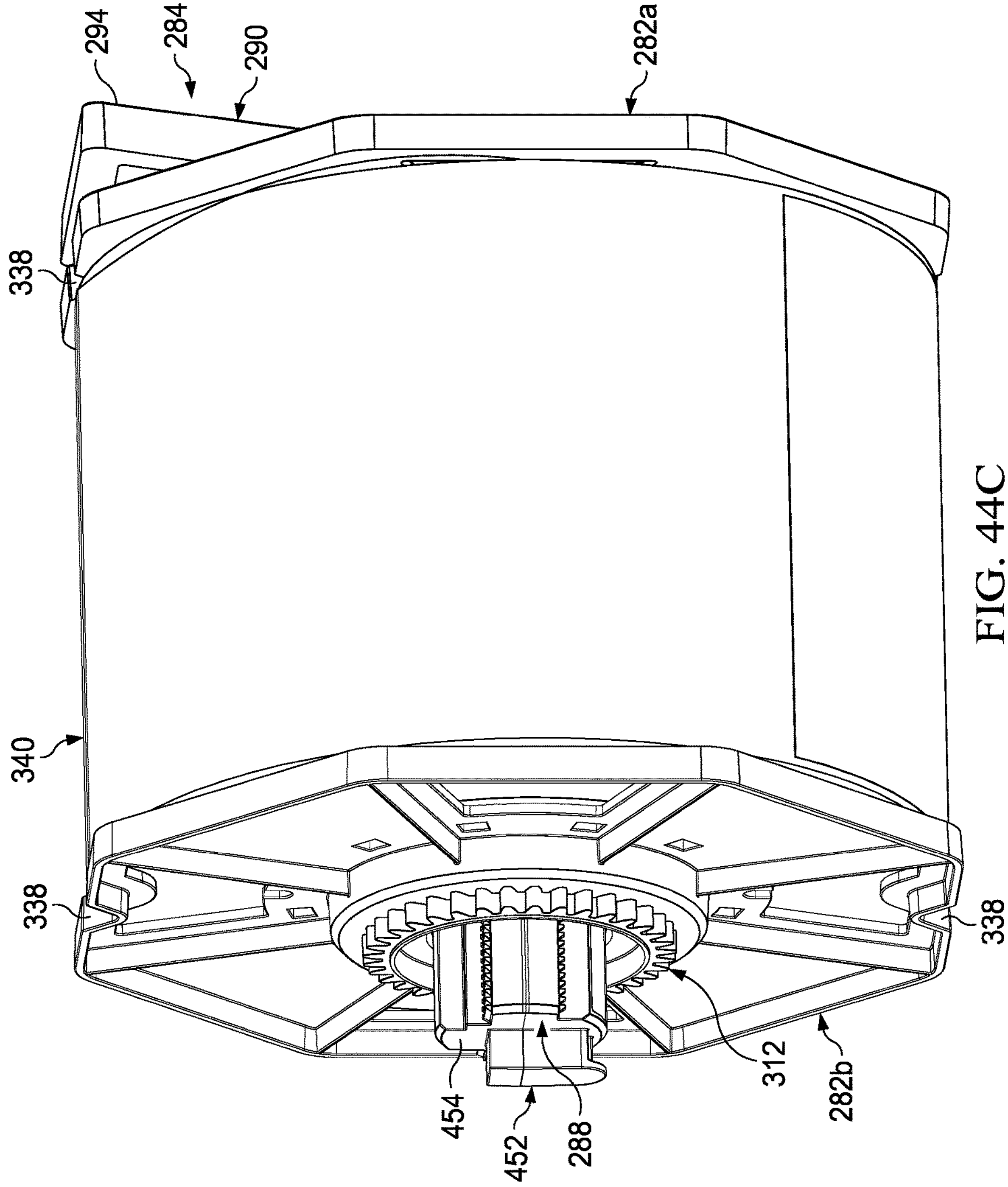
FIG. 44C illustrates a third step in a method of assembling the material holder of FIG. 10.

As shown in FIG. 44C, a second flange 282*b* is installed such that the media roll 340 is sandwiched between the first flange 282*a* on one side (e.g., proximate to the keyhole region 290) and the second flange 282*b* on the other side (e.g., proximate to the distal end 454 of the arm 288). For example, a user may position the second flange 282*b* along the arm 288 adjacent to the media roll 340. The user may reverse the orientation of the second flange 282*b* with respect to the first flange 282*a* (i.e., the driven gear 312 of the second flange 282*b* may face the distal end 454 of the arm 288 while the toothed ring 358 of the second flange 282*b* may directly abut the core 342 of the media roll 340). The user may align the second flange 282*b* symmetrically and centrally with respect to the media roll 340 using the outer locating notches 338 of the second flange 282*b* as described above with reference to FIG. 17. The user may then press the second flange 282*b* forward such that the toothed ring 358 may engage the inner surface 636 of the core 342. Thus, the second flange 282*b* may become coupled to the media roll 340 (and, by consequence, to the first flange 282*a*) via a press fit, interference fit, friction fit, or other engagement between the toothed ring 358 of the second flange 282*b* and the core 342. The first flange 282*a*, media roll 340, and second flange 282*b* may thus be combined into a single unit which may be held in place via an engagement between the spring tab 462 of the spindle 284 and the first flange 282*a*. In this way, the material holder 280 may be right justified. For example, the unit formed by the first flange 282*a*, media roll 340, and second flange 282*b* may be anchored to the side of the material holder 280 corresponding to the keyhole region 290 (e.g., a right side of the material holder 280 in FIG. 44C). This justification may enable the material holder 280 to retain media rolls 340 having different sizes, as explained below with reference to FIG. 45.

Figure 44D:
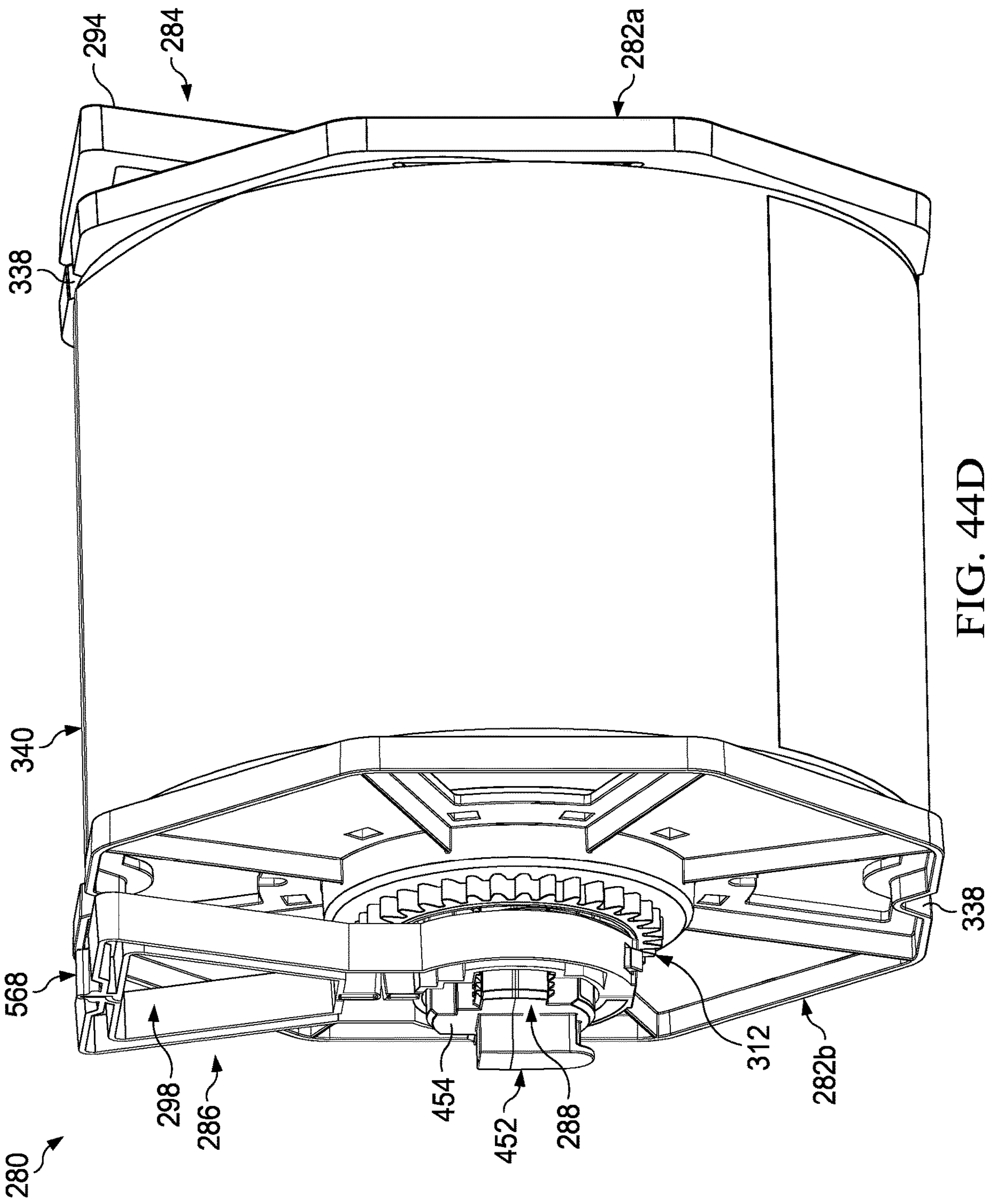
FIG. 44D illustrates a fourth step in a method of assembling the material holder of FIG. 10.

FIG. 44D depicts installing the side clip 286 on the material holder 280. The side clip 286 may further stabilize (e.g., resist or prevent tracking of) the first flange 282*a*, media roll 340, and second flange 282*b* with respect to the arm 288. A user may position the side clip 286 in the open configuration, as shown in FIG. 36. The user may position the side clip 286 adjacent to the second flange 282*b* and orient the side clip such that the attachment zone 296 is positioned to align with the arm 288 of the spindle 284 as described above with reference to FIGS. 40-43. With the side clip 286 properly positioned, the user may rotate one of the first and second halves 570, 572 about the living hinge 568 until it comes into contact with the other of the first and second halves 570, 572. In some instances, the first and second locking mechanisms 564, 566 may then be engaged and may help to secure the side clip 286 in the closed configuration about the arm 288.

With the material holder 280 fully assembled, the spindle handle 294 and the side clip handle 298 may allow a user to conveniently pick up, grasp, and/or install the material holder 280 in the inkjet printer 100, thermal printer 160, laser printer 210, or any other suitable printing device. In some instances, the spindle handle 294 and/or the side clip handle 298 may be coextensive with at least one standard viewing sector 326 or at least one viewing window sector 328. For example, the first and second flanges 282*a*, 282*b* may each be oriented such that the spindle handle 294 may align with a standard window sector 326 or a viewing window sector 328 of the first flange 282*a*, and the side clip handle 298 may align with a standard window sector 326 or a viewing window sector 328 of the second flange 282*b* (see FIGS. 10 and 11). This alignment may provide, for example, greater clearance or freedom to a hand or fingers of a user grasping or otherwise handling the material holder 280.

The driven gear 312 of the first flange 282*a* (see FIG. 44A) and the driven gear 312 of the second flange 282*b* may be positioned outwardly with respect to the media roll 340. Thus, the printing device may be configured to engage the driven gear 312 of the first flange 282*a* and/or the driven gear 312 of the second flange 282*b*, e.g., in order to drive rotation of the media roll 340.

Figure 45:
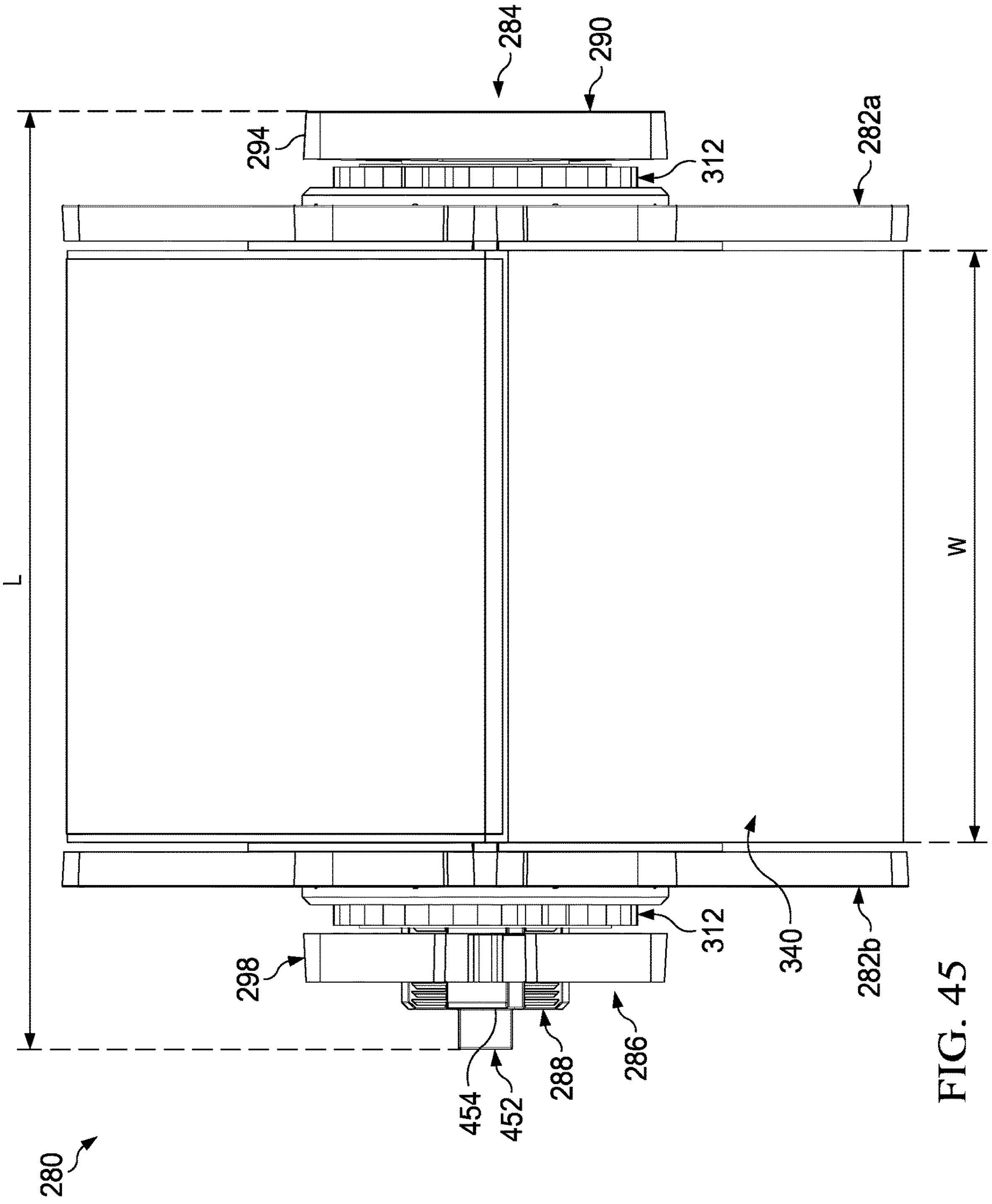
FIG. 45 illustrates a top isometric view of a material holder assembled according to the method shown in FIGS. 44A-44D.

Turning to FIG. 45, the material holder 280 may be configured for use with media rolls 340 of various sizes. The spindle 284 may be defined by a spindle length L measured between the end nub 452 and the keyhole region 290 in a directly substantially parallel with the arm 288. The media roll 340 may be defined by a roll width W measured in a direction parallel to the axis of rotation of the media roll 340 (e.g., the arm 288).

For example, the spindle length L may be imparted with a value of at least about 160 mm, or at least about 162 mm, or at least about 164 mm, or at least about 166 mm, or at least about 168 mm, or at least about 170 mm, or at least about 172 mm, or at least about 174 mm, or at least about 176 mm, or at least about 178 mm, or at least about 180 mm. The method of assembly described above with reference to FIGS. 44A-D may enable the roll width W to be imparted with a value of less than about 108 mm without requiring the spindle length L to be changed as well. For example, the roll width W may be imparted with a value of about 25.4 mm, or about 50.8 mm, or any other suitable value. The positioning of the flanges 282*a*, 282*b* along the arm 288 of the spindle 284 may be adjusted to accommodate media rolls 340 of different sizes. For example, the flanges 282*a*, 282*b* may be positioned closer to one another along the arm 288 when the roll width W is imparted with a value of about 50.8 mm than when the roll width is imparted with a value of about 25.4 mm.

In other instances, the roll width W may be imparted with a value of about 203.2 mm. In that case, the spindle length L may be imparted with a value of about 272.6 mm. For example, the spindle length L may be imparted with a value of at least about 262 mm, or at least about 264 mm, or at least about 266 mm, or at least about 268 mm, or at least about 270 mm, or at least about 272 mm, or at least about 274 mm, or at least about 276 mm, or at least about 278 mm, or at least about 280 mm, or at least about 282 mm. Additionally, the roll width W may be imparted with a value of less than about 203.2 mm without requiring the spindle length L to be changed as well. For example, the roll width W may be imparted with a value of about 50.8 mm, or about 108 mm, or about 152.4 mm, or any other suitable value, and the positioning of the flanges 282*a*, 282*b* along the arm 288 may be adjusted accordingly.

In still other instances, the roll width W may be imparted with a value of about 254 mm. In that case, the spindle length L may be imparted with a value of about 323.4 mm. For example, the spindle length L may be imparted with a value of at least about 314 mm, or at least about 316 mm, or at least about 318 mm, or at least about 320 mm, or at least about 322 mm, or at least about 324 mm, or at least about 326 mm, or at least about 328 mm, or at least about 330 mm, or at least about 332 mm, or at least about 334 mm. Additionally, the roll width W may be imparted with a value of less than about 254 mm without requiring the spindle length L to be changed as well. For example, the roll width W may be imparted with a value of about 108 mm, or about 152.4 mm, or about 203.2 mm, or any other suitable value, and the positioning of the flanges 282*a*, 282*b* along the arm 288 may be adjusted accordingly.

In one specific embodiment, the roll width W may be imparted with a value of about 108 millimeters (mm). In that case, the spindle length L may be imparted with a value of about 171 mm.

It will be appreciated by those skilled in the art that while the above disclosure has been described above in connection with particular embodiments and examples, the above disclosure is not necessarily so limited, and that numerous other embodiments, examples, uses, modifications and departures from the embodiments, examples and uses are intended to be encompassed by the claims attached hereto. The entire disclosure of each patent and publication cited herein is incorporated by reference as if each such patent or publication were individually incorporated by reference herein. Various features and advantages of the above disclosure are set forth in the following claims.

We claim:

1. A material holder for use in a printer, comprising:

a frame provided in the form of a first flange having a first body defined by a first outer perimeter circumscribing the first body, and a first bore forming an opening in the first body, and a second flange having a second body defined by a second outer perimeter circumscribing the second body, and a second bore forming an opening in the second body;

a spindle having an arm and a keyhole region, the arm extending through and engaging each of the first bore and the second bore, and the keyhole region defining a first handle extending upwardly therefrom; and a side clip coupled to the arm at a first end thereof and having a second handle extending upwardly therefrom.

2. The material holder of claim 1, wherein the first flange and the second flange are each imparted with a substantially polygonal shape, and the first outer perimeter and second outer perimeter each comprise a plurality of flat edges.

3. The material holder of claim 2, wherein the first flange and the second flange are each substantially octagonal in shape.

4. The material holder of claim 1, wherein at least one of the first flange or the second flange includes at least one material viewing window extending therethrough.

5. The material holder of claim 4, wherein the at least one material viewing window of at least one of the first flange or the second flange includes a core viewing notch configured to align with a core of a media roll installed on the material holder, and wherein the core may be viewed through the viewing notch to estimate a remaining life span of the media roll.

6. The material holder of claim 1, wherein each of the first flange and the second flange further include:

a first outer locating notch positioned along the first or second outer perimeter; and a second outer locating notch positioned along the first or second outer perimeter opposite from the first outer locating notch, wherein either of the first or second flange may be oriented centrally and symmetrically with respect to a media roll by comparing a portion of the media roll visible through the first outer locating notch with the portion of the media roll visible through the second outer locating notch and adjusting a position of the media roll until the portion of the media roll visible through the first outer location notch and the portion of the media roll visible through the second outer location notch are roughly equal in area.

7. The material holder of claim 1, wherein the side clip further includes:

a living hinge;

a first half hingedly coupled to the living hinge; and a second half hingedly coupled to the living hinge, wherein the first half is designed to releasably rotate relative to the second half about the living hinge.

8. The material holder of claim 7, wherein the side clip further includes a first locking mechanism and a second locking mechanism different from the first locking mechanism.

9. The material holder of claim 1, wherein the first flange and the second flange each further include:

a toothed ring disposed about either the first bore or the second bore; and a plurality of barbs coupled to and extending outwardly from the toothed ring, wherein the plurality of barbs are configured to engage a core of a media roll when the material holder includes the media roll disposed therein.

10. The material holder of claim 1, wherein the spindle further includes a locating wall to ensure that the material holder is oriented correctly when installed in the printer.

11. The material holder of claim 1, wherein at least one of the first flange or the second flange includes a driven gear configured to engage a gear drive assembly of the printer such that the printer can drive rotation of at least one of the first flange or the second flange when the material holder is in use.

12. The material holder of claim 1, wherein the printer is provided in the form of an inkjet printer, a thermal printer, or a laser printer.

13. A material holder for use in a printer, comprising:

a media roll having a substantially hollow core defining an opening, and a media supply wound about the core;

a spindle having an arm and a keyhole region, the arm extending through the opening and the keyhole region providing an elongate handle surface;

a first flange positioned between the media roll and the keyhole region;

a second flange positioned adjacent to the media roll and opposing the first flange; and a side clip coupled to the arm and positioned adjacent to the second flange.

14. The material holder of claim 13, wherein the first flange and the second flange are each defined by a plurality of flat edges.

15. The material holder of claim 14, wherein the first flange and the second flange are each substantially octagonal in shape.

16. The material holder of claim 13, wherein the first flange and the second flange each further include at least one material viewing window, wherein the material viewing window may expose at least a portion of the media roll to a user such that the user can estimate the portion of a life span of the media roll that remains before the media roll must be replaced.

17. The material holder of claim 13, wherein the side clip further includes a second elongate handle surface.

18. The material holder of claim 17, wherein the elongate handle surface and the second elongate handle surface each extend in a same direction with respect to the media roll.

19. The material holder of claim 13, wherein the spindle further includes a spring tab configured to receive the first flange, and wherein the first flange is positioned adjacent to the keyhole region when the first flange is received by the spring tab.

20. A method of assembling a material holder for use in a printer, comprising:

inserting an arm of a spindle into a first bore of a first flange, the first bore of the first flange configured to permit the first flange to rotate about the arm;

inserting the arm into a core of a media roll, the media roll having a media supply wound around the core such that the media roll is positioned adjacent to a first toothed ring of the first flange, the first toothed ring having a first plurality of barbs;

pressing the media roll into the first flange such that the first plurality of barbs engage the core;

inserting the arm into a second bore of a second flange, the second bore of the second flange configured to permit the second flange to rotate about the arm, the second flange configured such that a second toothed ring of the second flange is aligned with the core of the media roll, the second toothed ring including a second plurality of barbs;

pressing the second flange into the media roll such that the second plurality of barbs engage the core; and coupling a side clip to the arm, the side clip positioned adjacent to the second flange and configured to prevent each of the first flange, the media roll, and the second flange from sliding along the arm, wherein the side clip comprises a keyhole region and a handle extending upwardly therefrom.

* * * * *